United States Patent
Kotzur et al.

(10) Patent No.: US 11,023,322 B2
(45) Date of Patent: *Jun. 1, 2021

(54) RAID STORAGE-DEVICE-ASSISTED PARITY UPDATE DATA STORAGE SYSTEM

(71) Applicant: Dell Products L.P., Round Rock, TX (US)

(72) Inventors: Gary Benedict Kotzur, Austin, TX (US); William Emmett Lynn, Round Rock, TX (US)

(73) Assignee: Dell Products L.P., Round Rock, TX (US)

( * ) Notice: Subject to any disclaimer, the term of this patent is extended or adjusted under 35 U.S.C. 154(b) by 14 days.

This patent is subject to a terminal disclaimer.

(21) Appl. No.: 16/586,551

(22) Filed: Sep. 27, 2019

(65) Prior Publication Data

US 2021/0096951 A1    Apr. 1, 2021

(51) Int. Cl.
| | |
|---|---|
| G06F 11/10 | (2006.01) |
| G11C 29/52 | (2006.01) |
| G11C 29/04 | (2006.01) |
| H04L 1/00 | (2006.01) |
| H03M 13/00 | (2006.01) |
| H03M 13/11 | (2006.01) |
| G11C 16/26 | (2006.01) |
| G11C 16/34 | (2006.01) |
| G11C 16/04 | (2006.01) |
| G11C 11/56 | (2006.01) |
| G06F 13/28 | (2006.01) |

(52) U.S. Cl.
CPC .......... *G06F 11/1076* (2013.01); *G06F 13/28* (2013.01)

(58) Field of Classification Search
CPC ... G06F 11/1096; G06F 11/1076; G06F 13/28
See application file for complete search history.

(56) References Cited

U.S. PATENT DOCUMENTS

| | | | |
|---|---|---|---|
| 5,696,933 A | 12/1997 | Itoh et al. | |
| 5,774,641 A * | 6/1998 | Islam | ................. G06F 11/1076 714/6.12 |
| 6,526,477 B1 * | 2/2003 | Yuan | ...................... G06F 3/061 710/52 |
| 2009/0144497 A1 * | 6/2009 | Withers | ................. G06F 3/064 711/114 |
| 2010/0106906 A1 * | 4/2010 | Galloway | ........... G06F 11/1076 711/114 |

(Continued)

*Primary Examiner* — Guy J Lamarre
(74) *Attorney, Agent, or Firm* — Haynes and Boone, LLP

(57) ABSTRACT

A RAID storage-device-assisted parity data update system includes a first RAID primary data drive that DMA's second primary data from a host system, and XOR's it with first primary data to produce first interim parity data for a first data stripe. A second RAID primary data drive DMA's fourth primary data from the host system, and XOR's it with third primary data to produce second interim parity data for a second data stripe. A first RAID parity data drive DMAs the first interim parity data and XOR's it with first parity data to produce second parity data for the first data stripe that overwrites the first parity data. A second RAID parity data drive DMA's the second interim parity data and XOR's it with third parity data to produce fourth parity data for the second data stripe that overwrites the third parity data.

20 Claims, 45 Drawing Sheets

(56) References Cited

U.S. PATENT DOCUMENTS

| | | | |
|---|---|---|---|
| 2010/0312961 A1* | 12/2010 | Koul | G06F 11/1076 |
| | | | 711/114 |
| 2011/0264857 A1* | 10/2011 | Delaney | G06F 11/1076 |
| | | | 711/114 |
| 2014/0189212 A1* | 7/2014 | Slaight | G06F 3/0619 |
| | | | 711/103 |
| 2016/0246678 A1* | 8/2016 | Galbraith | G06F 3/0688 |
| 2017/0168896 A1* | 6/2017 | Karrotu | G06F 3/0689 |
| 2018/0203765 A1* | 7/2018 | Critchley | G06F 11/1076 |

* cited by examiner

RAID STORAGE-DEVICE-ASSISTED PARITY UPDATE DATA STORAGE SYSTEM

BACKGROUND

The present disclosure relates generally to information handling systems, and more particularly to performing parity data updates in an information handling system with the assistance of RAID storage devices, as well as to the storage of primary data and parity data in an information handling system to provide for more efficient parity data updates.

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Information handling systems sometime utilize storage systems such as those provided by a Redundant Array of Independent Disks (RAID) storage system that includes a plurality of RAID storage devices. As will be appreciated by one of skill in the art, RAID storage systems are provided by a data storage virtualization technology that combines the physical RAID storage devices into one or more logical storage units for the purposes of data redundancy, performance improvements, and/or other benefits known in the art. For example, data in a RAID storage system may be distributed across the RAID storage devices using several different techniques that are referred to as "RAID levels" that provide different levels of redundancy and performance (e.g., RAID 0, RAID 1, RAID 5, RAID 6, and so on), with each RAID level providing a different balance among goals that include reliability, availability, performance, and capacity. However, the introduction of new storage technologies for use in RAID storage systems has been found to raise some issues.

For example, Non-Volatile Memory express (NVMe) storage devices (e.g., NVMe Solid State Drive (SSD) drives) utilize an open logical device interface specification for accessing its non-volatile storage media (e.g., provided by NAND flash memory devices) via a Peripheral Component Interconnect express (PCIe) bus to provide low latency, internal parallelism, and/or other benefits known in the art. However, NVMe storage devices present a challenge when utilized with RAID storage systems because the aggregate performance of the NVMe storage devices is typically much greater than the performance capabilities of the RAID storage controller provided for the RAID storage system (and that performance is even projected to be much greater than the performance capabilities of next-generation RAID storage controllers), which results in those RAID storage controllers being unable to manage more than a few NVMe storage devices (e.g., conventional RAID storage controllers are currently capable of managing approximately four NVMe storage devices). As such, the use of NVMe storage devices in RAID storage subsystems present RAID storage system scaling issues, as the RAID storage controllers cannot scale with more than a few NVMe storage devices.

Accordingly, it would be desirable to provide a RAID storage system that addresses the issues discussed above.

SUMMARY

According to one embodiment, an Information Handling System (IHS) includes a first Redundant Array of Independent Disk (RAID) primary data storage device that includes a first storage subsystem storing first primary data and a first buffer subsystem, wherein the first RAID primary data storage device is configured, in response to a first command received from a RAID storage controller device, to: retrieve, via a first Direct Memory Access (DMA) operation from a host system, second primary data; perform an XOR operation on the first primary data in the first storage subsystem and the second primary data to produce first interim parity data for a first data stripe; and write, to the first buffer subsystem, the first interim parity data; a second RAID primary data storage device that includes a second storage subsystem storing third primary data and a second buffer subsystem, wherein the second RAID primary data storage device is configured, in response to a second command received from the RAID storage controller device, to: retrieve, via a second DMA operation from the host system, fourth primary data; perform an XOR operation on the third primary data in the second storage subsystem and the fourth primary data to produce second interim parity data for a second data stripe; and write, to the second buffer subsystem, the second interim parity data; a first RAID parity data storage device that includes a third storage subsystem storing first parity data for the first data stripe and a third buffer subsystem, wherein the first RAID parity data storage device is configured, in response to a third command received from the RAID storage controller device, to: write, via a third DMA operation from the first RAID primary data storage device to the third buffer subsystem, the first interim parity data; perform an XOR operation on the first parity data in the third storage subsystem and the first interim parity data in the third buffer subsystem to produce second parity data for the first data stripe; and overwrite, in the third storage subsystem, the first parity data with the second parity data; and a second RAID parity data storage device that includes a fourth storage subsystem storing third parity data for the second data stripe and a fourth buffer subsystem, wherein the second RAID parity data storage device is configured, in response to a fourth command received from the RAID storage controller device, to: write, via a fourth DMA operation from the second RAID primary data storage device to the fourth buffer subsystem, the second interim parity data; perform an XOR operation on the third parity data in the fourth storage subsystem and the second interim parity data in the fourth buffer subsystem to produce fourth parity data for the second data stripe; and overwrite, in the fourth storage subsystem, the third parity data with the fourth parity data.

DETAILED DESCRIPTION

For purposes of this disclosure, an information handling system may include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an information handling system may be a personal computer (e.g., desktop or laptop), tablet computer, mobile device (e.g., personal digital assistant (PDA) or smart phone), server (e.g., blade server or rack server), a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, touchscreen and/or a video display. The information handling system may also include one or more buses operable to transmit communications between the various hardware components.

Figure 1:
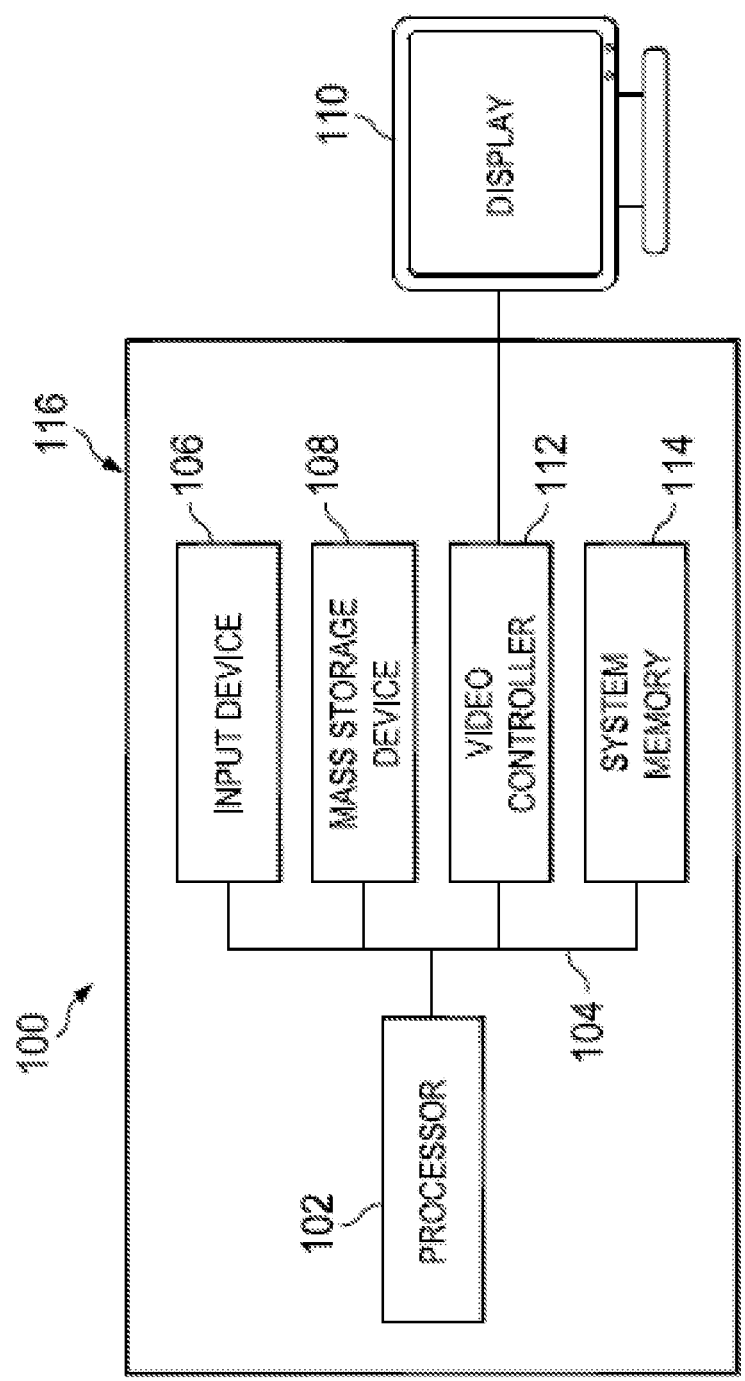
FIG. 1 is a schematic view illustrating an embodiment of an Information Handling System (IHS).

In one embodiment, IHS 100, FIG. 1, includes a processor 102, which is connected to a bus 104. Bus 104 serves as a connection between processor 102 and other components of IHS 100. An input device 106 is coupled to processor 102 to provide input to processor 102. Examples of input devices may include keyboards, touchscreens, pointing devices such as mouses, trackballs, and trackpads, and/or a variety of other input devices known in the art. Programs and data are stored on a mass storage device 108, which is coupled to processor 102. Examples of mass storage devices may include hard discs, optical disks, magneto-optical discs, solid-state storage devices, and/or a variety other mass storage devices known in the art. IHS 100 further includes a display 110, which is coupled to processor 102 by a video controller 112. A system memory 114 is coupled to processor 102 to provide the processor with fast storage to facilitate execution of computer programs by processor 102. Examples of system memory may include random access memory (RAM) devices such as dynamic RAM (DRAM), synchronous DRAM (SDRAM), solid state memory devices, and/or a variety of other memory devices known in the art. In an embodiment, a chassis 116 houses some or all of the components of IHS 100. It should be understood that other buses and intermediate circuits can be deployed between the components described above and processor 102 to facilitate interconnection between the components and the processor 102.

Figure 2:
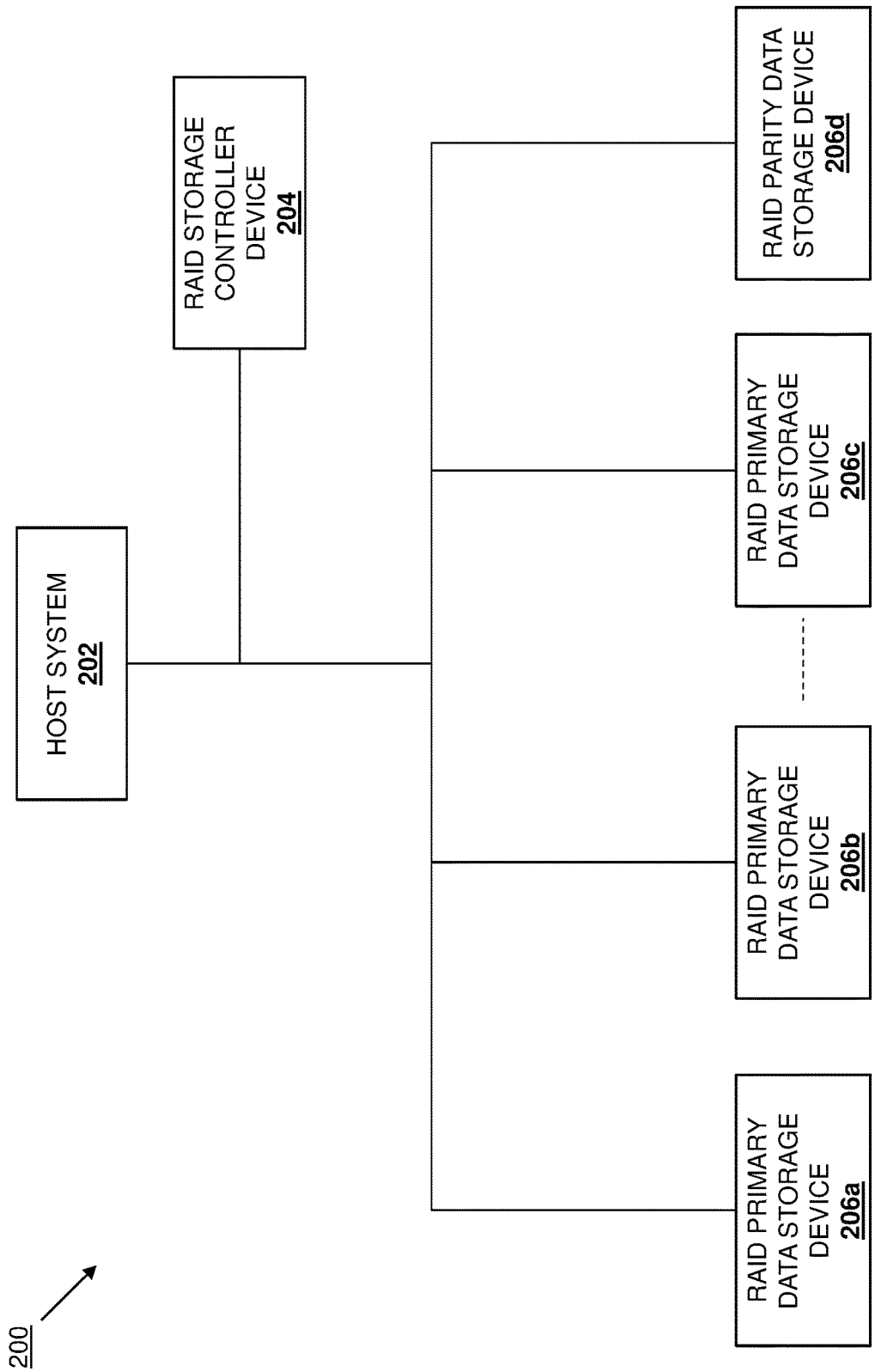
FIG. 2 is a schematic view illustrating an embodiment of a RAID storage system.

Referring now to FIG. 2, an embodiment of a Redundant Array of Independent Disks (RAID) storage system 200 is illustrated. In the illustrated embodiment, the RAID storage system 200 incudes a host system 202. In an embodiment, the host system 202 may be provided by the IHS 100 discussed above with reference to FIG. 1, and/or may include some or all of the components of the IHS 100. For example, the host system 202 may include server device(s), desktop computing device(s), a laptop/notebook computing device(s), tablet computing device(s), mobile phone(s), and/or any other host devices that one of skill in the art in possession of the present disclosure would recognize as operating similarly to the host system 202 discussed below. In the illustrated embodiment, the RAID storage system 200 also includes a RAID storage controller system 204 that is coupled to the host system 202 and that may be provided by the IHS 100 discussed above with reference to FIG. 1, and/or may include some or all of the components of the IHS 100. For example, the RAID controller system 204 may include any storage device/disk array controller device that is configured to manage physical storage devices and present them to host systems as logical units.

Furthermore, the RAID storage system 200 also includes a plurality of RAID storage devices that are illustrated in FIG. 2 as a plurality of RAID primary data storage devices 206a, 206b, and up to 206c, along with a RAID parity storage data device 206d, each of which is coupled to the host system 202 and the RAID storage controller system 204. However, as discussed below, any or all the plurality of RAID storage devices in the RAID storage system 200 illustrated in FIG. 2 may perform duals roles for different data stripes, with the example below including the RAID storage device that operates as the RAID primary data storage device 206a for one data stripe and a RAID parity data storage device 206a for another data stripe, and the RAID storage device that operates as the RAID parity data storage device 206d for one data stripe and a RAID primary data storage device 206d for another data stripe. As will be appreciated by one of skill in the art in possession of the present disclosure, the RAID storage devices in the RAID storage system 200 of FIG. 2 are described as operating in a RAID 5 configuration, with the RAID primary data storage devices configured to store primary data (e.g., provided by the host system 202), and the RAID parity data storage device configured to store parity data that may be utilized to recover primary data when that primary data becomes unavailable on one of the RAID primary data storage devices.

However, while a few RAID storage devices in a particular configuration are illustrated, one of skill in the art in possession of the present disclosure will recognize that many more storage devices may (and typically will) be coupled to the RAID storage controller system 204 (e.g., in a datacenter) and may be provided in other RAID configurations while remaining within the scope of the present disclosure. In the embodiments discussed below, the RAID storage devices 206a-206d are described as being provided by Non-Volatile Memory express (NVMe) Solid State Drive (SSD) drives, but one of skill in the art in possession of the present disclosure will recognize that other types of storage devices with similar functionality as the NVMe SSD drives (e.g., NVMe PCIe add-in cards, NVMe M.2 cards, etc.) may be implemented according to the teachings of the present disclosure and thus will fall within its scope as well. While a specific RAID storage system 200 has been illustrated and described, one of skill in the art in possession of the present disclosure will recognize that the RAID storage system of the present disclosure may include a variety of components and component configurations while remaining within the scope of the present disclosure as well.

Figure 3:
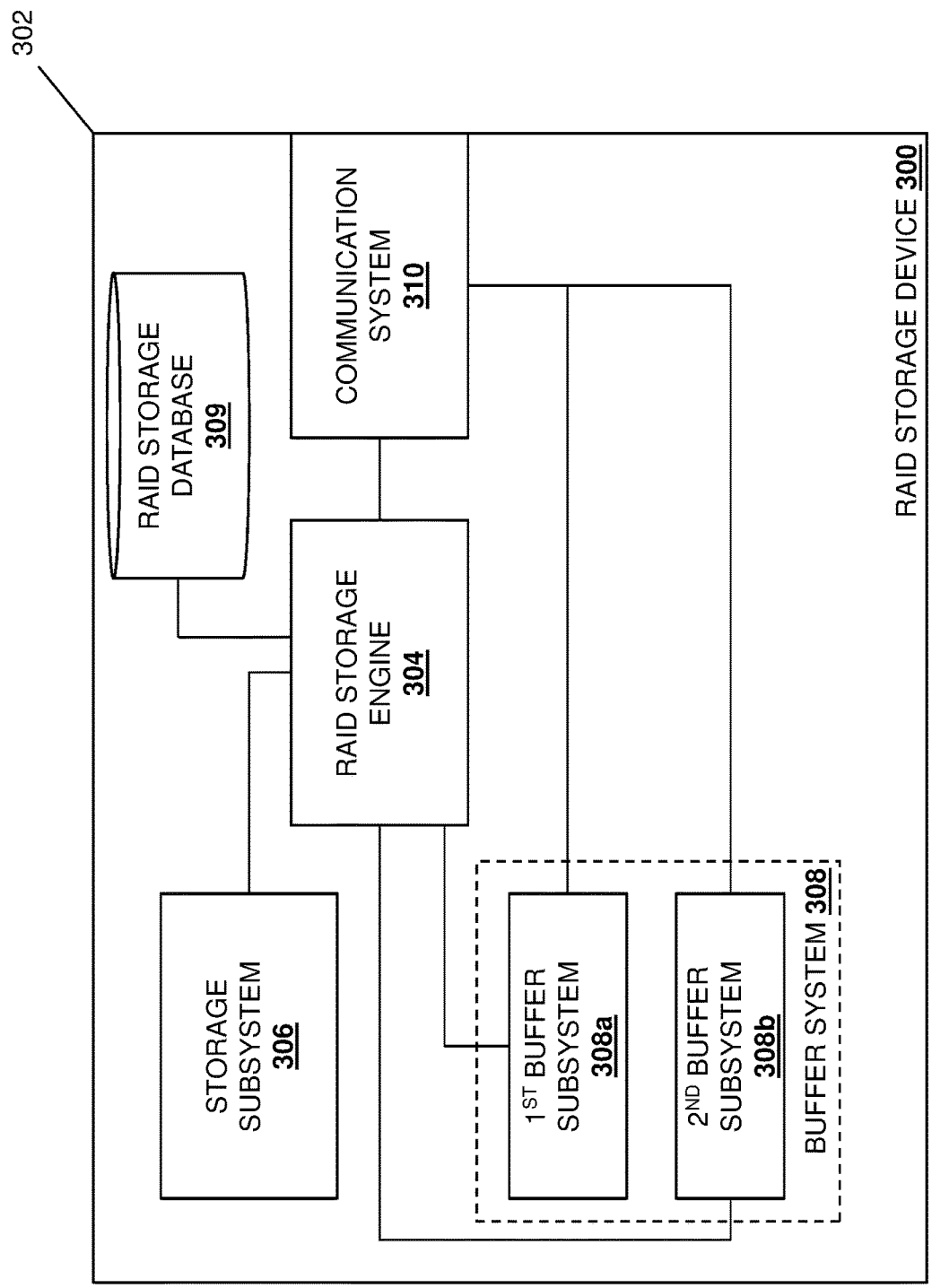
FIG. 3 is a schematic view illustrating an embodiment of a RAID storage device that may be provided in the RAID storage system of FIG. 2.

Referring now to FIG. 3, an embodiment of a RAID storage device 300 is illustrated that may provide any or all of the RAID primary data storage devices and the RAID parity data storage device discussed above with reference to FIG. 2. As such, the RAID storage device 300 may be provided by an NVMe SSD storage device, but one of skill in the art in possession of the present disclosure will recognize that other types of storage devices with similar functionality as the NVMe SSD storage devices (e.g., NVMe PCIe add-in cards, NVMe M.2 cards, etc.) may be provided according to the teachings of the present disclosure and thus will fall within its scope as well. In the illustrated embodiment, the RAID storage device 300 includes a chassis 302 that houses the components of the RAID storage device 300, only some of which are illustrated below. For example, the chassis 302 may house a processing system (not illustrated, but which may include the processor 102 discussed above with reference to FIG. 1) and a memory system (not illustrated, but which may include the memory 114 discussed above with reference to FIG. 1) that is coupled to the processing system and that includes instructions that, when executed by the processing system, cause the processing system to provide a RAID storage engine 304 that is configured to perform the functionality of the RAID storage engines and/or RAID storage devices discussed below. While not illustrated, one of skill in the art in possession of the present disclosure will recognize that the RAID storage engine 304 may include, or be coupled to, other components such as a queues (e.g., the submission queues and completion queues discussed below) and/or RAID storage device components that would be apparent to one of skill in the art in possession of the present disclosure.

The chassis 302 may also house a storage subsystem 306 that is coupled to the RAID storage engine 304 (e.g., via a coupling between the storage subsystem 306 and the processing system). Continuing with the example provided above in which the RAID storage device 300 is an NVMe SSD storage device, the storage subsystem 306 may be provided by a flash memory array such as, for example, a plurality of NAND flash memory devices. However, one of skill in the art in possession of the present disclosure will recognize that the storage subsystem 306 may be provided using other storage technologies while remaining within the scope of the present disclosure as well. The chassis 302 may also house a buffer system 308 that includes a first buffer subsystem 308a that is coupled to the RAID storage engine 304 (e.g., via a coupling between the first buffer subsystem 308a and the processing system), and a second buffer subsystem 308b that is coupled to the RAID storage engine 304 (e.g., via a coupling between the second buffer subsystem 308b and the processing system). For example, the buffer system 308 may be provided by one or more buffer memory devices that include a first set of memory address ranges that provide the first buffer subsystem 308a, and a second set of memory address ranges that provide the second buffer subsystem 308b. Continuing with the example provided above in which the RAID storage device 300 is an NVMe SSD storage device, the first buffer subsystem 308a may be provided by a portion of the buffer system 308 that is often referred to as the "device buffer". However, one of skill in the art in possession of the present disclosure will recognize that the first buffer subsystem 308a may be provided using other buffer technologies while remaining within the scope of the present disclosure as well.

Similarly, continuing with the example provided above in which the RAID storage device 300 is an NVMe SSD storage device, the second buffer subsystem 308b may be provided by a portion of the buffer system 308 that is often referred to as the "Controller Memory Buffer (CMB)", "scratchpad buffer", or "cache buffer". In an embodiment, the second buffer subsystem 308b/CMB may be provided by a subset of the buffer system 308 that is distinguished from the first buffer subsystem 308a/device buffer. For example, the second set of memory address ranges in the buffer memory device(s) that provide the second buffer subsystem 308b/CMB may be mapped to the PCIe memory space of the host system 202, which one of skill in the art in possession of the present disclosure will recognize makes the second buffer subsystem 308b/CMB visible to the host system 202 while the rest of the buffer system 308 (e.g., the first buffer subsystem 308a/device buffer) is not (i.e., due to the first set of memory address ranges in the buffer memory device(s) that provide the first buffer subsystem 308a/device buffer not being mapping to the PCIe memory space of the host system 202.) As will be appreciated by one of skill in the art in possession of the present disclosure, mapping the second buffer subsystem 308b/CMB to the PCIe memory space of the host system 202 allows for the second buffer subsystem 308b/CMB to be the target of the Direct Memory Access (DMA) data operation discussed below. However, one of skill in the art in possession of the present disclosure will recognize that the second buffer subsystem 308b may be provided using other buffer technologies while remaining within the scope of the present disclosure as well. The chassis 302 may also house a storage system (not illustrated, but which may be provided by the storage device 108 discussed above with reference to FIG. 1) that is coupled to the RAID storage engine 304 (e.g., via a coupling between the storage system and the processing system) and that includes a RAID storage database 309 that is configured to storage any of the information utilized by the RAID storage engine 304 as discussed below.

The chassis 302 may also house a communication system 310 that is coupled to the RAID storage engine 304 (e.g., via a coupling between the communication system 310 and the processing system), the first buffer subsystem 308a, and the second buffer subsystem 308b, and that may be provided by any of a variety of storage device communication technologies and/or any other communication components that would be apparent to one of skill in the art in possession of the present disclosure. Continuing with the example provided above in which the RAID storage device 300 is an NVMe SSD storage device, the communication system 310 may include any NVMe SSD storage device communication components that enable the Direct Memory Access (DMA) operations described below, the submission and completion queues discussed below, as well as any other components that provide NVMe SDD storage device communication functionality that would be apparent to one of skill in the art in possession of the present disclosure. While a specific RAID storage device 300 has been illustrated, one of skill in the art in possession of the present disclosure will recognize that RAID storage devices (or other devices operating according to the teachings of the present disclosure in a manner similar to that described below for the RAID storage device 300) may include a variety of components and/or component configurations for providing conventional RAID storage device functionality, as well as the functionality discussed below, while remaining within the scope of the present disclosure as well.

Figure 4:
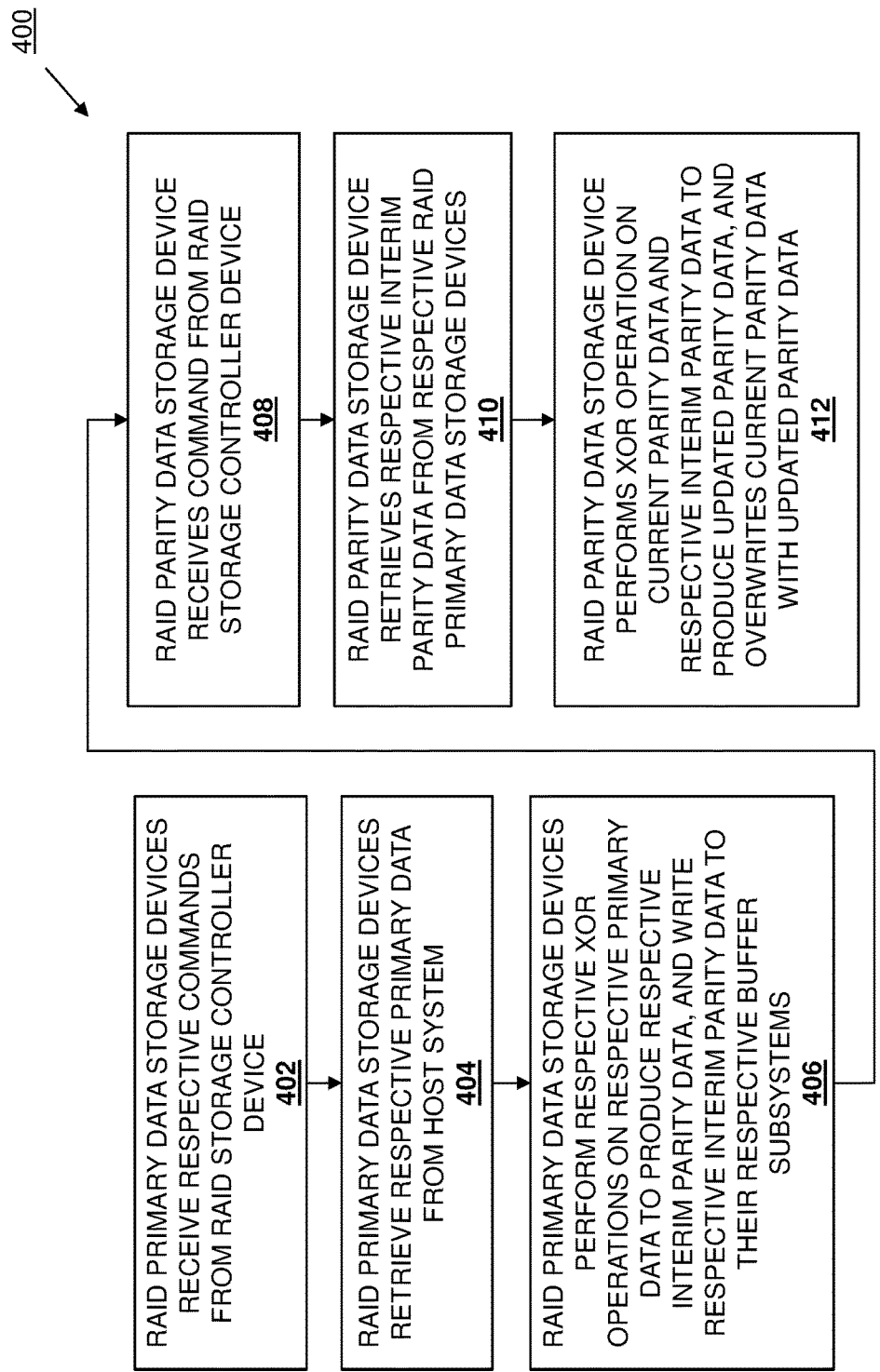
FIG. 4 is a flow chart illustrating an embodiment of a method for performing parity data update operations using RAID storage devices.

Referring now to FIG. 4, an embodiment of a method 400 for assisting with parity data update operations using RAID storage devices is illustrated. As discussed below, the systems and methods of the present disclosure provide for the performance of parity data update operations to store and backup data in a RAID storage system with the assistance of the RAID storage devices that store that data. For example, a first RAID primary data storage device may receive a command from a RAID storage controller device and, in response, may retrieve second primary data from a host system via a first Direct Memory Access (DMA) operation, perform an XOR operation on first primary data in a first storage subsystem in the first RAID primary data storage device and the second primary data to produce first interim parity data, and write the first interim parity data to its first buffer subsystem. A second RAID primary data storage device may also receive a command from the RAID storage controller device and, in response, may retrieve fourth primary data from the host system via a second DMA operation, perform an XOR operation on third primary data in a second storage subsystem in the second RAID primary data storage device and the fourth primary data to produce second interim parity data, and write the second interim parity data to its second buffer subsystem. A RAID parity data storage device may then receive a third command from the RAID storage controller device and, in response, may first retrieve the first interim parity data from the first RAID primary data storage device via a third DMA operation, then may retrieve the second interim parity data from the second RAID primary data storage device via a fourth DMA operation, and then may perform an XOR operation on first parity data in a first storage subsystem in the RAID parity data storage device along with the first interim parity data and the second interim parity data to produce second parity data, and overwrite the first parity data with the second parity data. As such, parity update operations are offloaded from the RAID storage controller device, thus increasing the ability of the RAID storage controller device to scale with high performance RAID storage devices.

Figure 5:
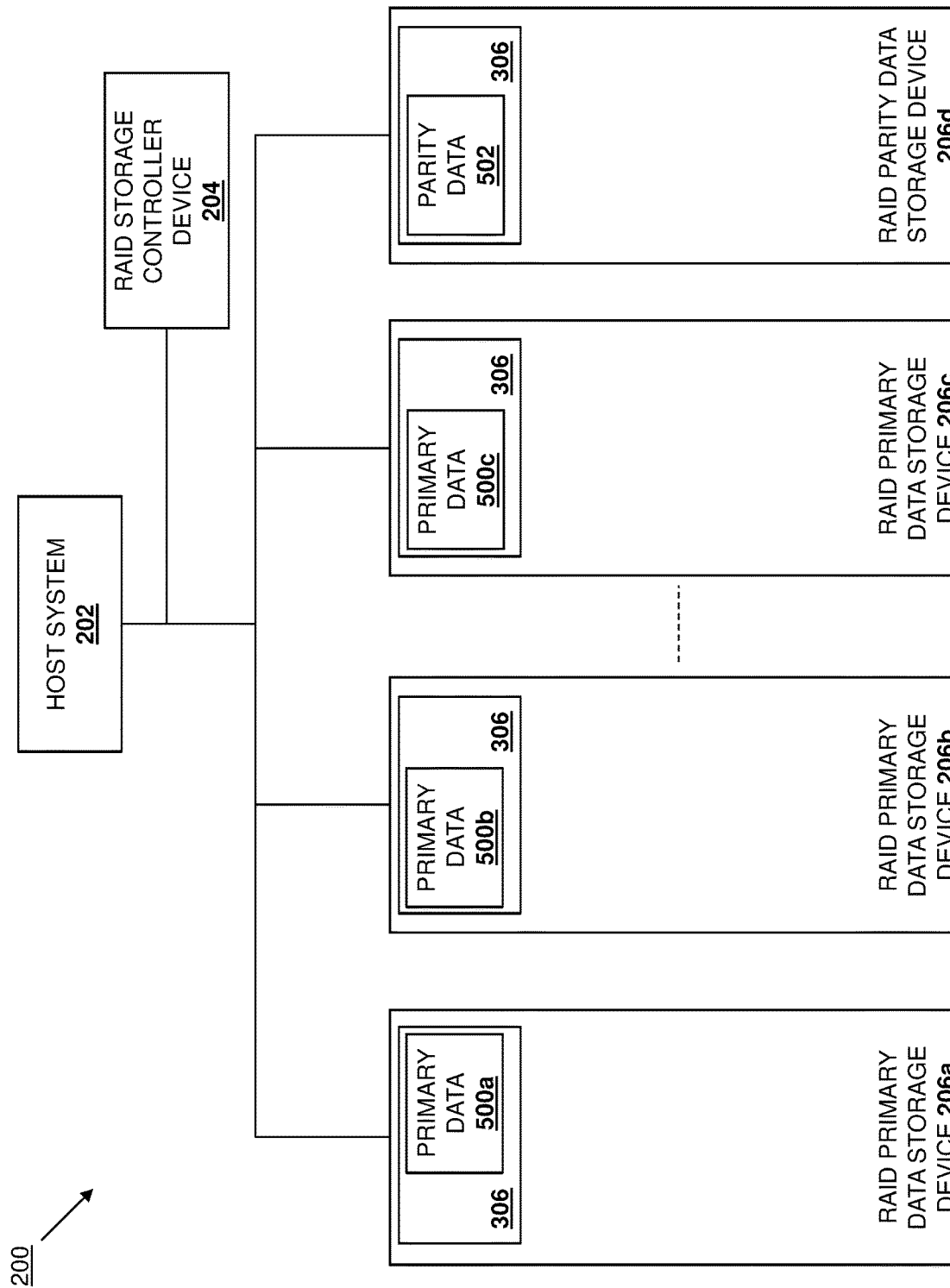
FIG. 5 is a schematic view illustrating an embodiment of the RAID storage system of FIG. 2 operating during the method of FIG. 4.

With reference to FIG. 5, the RAID storage system 200 is illustrated with the RAID primary data storage device 206a storing primary data 500a in its storage subsystem 306, the RAID primary data storage device 206b storing primary data 500b in its storage subsystem 306, and the RAID primary data storage device 206c storing primary data 500c in its storage subsystem 306. While only three RAID primary data storage devices are illustrated and described in the examples provided below, one of skill in the art in possession of the present disclosure will recognize that any number of RAID primary data storage devices may store primary data while remaining within the scope of the present disclosure as well. In addition, the RAID storage system 200 is also illustrated with the RAID parity data storage device 206d storing parity data 502 in its storage subsystem 306, and one of skill in the art in possession of the present disclosure will recognize that the parity data 502 may have been generated via an XOR operation performed on the primary data 500a-500c in the RAID primary data storage devices 206a-206c, and allows for the rebuilding of any primary data stored on any one RAID primary data storage device in the event that primary data/RAID primary data storage device becomes unavailable.

As will also be appreciated by one of skill in the art in possession of the present disclosure, and as discussed in some of the examples provided below, the primary/parity data storage configuration illustrated in FIG. 5 provides primary/parity for a single data strip, and different data strips may have different primary/parity data storage configurations (e.g., in a plurality of RAID storage devices provided in a RAID storage system, a first data stripe may include primary data on first, second, and third RAID storage devices and parity data on a fourth RAID storage device; a second data stripe may include primary data on the second, third, and fourth RAID storage devices and parity data on the first RAID storage device, etc.) As such, while a particular RAID storage system device and data configuration is illustrated for purposes of the examples below, one of skill in the art in possession of the present disclosure will recognize that a variety of device and data configurations will fall within the scope of the present disclosure as well.

Figure 6A:
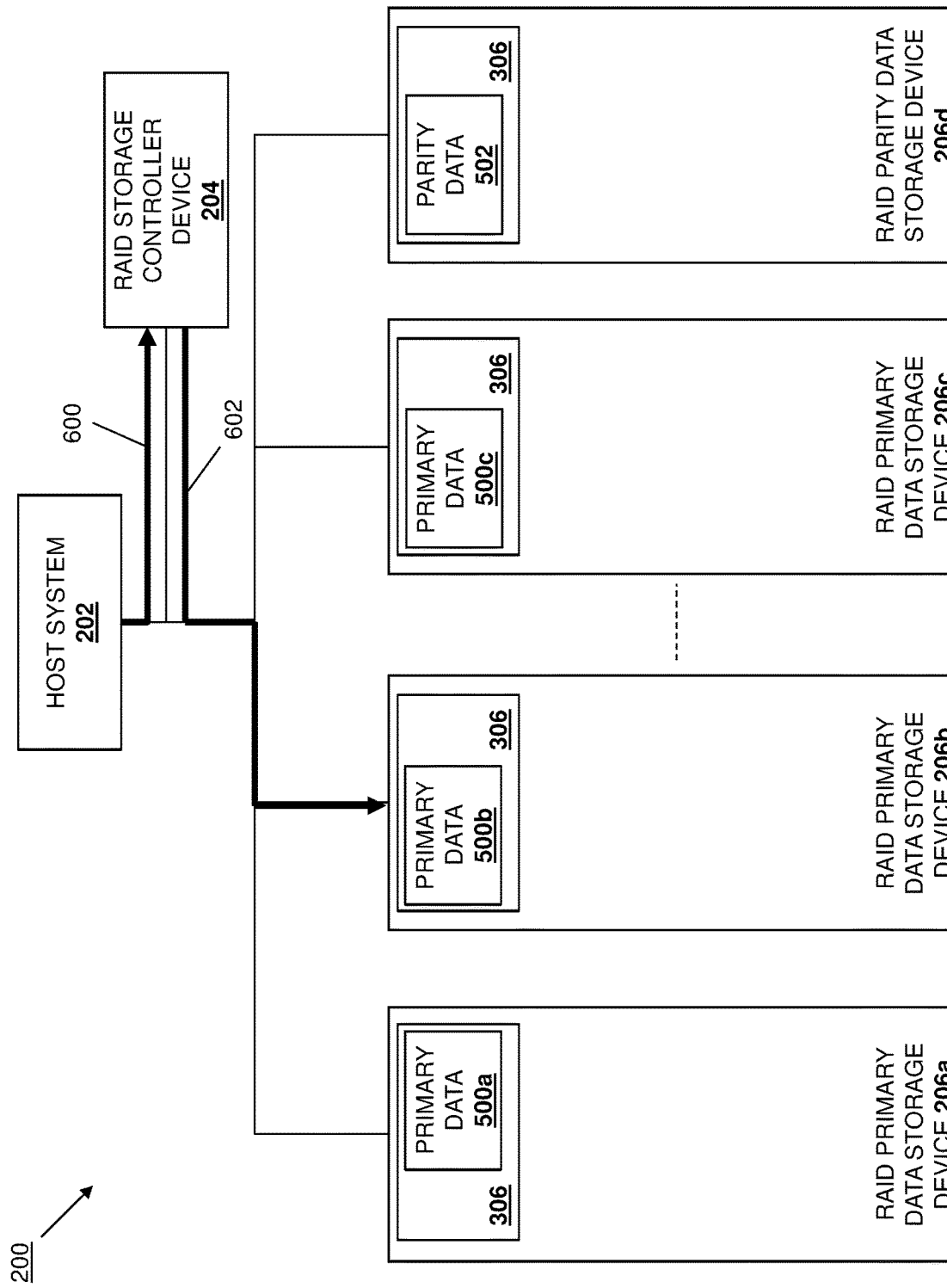
FIG. 6A is a schematic view illustrating an embodiment of the RAID storage system of FIG. 2 operating during the method of FIG. 4.
Figure 7A:
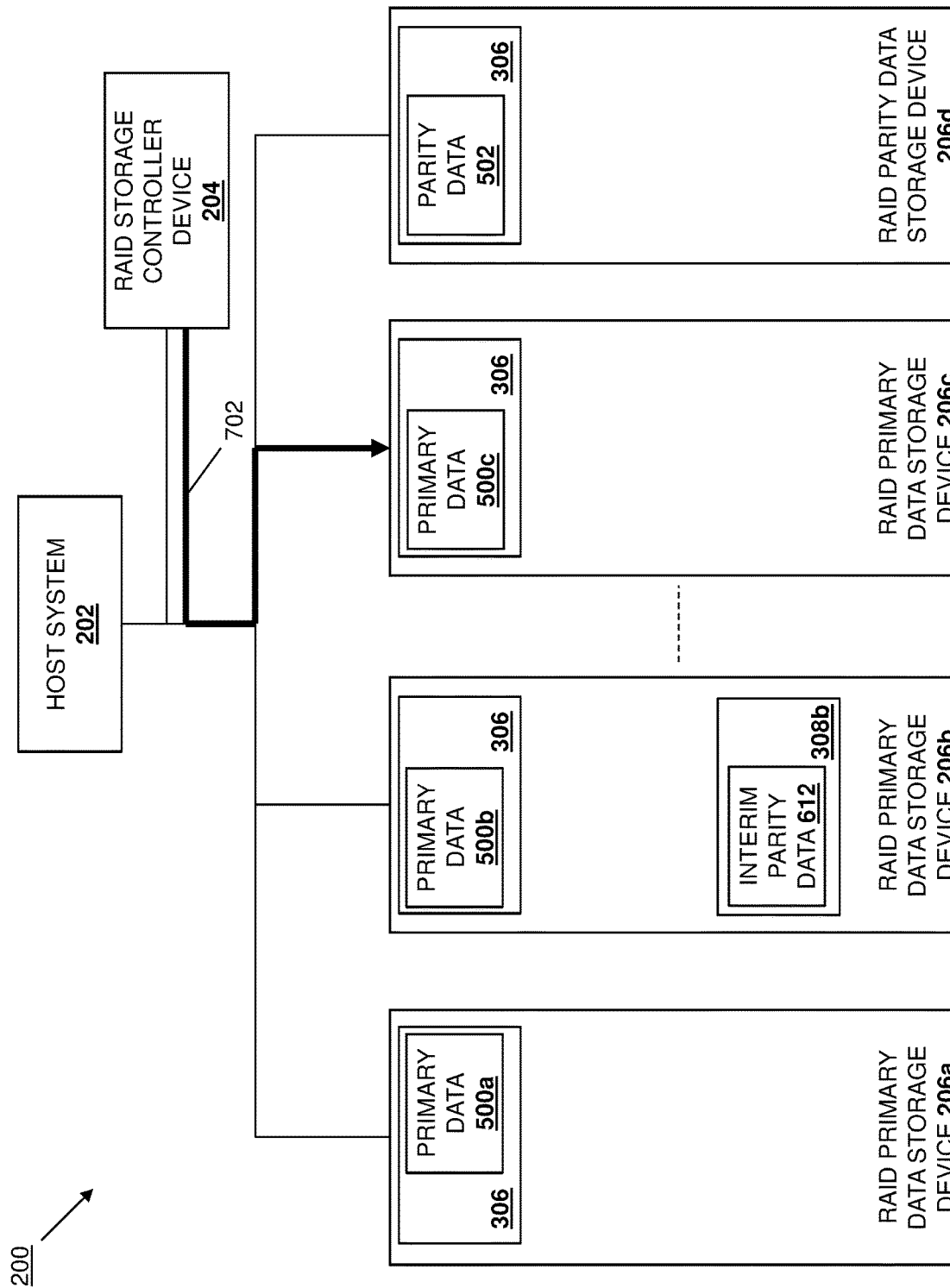
FIG. 7A is a schematic view illustrating an embodiment of the RAID storage system of FIG. 2 operating during the method of FIG. 4.

The method 400 begins at block 402 where RAID primary data storage devices receive respective commands from a RAID storage controller device. In an embodiment, at block 402, the RAID storage controller device 204 may generate and transmit commands to RAID primary data storage devices. With reference to FIG. 6A, the host system 202 may generate a write command 600 that instructs the writing of primary data that is located on the host system 200 to the RAID primary data storage devices 206a-206c, and may transmit that write command 600 to the RAID storage controller device 204. As will be appreciated by one of skill in the art in possession of the present disclosure, the generation and/or transmission of the write command 600 by the host system 202 to the RAID storage controller device 204 at block 402 may include a variety of control plane communications between the host system 202 and the RAID storage controller device 204 that have been omitted for clarity of discussion. As such, at block 402, the RAID storage controller device 204 may receive the write command 600 and, in response to that write command 600, may generate commands and transmit the commands to a subset of the RAID primary data storage devices 206a-c. FIG. 6A illustrates the RAID storage controller device 204 transmitting a command 602 to the RAID primary data storage device 206b, while FIG. 7A illustrates the RAID storage controller device 204 transmitting a command 702 to the RAID primary data storage device 206c. As will be appreciated by one of skill in the art in possession of the present disclosure, the commands 602 and 702 may be transmitted to the RAID primary data storage devices 206b and 206c at substantially the same time, although sequentially transmission of the commands 602 and 702 will fall within the scope of the present disclosure as well.

In some embodiments, the commands 602 and 702 may be multi-operation commands like those described in U.S. patent application Ser. No. 16/585,296, filed on Sep. 27, 2019. For example, the commands 602 and 702 may be NVMe WRITE WITH XOR multi-operation commands that are configured to cause the RAID primary data storage devices 206b and 206c to perform the multiple operations described below. However, while described as providing multi-operation commands at block 402, one of skill in the art in possession of the present disclosure will recognize that the multiple operations performed by the RAID primary data storage device 206b and 206c discussed below may be performed in response to respective commands transmitted by the RAID storage controller device 204 while remaining within the scope of the present disclosure as well. In a specific example, the transmission of the commands 602 and 702 may include the RAID storage controller device 204 providing the commands 602 and 702 in respective submission queues that are included in the communication systems 310 in the RAID primary data storage devices 206b/300 and 206c/300, and then ringing doorbells for the RAID primary data storage devices 206b/300 and 206c/300. However, one of skill in the art in possession of the present disclosure will recognize that the commands 602 and 702 may be provided to the RAID primary data storage devices 206b and 206c in a variety of manners that will fall within the scope of the present disclosure as well.

As such, in some examples the respective RAID storage engine 304 in the RAID primary data storage devices 206b/300 and 206c/300 may respond to the ringing of their doorbells by accessing the commands 602 and 702, respectively, in the submission queue in their communication systems 310. In embodiments in which the commands 602 and 702 are multi-operation commands, the respective RAID storage engine 304 in the RAID primary data storage devices 206b/300 and 206c/300 may identify the multiple operations instructed by those commands 602 and 702 (as described in U.S. patent application Ser. No. 16/585,296, filed on Sep. 27, 2019.) However, while two RAID primary data storage devices are illustrated and described below as receiving the commands 602 and 702 that causes them to update their primary data 500*b* and 500*c*, one of skill in the art in possession of the present disclosure will recognize how more RAID primary storage devices may receive similar commands at block 402 while remaining within the scope of the present disclosure as well.

Figure 6B:
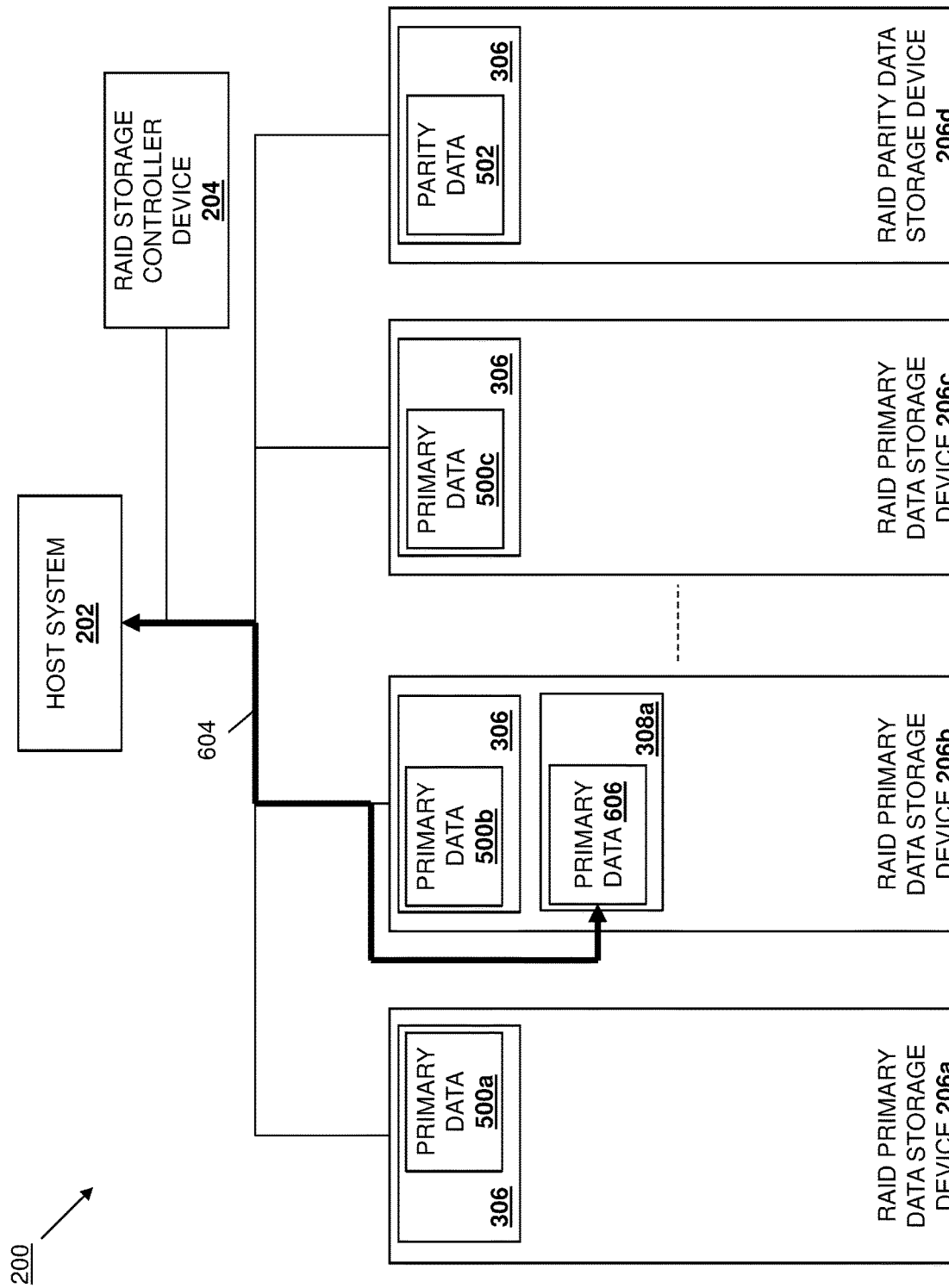
FIG. 6B is a schematic view illustrating an embodiment of the RAID storage system of FIG. 2 operating during the method of FIG. 4.

The method 400 then proceeds to block 404 where the RAID primary data storage devices retrieve respective primary data from a host system. With reference to FIG. 6B, in an embodiment of block 404 and based on the command 602 (which is a multi-operation command as described above in this embodiment), the RAID storage engine 304 in the RAID primary data storage device 206*b*/300 may operate to perform a Direct Memory Access (DMA) operation 604 that accesses primary data 606 that is stored on the host system 202 (e.g., in a memory system or storage system included on the host system 202) and writes that primary data 606 to its first buffer subsystem 308*a* (e.g., in a device buffer in the RAID primary data storage device 206*b* as described in the example above). As will be appreciated by one of skill in the art in possession of the present disclosure, the primary data 606 (e.g., "new" data) may be an update to the primary data 500*b* (e.g., "old" data) stored in the storage subsystem 306 in the RAID primary data storage device 206*b*, although other primary data writing scenarios will fall within the scope of the present disclosure as well.

Figure 7B:
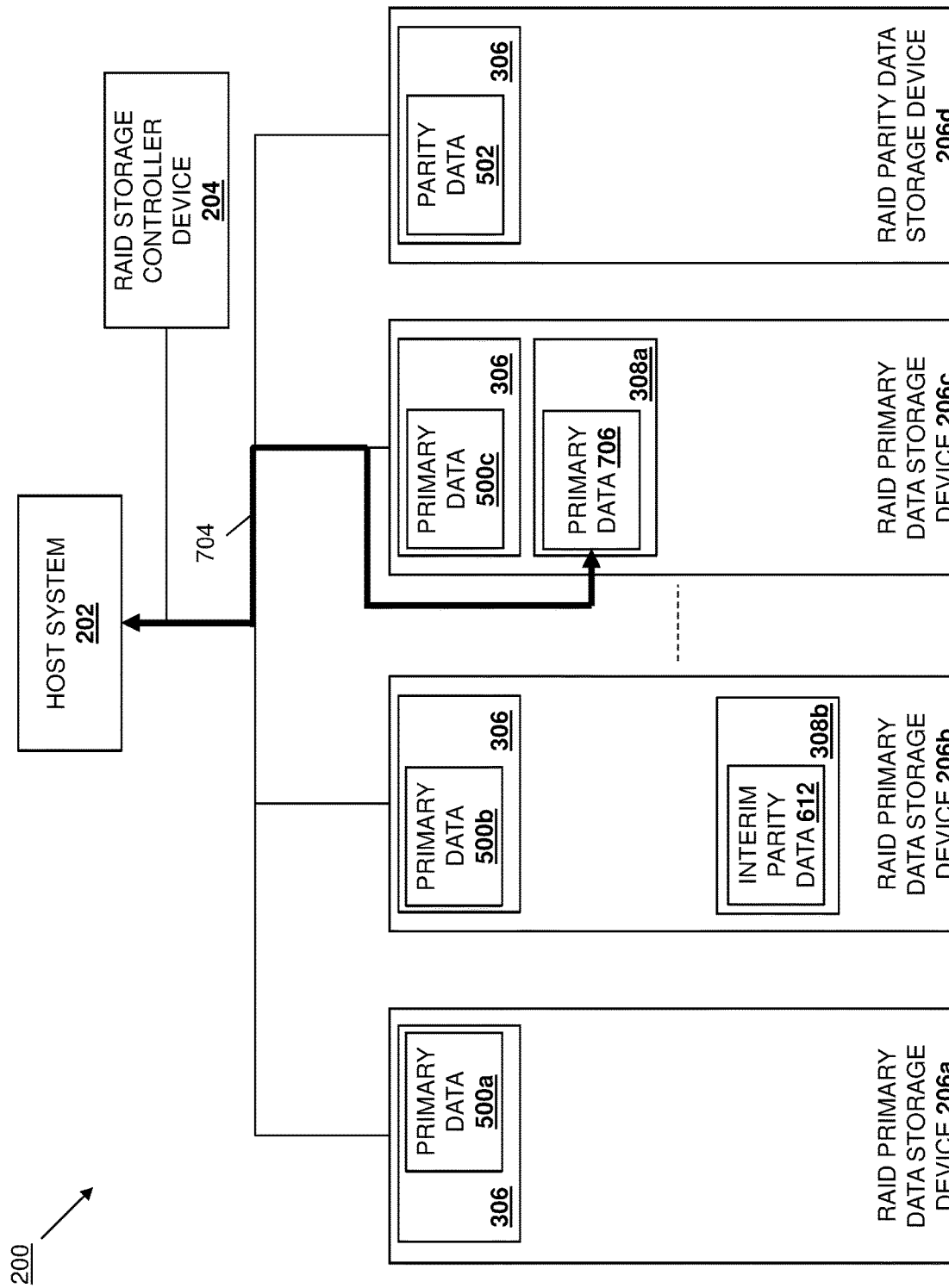
FIG. 7B is a schematic view illustrating an embodiment of the RAID storage system of FIG. 2 operating during the method of FIG. 4.

With reference to FIG. 7B, in an embodiment of block 404 and based on the command 702 (which is a multi-operation command as described above in this embodiment), the RAID storage engine 304 in the RAID primary data storage device 206*c*/300 may operate to perform a Direct Memory Access (DMA) operation 704 that accesses primary data 706 that is stored on the host system 202 (e.g., in a memory system or storage system included on the host system 202) and writes that primary data 706 to its first buffer subsystem 308*a* (e.g., in a device buffer in the RAID primary data storage device 206*c* as described in the example above). As will be appreciated by one of skill in the art in possession of the present disclosure, the primary data 706 (e.g., "new" data) may be an update to the primary data 500*c* (e.g., "old" data) stored in the storage subsystem 306 in the RAID primary data storage device 206*c*, although other primary data writing scenarios will fall within the scope of the present disclosure as well.

Figure 6C:
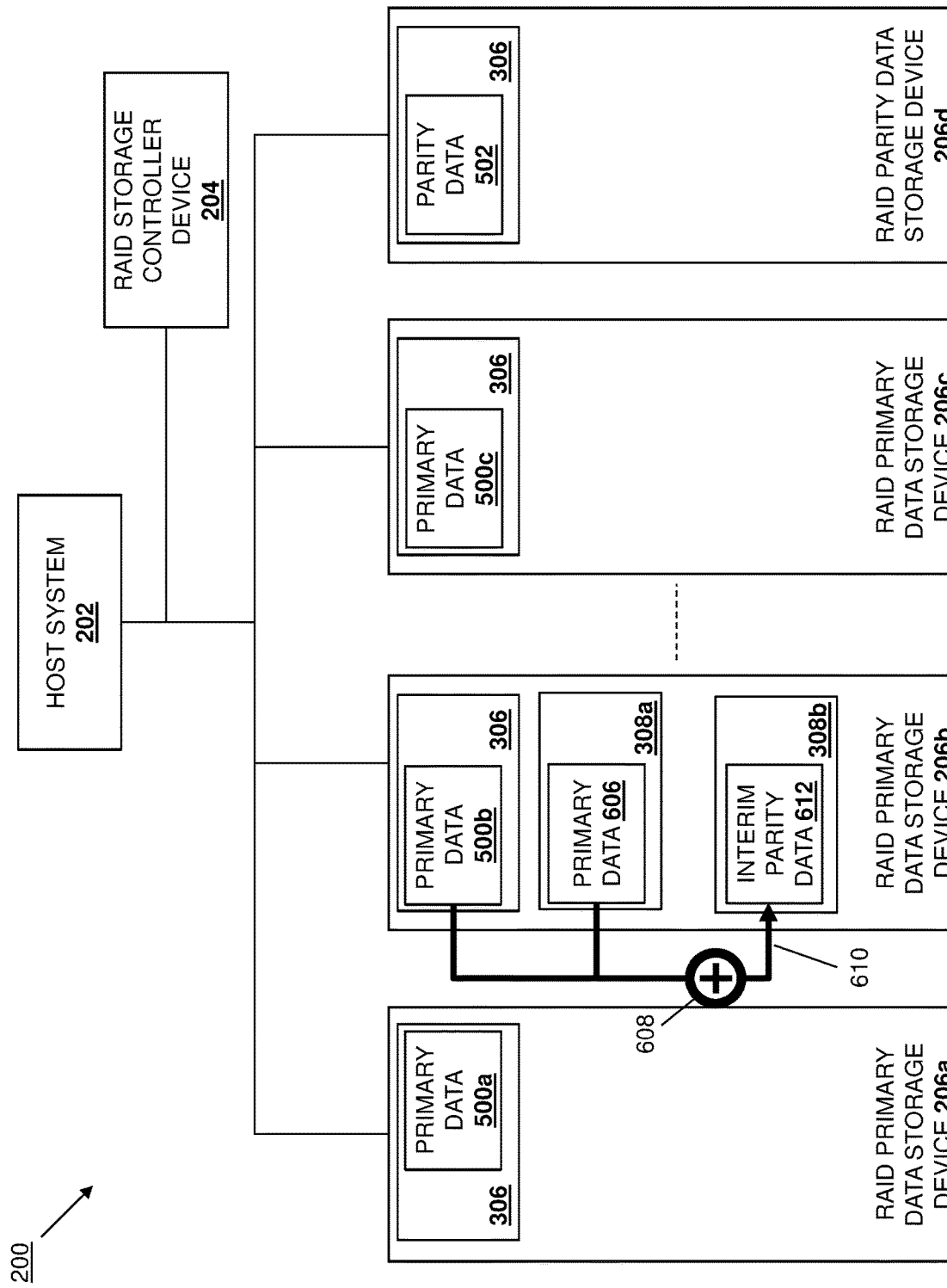
FIG. 6C is a schematic view illustrating an embodiment of the RAID storage system of FIG. 2 operating during the method of FIG. 4.
Figure 6D:
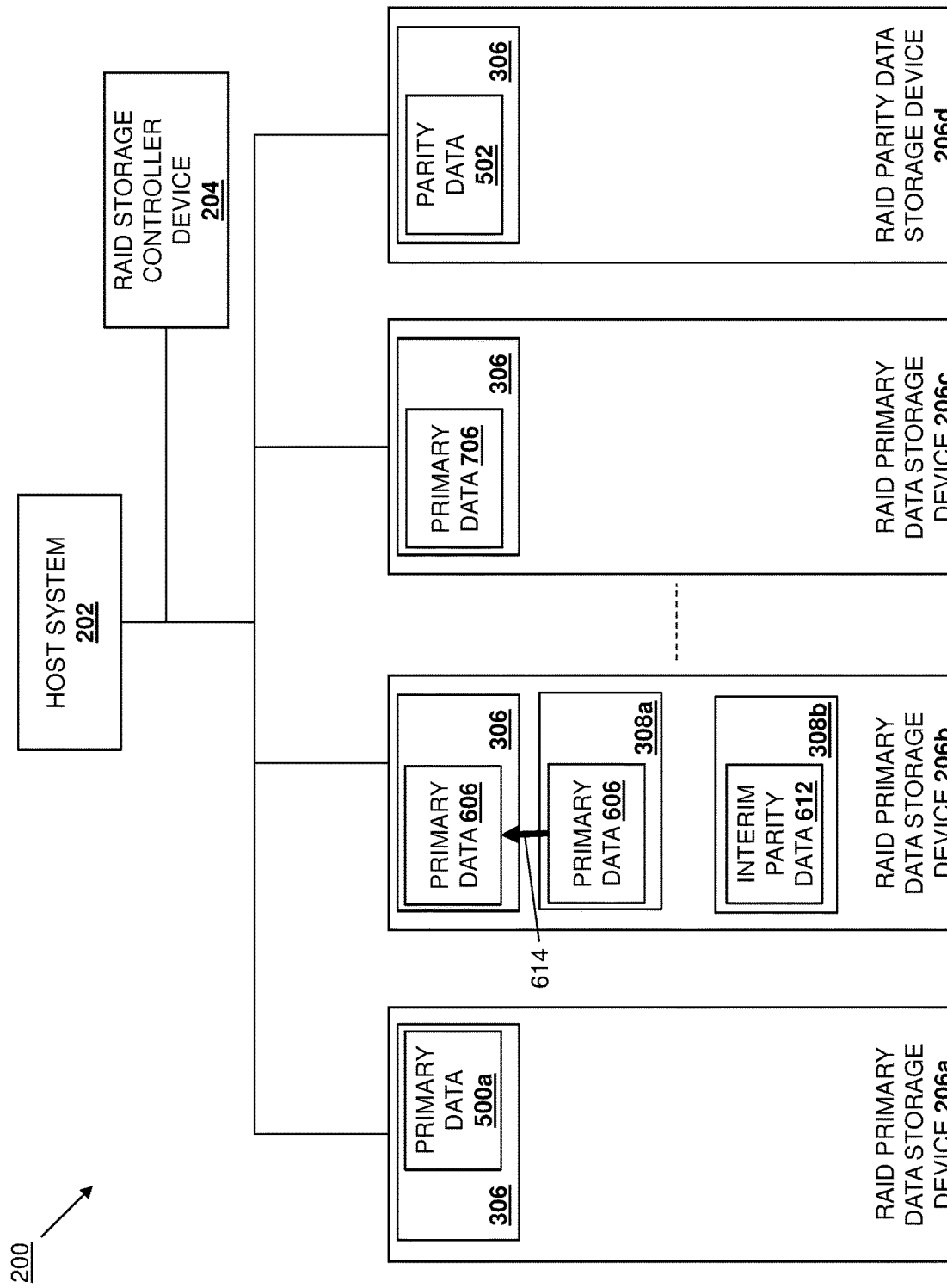
FIG. 6D is a schematic view illustrating an embodiment of the RAID storage system of FIG. 2 operating during the method of FIG. 4.

The method 400 then proceeds to block 406 where the RAID primary data storage devices perform respective XOR operations on respective primary data to produce respective interim parity data, and write the respective interim parity data to their respective buffer subsystems. With reference to FIG. 6C, in an embodiment of block 406 and based on the command 602 (which is a multi-operation command as described above in this embodiment), the RAID storage engine 304 in the RAID primary data storage device 206*b*/300 may operate to perform an XOR operation 608 using the primary data 500*b* in its storage subsystem 306 and the primary data 606 in its first buffer subsystem 308*a* in order to produce interim parity data 612, and then write that interim parity data 612 to its second buffer subsystem 308*b* (e.g., a CMB). Further still, FIG. 6D illustrates how the RAID storage engine 304 in the RAID parity data storage device 206*b* may perform an overwrite operation 614 to overwrite the primary data 500*b* in its storage subsystem 306 with the primary data 606 in its first buffer subsystem 308*a* based on the command 602 (which is a multi-operation command as described above in this embodiment), thus updating that primary data stored by the RAID primary data storage device 206*b*.

Figure 6E:
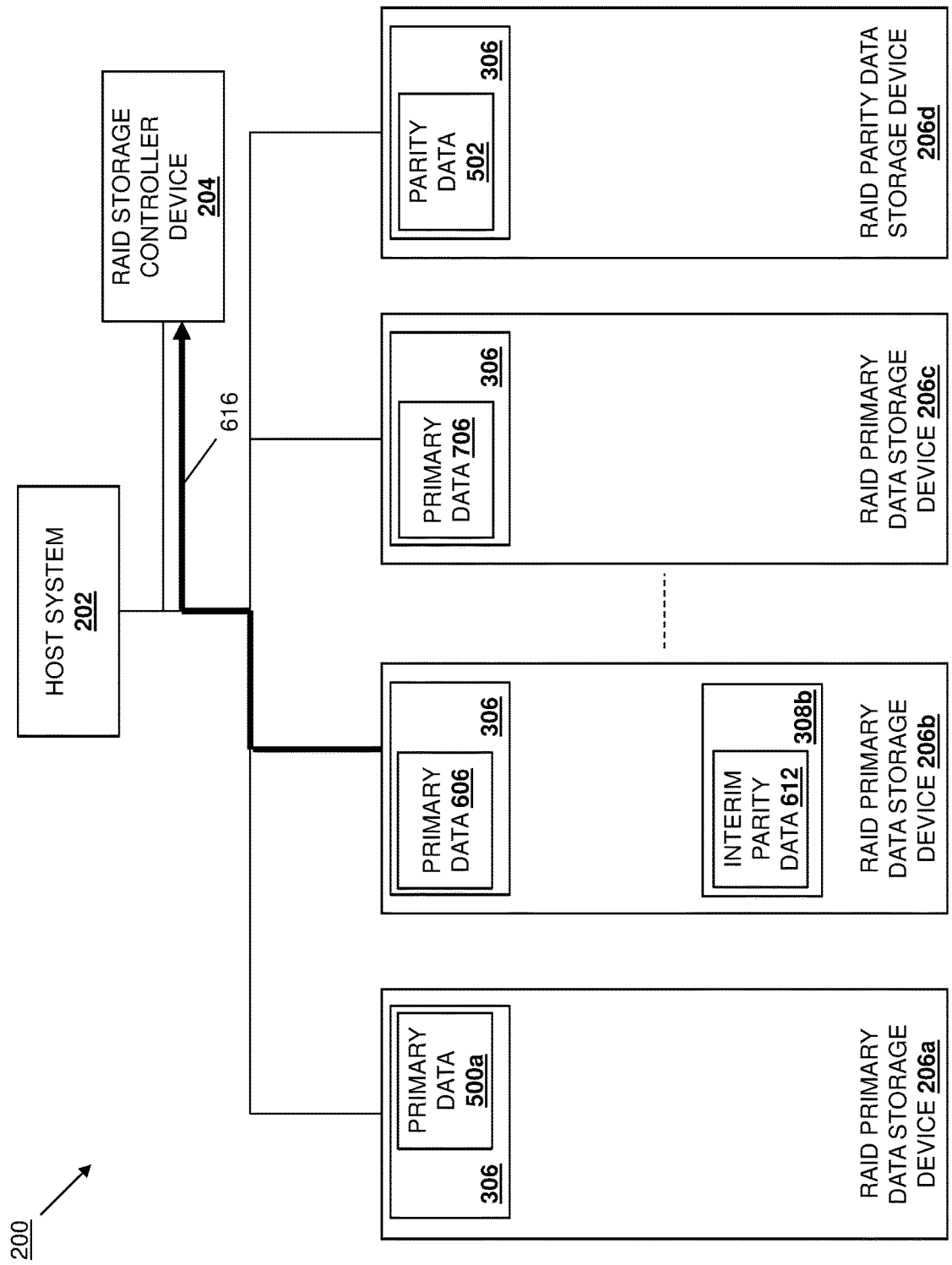
FIG. 6E is a schematic view illustrating an embodiment of the RAID storage system of FIG. 2 operating during the method of FIG. 4.
Figure 7C:
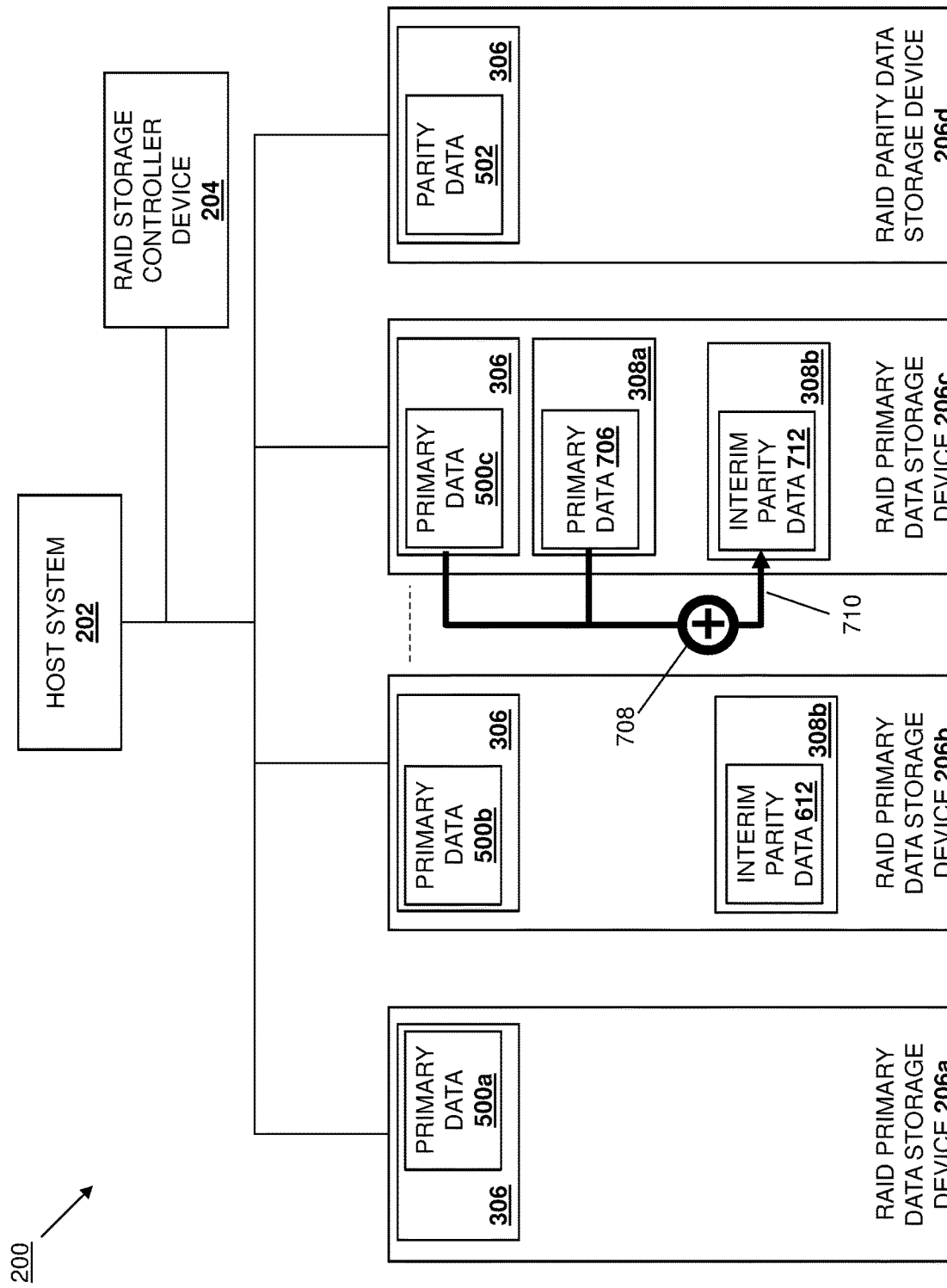
FIG. 7C is a schematic view illustrating an embodiment of the RAID storage system of FIG. 2 operating during the method of FIG. 4.
Figure 7D:
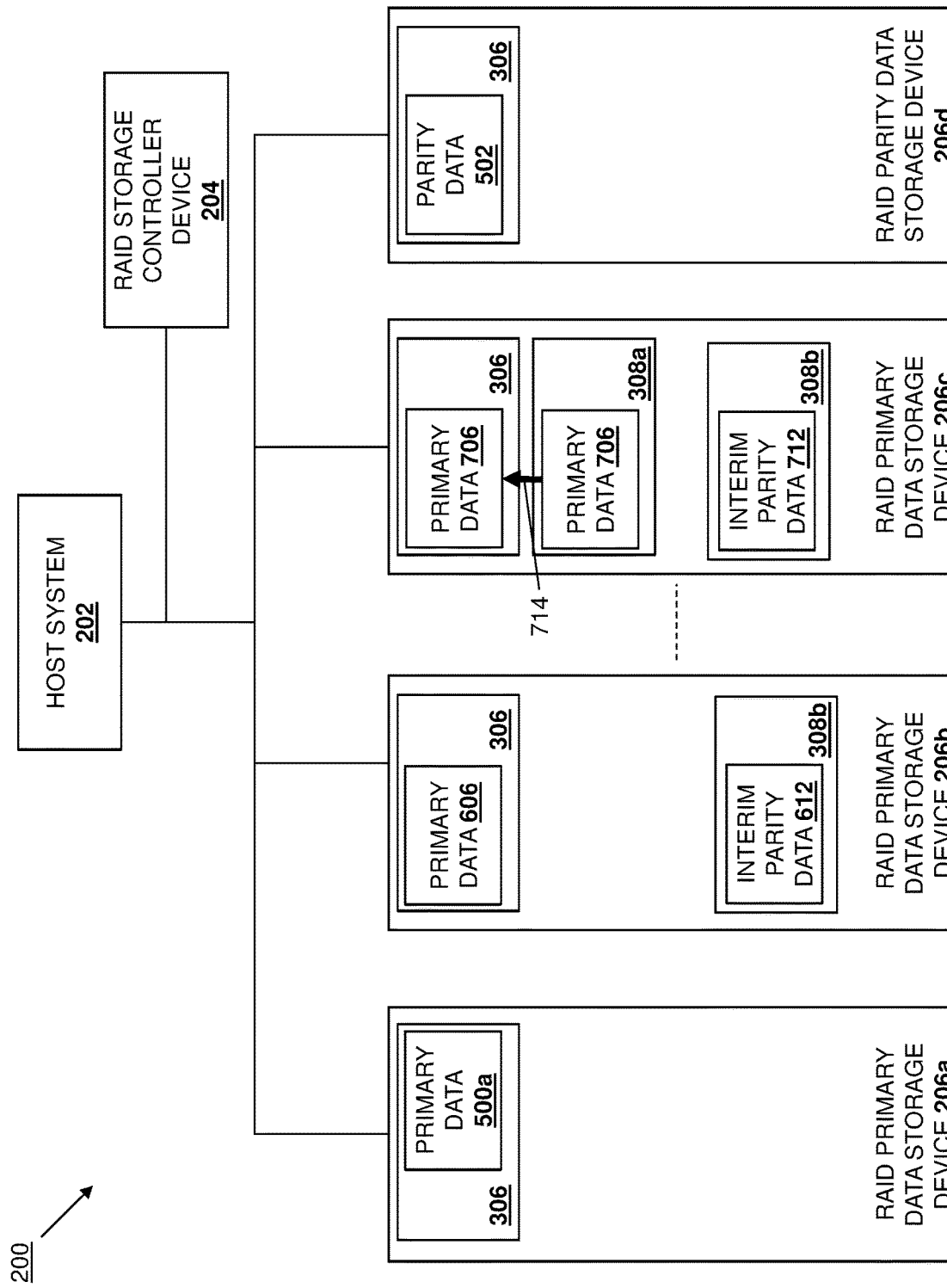
FIG. 7D is a schematic view illustrating an embodiment of the RAID storage system of FIG. 2 operating during the method of FIG. 4.

With reference to FIG. 7C, in an embodiment of block 406 and based on the command 702 (which is a multi-operation command as described above in this embodiment), the RAID storage engine 304 in the RAID primary data storage device 206*c*/300 may operate to perform an XOR operation 708 using the primary data 500*c* in its storage subsystem 306 and the primary data 706 in its first buffer subsystem 308*a* in order to produce interim parity data 712, and then write that interim parity data 712 to its second buffer subsystem 308*b* (e.g., a CMB). Further still, FIG. 7D illustrates how the RAID storage engine 304 in the RAID parity data storage device 206*c* may perform an overwrite operation 714 to overwrite the primary data 500*c* in its storage subsystem 306 with the primary data 706 in its first buffer subsystem 308*a* based on the command 702 (which is a multi-operation command as described above in this embodiment), thus updating that primary data stored by the RAID primary data storage device 206*c*. As will be appreciated by one of skill in the art in possession of the present disclosure, the commands 602 and 702 may be executed by the respective RAID primary data storage devices 206*b* and 206*c* in parallel, simultaneously, and/or at substantially the same time (as illustrated by the updated primary data 606 and 706 in both the RAID primary data storage devices 206*b* and 206*c* in FIGS. 6D, 6E, 7D, and 7E), although sequential execution of the commands 602 and 702 the respective RAID primary data storage devices 206*b* and 206*c* will fall within the scope of the present disclosure as well.

With reference to FIG. 6E, following completion of the operations associated with the command 602 (e.g., multiple operations associated with a multi-operation command as discussed above, following each operation associated with respective commands, etc.) the RAID storage engine 304 in the RAID primary data storage device 206*b*/300 may generate and transmit a completion message 616 to the RAID storage controller device 204. For example, the RAID storage engine 304 in the RAID primary data storage device 206*b*/300 may generate the completion message 616 and provide that completion message in a completion queue in its communication system 310, and then generate an interrupt to the RAID storage controller device 204 that causes the RAID storage controller device 204 to access that completion queue and retrieve the completion message. However, while a specific technique for transmitting the completion message is described, one of skill in the art in possession of the present disclosure will recognize that completion messages may be transmitted using a variety of other techniques while remaining within the scope of the present disclosure.

Figure 7E:
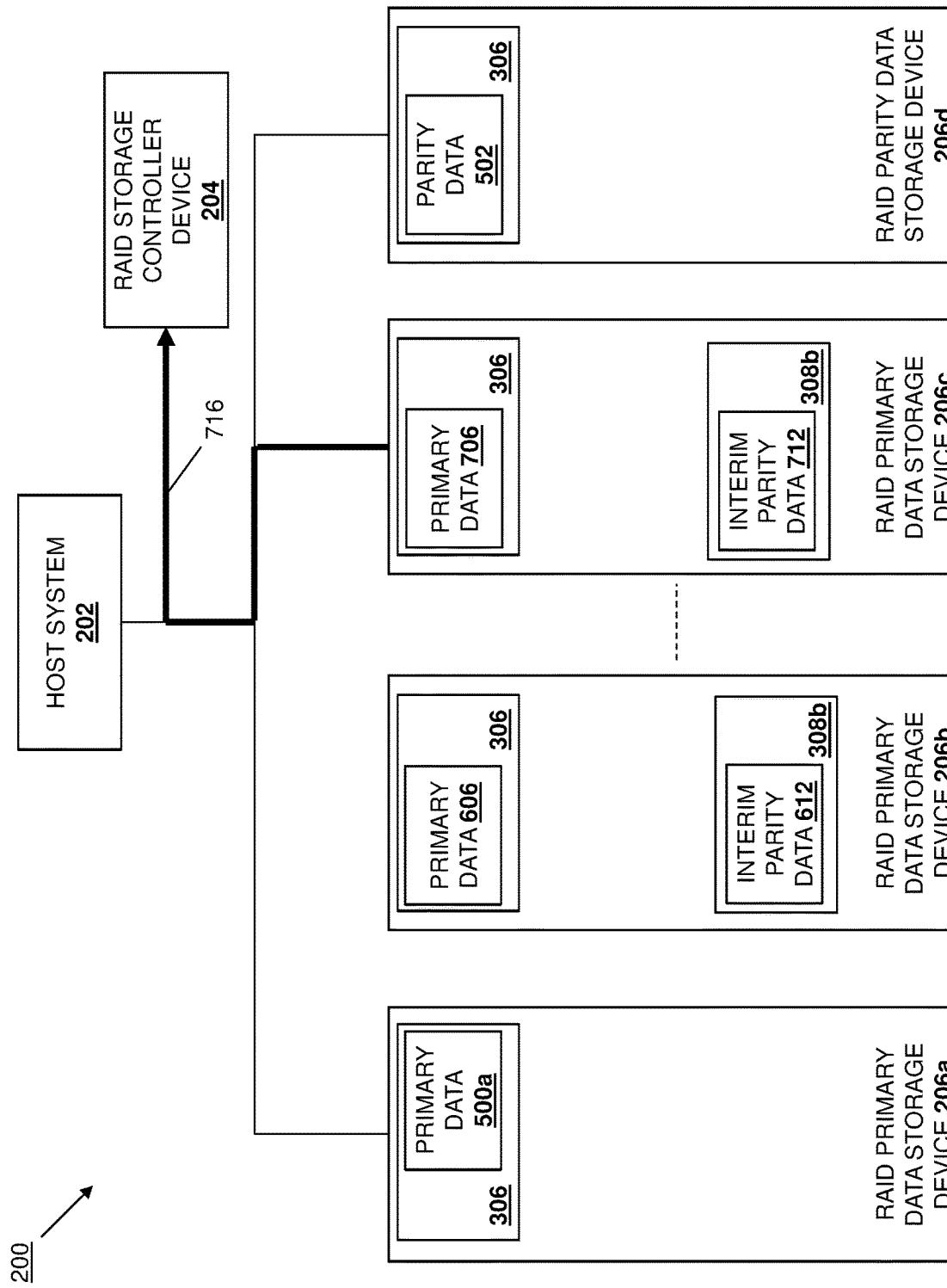
FIG. 7E is a schematic view illustrating an embodiment of the RAID storage system of FIG. 2 operating during the method of FIG. 4.

Similarly, with reference to FIG. 7E, following completion of the operations associated with the command 702 (e.g., multiple operations associated with a multi-operation command as discussed above, following each operation associated with respective commands, etc.) the RAID storage engine 304 in the RAID primary data storage device 206*c*/300 may generate and transmit a completion message 716 to the RAID storage controller device 204. For example, the RAID storage engine 304 in the RAID primary data storage device 206*c*/300 may generate the completion message 716 and provide that completion message in a completion queue in its communication system 310, and then generate an interrupt to the RAID storage controller device 204 that causes the RAID storage controller device 204 to access that completion queue and retrieve the completion message. However, while a specific technique for transmitting the completion message is described, one of skill in the art in possession of the present disclosure will recognize that completion messages may be transmitted using a variety of other techniques while remaining within the scope of the present disclosure. Furthermore, one of skill in the art in possession of the present disclosure will recognize that other RAID primary data storage devices experiencing similar primary data updates (as discussed above) may transmit similar completion messages to the RAID storage controller device 204 following their update operations (e.g., the multiple operations in the WRITE WITH XOR multi-operation command discussed above), and the RAID storage controller device 204 may wait to receive completion messages from each RAID primary data storage device experiencing an update prior to proceeding with the method 400.

Figure 8A:
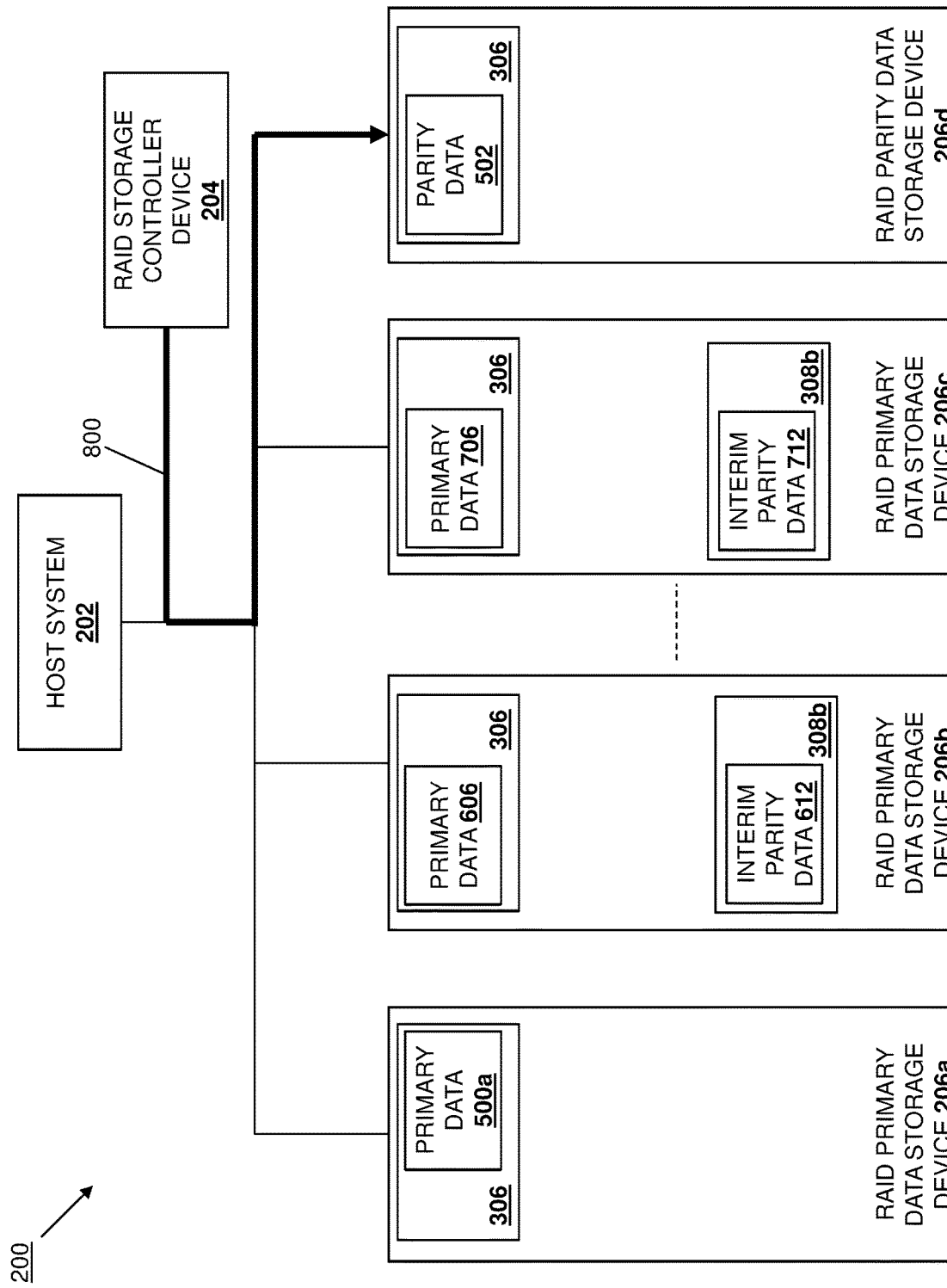
FIG. 8A is a schematic view illustrating an embodiment of the RAID storage system of FIG. 2 operating during the method of FIG. 4.

The method 400 then proceeds to block 408 where the RAID parity data storage device receives a command from the RAID storage controller device. In an embodiment, at block 408, the RAID storage controller device 204 may generate and transmit a command to a RAID parity data storage device. For example, and as discussed above, the RAID storage controller device 204 may determine that completion messages from each RAID primary data storage device experiencing an update have been received as discussed above and, in response, at block 404 the RAID storage controller device 204 may generate a command 800 and transmit the command 800 to the RAID parity data storage device 206d, as illustrated in FIG. 8A.

Similarly as discussed above, the command 800 may be a multi-operation command like those described in U.S. patent application Ser. No. 16/585,296, filed on Sep. 27, 2019. For example, the command 800 may be an NVMe WRITE PARITY multi-operation command that is configured to cause the RAID parity data storage device 206d to perform the multiple operations described below. However, while described as providing a multi-operation command at block 408, one of skill in the art in possession of the present disclosure will recognize that the multiple operations performed by the RAID parity data storage device 206d discussed below may be performed in response to respective commands transmitted by the RAID storage controller device 204 while remaining within the scope of the present disclosure as well. In a specific example, the transmission of the command 800 may include the RAID storage controller device 204 providing the command 800 in a submission queue that is included in the communication system 310 in the RAID parity data storage device 206d/300, and then ringing a doorbell for the RAID parity data storage device 206d/300. However, one of skill in the art in possession of the present disclosure will recognize that the command 800 may be provided to the RAID parity data storage device 206d in a variety of manners that will fall within the scope of the present disclosure as well.

As such, in some examples the RAID storage engine 304 in the RAID parity data storage device 206d/300 may respond to the ringing of its doorbell by accessing the command 800 in the submission queue in its communication system 310. In embodiments in which the command 800 is a multi-operation command, the RAID storage engine 304 in the RAID parity data storage device 206d/300 may identify the multiple operations instructed by that command 800 (as described in U.S. patent application Ser. No. 16/585,296, filed on Sep. 27, 2019.)

Figure 8B:
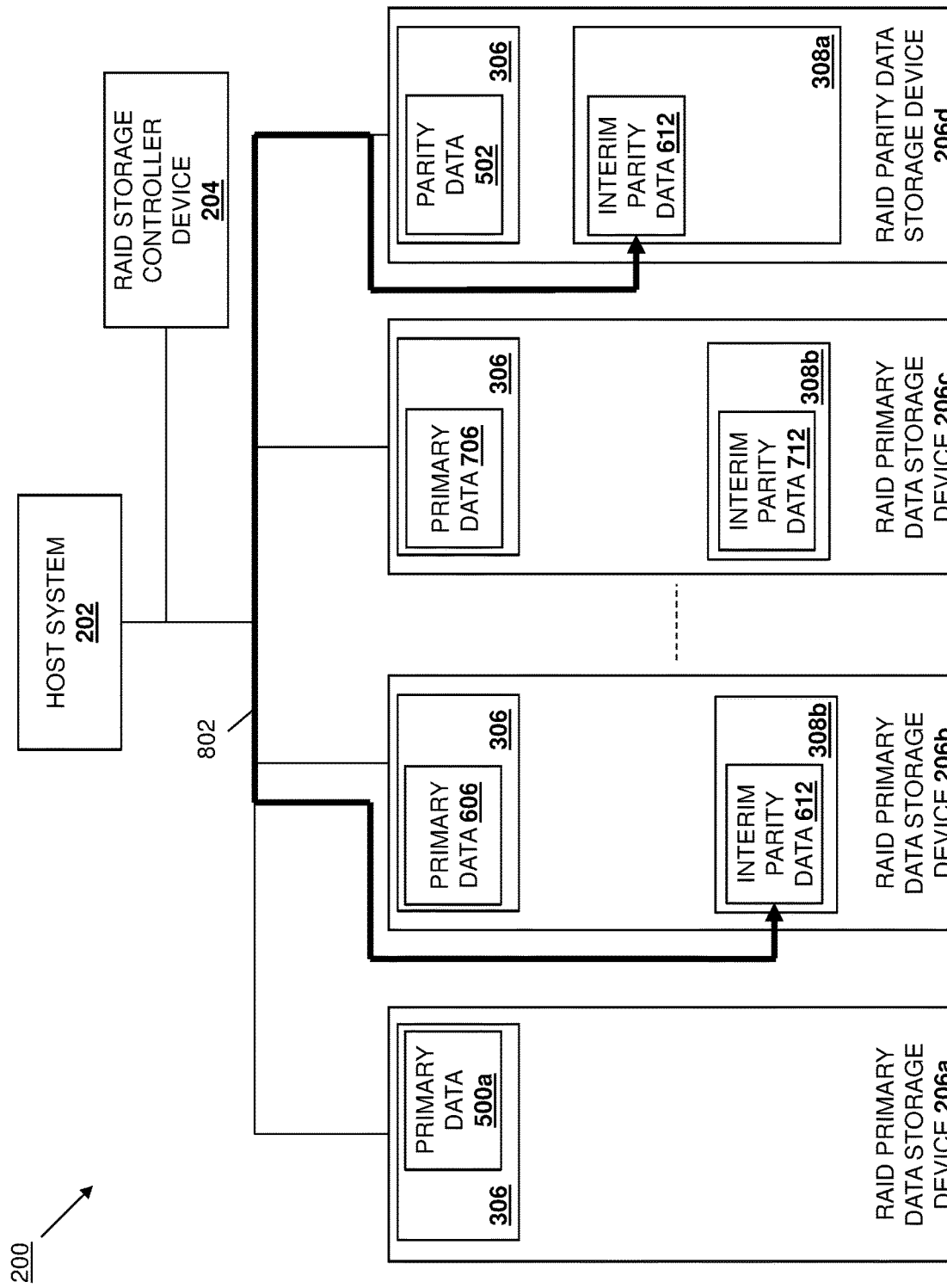
FIG. 8B is a schematic view illustrating an embodiment of the RAID storage system of FIG. 2 operating during the method of FIG. 4.
Figure 8C:
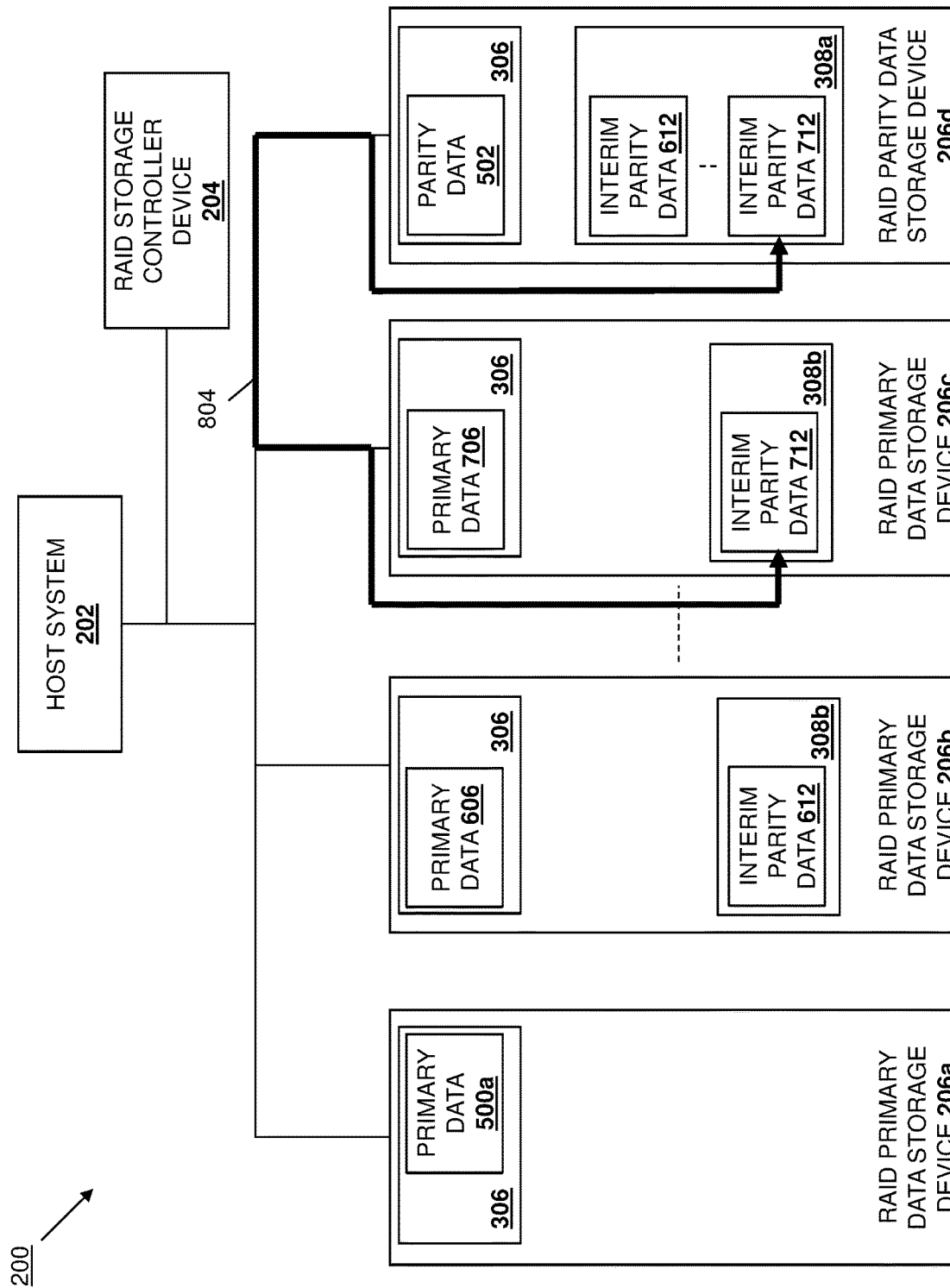
FIG. 8C is a schematic view illustrating an embodiment of the RAID storage system of FIG. 2 operating during the method of FIG. 4.

The method 400 then proceeds to block 410 where the RAID parity data storage device retrieves respective interim parity data from respective RAID primary data storage devices. With reference to FIG. 8B, in an embodiment of block 410 and based on the command 800 (which is a multi-operation command as described above in this embodiment), the RAID storage engine 304 in the RAID parity data storage device 206d/300 may operate to perform a DMA operation 802 to retrieve the interim parity data 612 from the second buffer subsystem 308b in the RAID primary data storage device 206b, and write that interim parity data 612 to its first buffer subsystem 308a (e.g., in a device buffer in the RAID primary data storage device 206b as described in the example above). With reference to FIG. 8C, in an embodiment of block 410 and based on the command 800 (which is a multi-operation command as described above in this embodiment), the RAID storage engine 304 in the RAID parity data storage device 206d/300 may operate to perform a DMA operation 804 to retrieve the interim parity data 712 from the second buffer subsystem 308b in the RAID primary data storage device 206c, and write that interim parity data 712 to its first buffer subsystem 308a (e.g., in a device buffer in the RAID primary data storage device 206b as described in the example above). As will be appreciated by one of skill in the art in possession of the present disclosure, the DMA operations 704 and 804 must be performed by the RAID parity data storage device 206d sequentially. As such, as the number of RAID primary data storage devices experiencing a primary data update increases, so does the number of sequential DMA operations that are necessary to retrieve the respective interim parity data that results (as discussed above), thus increasing the time needed to update the parity data 502 in the RAID parity data storage device 206d as discussed below.

Figure 8D:
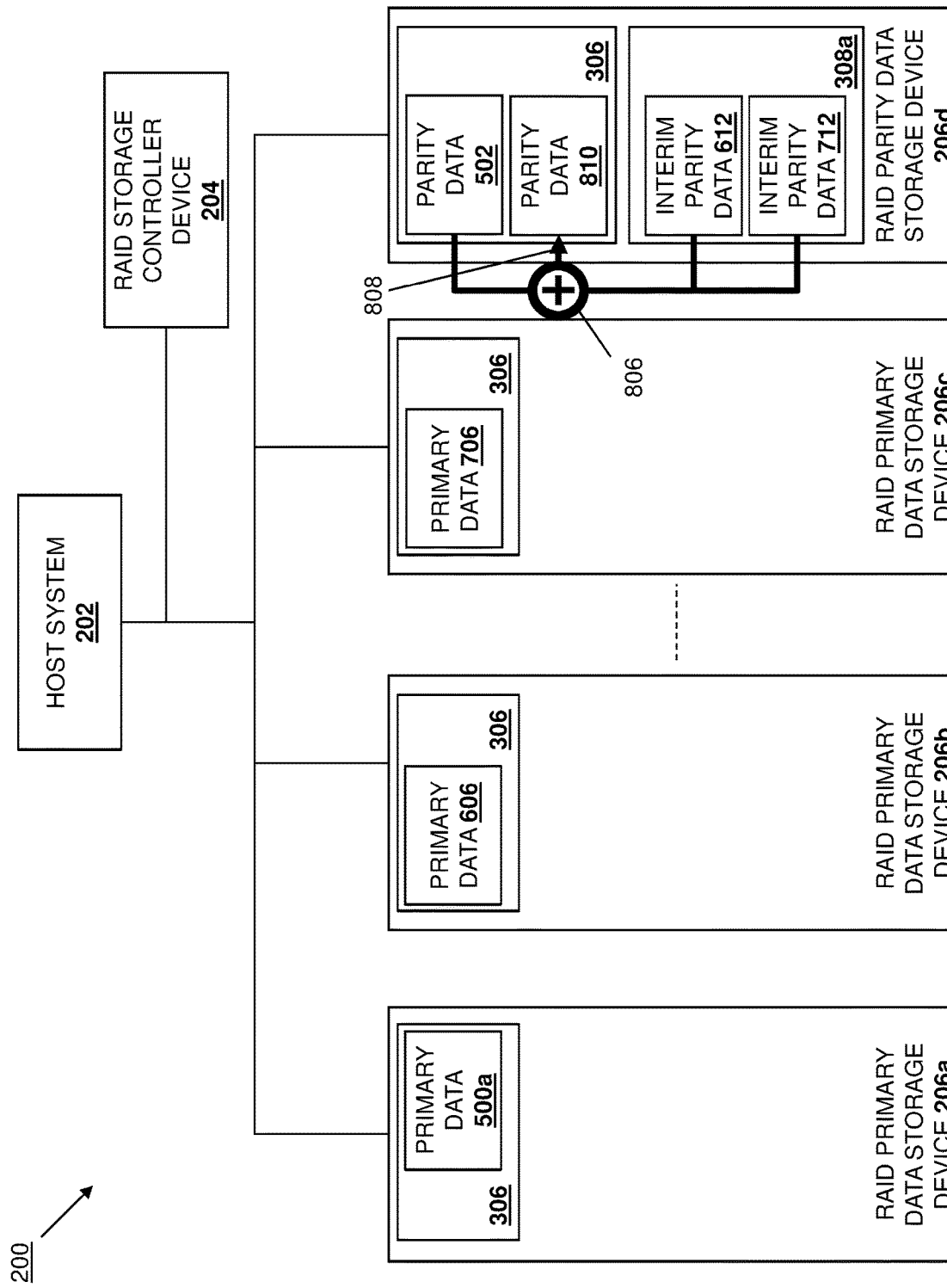
FIG. 8D is a schematic view illustrating an embodiment of the RAID storage system of FIG. 2 operating during the method of FIG. 4.

The method 400 then proceeds to block 412 where the RAID parity data storage device performs an XOR operation on current parity data and the interim parity data to produce updated parity data, and overwrites the current parity data with the updated parity data. With reference to FIG. 8D, in an embodiment of block 412 and based on the command 800 (which is a multi-operation command as described above in this embodiment), the RAID storage engine 304 in the RAID parity data storage device 206d/300 may operate to perform an XOR operation 806 using the parity data 502 in its storage subsystem 306 and the interim parity data 612 and 712 in its first buffer subsystem 308a in order to produce parity data 810, and then perform an overwrite operation 808 to overwrite the parity data 502 with the parity data 810 in its storage subsystem 306 (as illustrated by the replacement of parity data 502 from FIG. 8D with parity data 810 in FIG. 8E.) As will be appreciated by one of skill in the art in possession of the present disclosure, the XOR operation 806 performed using the parity data 502 and the interim parity data 612 and 712 stored in the second buffer subsystem 308b may include any interim parity data provided by any RAID primary data storage device experiencing a primary data update as discussed above.

Figure 8E:
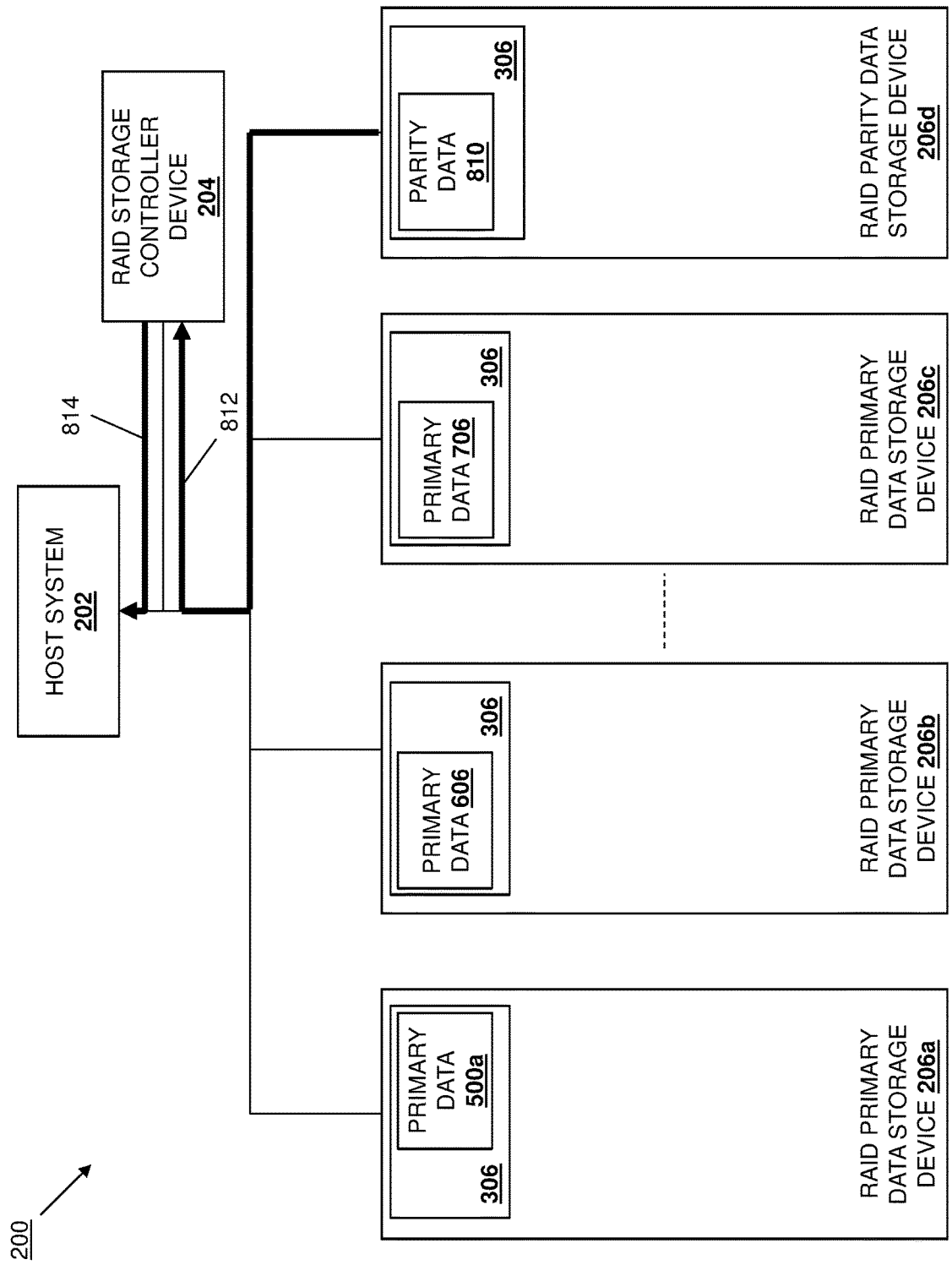
FIG. 8E is a schematic view illustrating an embodiment of the RAID storage system of FIG. 2 operating during the method of FIG. 4.

With reference to FIG. 8E, following completion of the operations associated with the command 800 (e.g., multiple operations associated with a multi-operation command as discussed above, following each operation associated with respective commands, etc.) the RAID storage engine 304 in the RAID parity data storage device 206d/300 may generate and transmit a completion message 812 to the RAID storage controller device 204. For example, the RAID storage engine 304 in the RAID parity data storage device 206d/300 may generate the completion message 812 and provide that completion message in a completion queue in its communication system 310, and then generate an interrupt to the RAID storage controller device 204 that causes the RAID storage controller device 204 to access that completion queue and retrieve the completion message. However, while a specific technique for transmitting the completion message is described, one of skill in the art in possession of the present disclosure will recognize that completion messages may be transmitted using a variety of other techniques while remaining within the scope of the present disclosure. As also illustrated in FIG. 8E, following the receiving of the completion message 812, the RAID storage controller device 204 may generate and transmit a completion message 814 to the host system 202 in order to indicate to the host system that the write command 600 has been completed.

Thus, systems and methods have been described that provide for the performance of parity update operations to store and backup data in a RAID storage system with the assistance of the RAID storage devices that store that data. For example, a first RAID primary data storage device may retrieve second primary data from a host system via a first Direct Memory Access (DMA) operation, perform an XOR operation on first primary data in a first storage subsystem in the first RAID primary data storage device and the second primary data to produce first interim parity data, and write the first interim parity data to its first buffer subsystem. A second RAID primary data storage device may also retrieve fourth primary data from the host system via a second DMA operation, perform an XOR operation on third primary data in a second storage subsystem in the second RAID primary data storage device and the fourth primary data to produce second interim parity data, and write the second interim parity data to its second buffer subsystem. A RAID parity data storage device may then first retrieve the first interim parity data from the first RAID primary data storage device via a third DMA operation, then may retrieve the second interim parity data from the second RAID primary data storage device via a fourth DMA operation, and then may perform an XOR operation on first parity data in a first storage subsystem in the RAID parity data storage device along with the first interim parity data and the second interim parity data to produce second parity data, and overwrite the first parity data with the second parity data. As such, parity update operations are offloaded from the RAID storage controller device, thus increasing the ability of the RAID storage controller device to scale with high performance RAID storage devices.

Figure 9A:
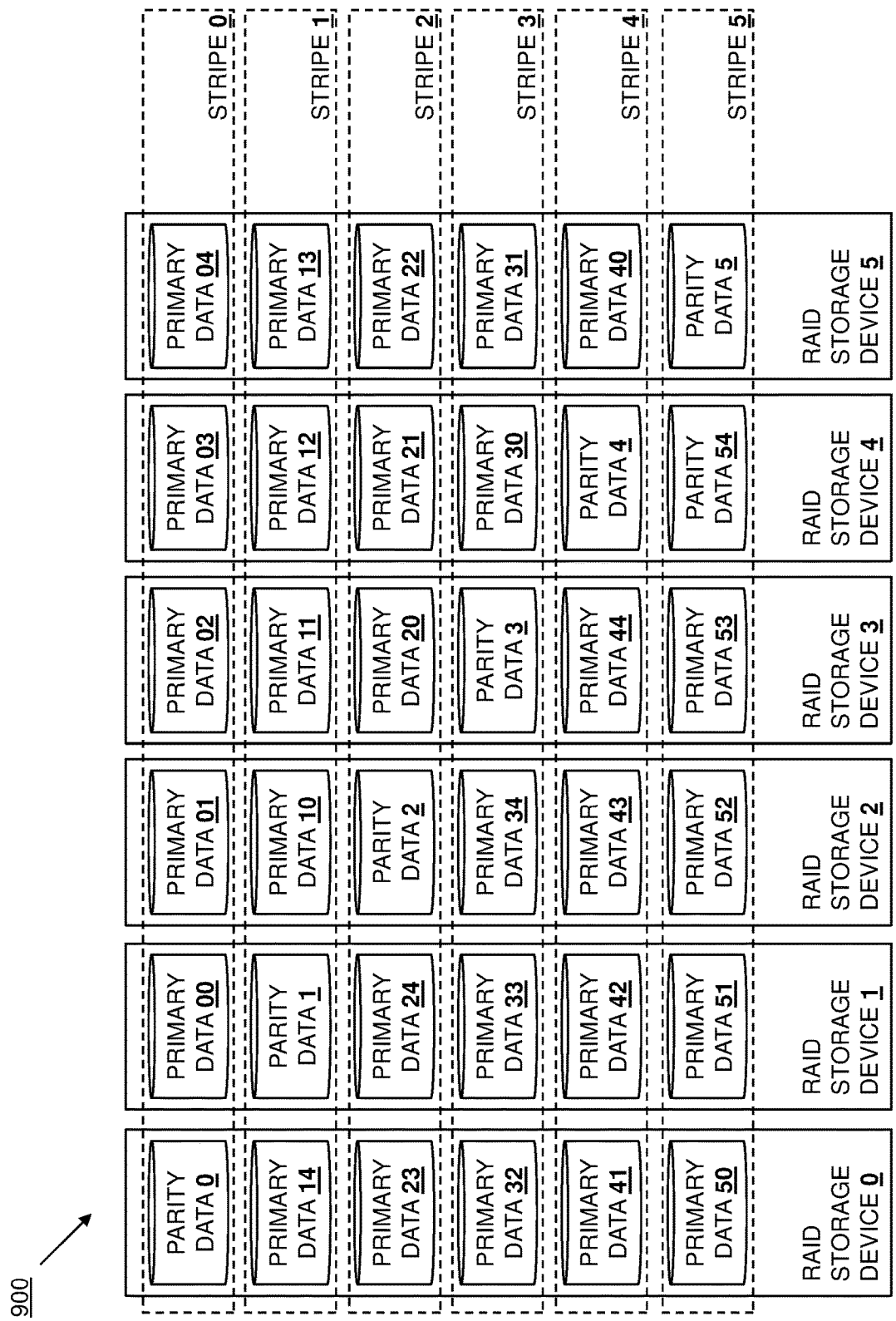
FIG. 9A is a schematic view illustrating an embodiment of the storage of data in a RAID storage system.

With reference to FIG. 9A, an embodiment of the storage of primary data and parity data in a RAID storage system 900 is illustrated. The RAID storage system 900 includes a plurality of RAID storage devices 0, 1, 2, 3, 4, and 5, with those RAID storage devices 0-5 storing data stripes 0, 1, 2, 3, 4, and 5. Different data storage in each of the RAID storage devices 0-5 for the different data stripes 0-5 is identified in FIG. 9A by the identification of the type of primary data being stored (, along with an element number that includes a first digit that identifies the data stripe (e.g., 0-5) to which that primary data belongs, followed by a second digit that identifies the portion of that primary data being stored. As such, with reference to the specific example in FIG. 9A, the data stripe 0 includes parity data 0 (e.g., "0" indicating the parity data for data stripe 0) stored in the RAID storage device 0, primary data 00 (e.g., "00" indicating the 0 portion of primary data for data stripe 0) stored in the RAID storage device 1, primary data 01 (e.g., "01" indicating the 1 portion of primary data for data stripe 0) stored in the RAID storage device 2, primary data 02 (e.g., "02" indicating the 2 portion of primary data for data stripe 0) stored in the RAID storage device 3, primary data 03 (e.g., "03" indicating the 3 portion of primary data for data stripe 0) stored in the RAID storage device 4, and primary data 04 (e.g., "04" indicating the 4 portion of primary data for data stripe 0) stored in the RAID storage device 5.

Furthermore, one of skill in the art in possession of the present disclosure will recognize how the other data stripes 1-5 are described similarly, with the parity data for each data stripe 0-5 provided in different ones of the RAID storage devices 0-5 (e.g., the parity data 1 for the data stripe 1 provided in the RAID storage device 1 and the primary data for the data stripe 1 distributed across the remaining RAID storage devices 0 and 2-5; the parity data 2 for the data stripe 2 provided in the RAID storage device 2 and the primary data for the data stripe 2 distributed across the remaining RAID storage devices 0, 1 and 3-5; the parity data 3 for the data stripe 3 provided in the RAID storage device 3 and the primary data for the data stripe 3 distributed across the remaining RAID storage devices 0-2, 4, and 5; the parity data 4 for the data stripe 4 provided in the RAID storage device 4 and the primary data for the data stripe 4 distributed across the remaining RAID storage devices 0-3 and 5; and the parity data 5 for the data stripe 5 provided in the RAID storage device 5 and the primary data for the data stripe 5 distributed across the remaining RAID storage devices 0-4.)

Figure 9B:
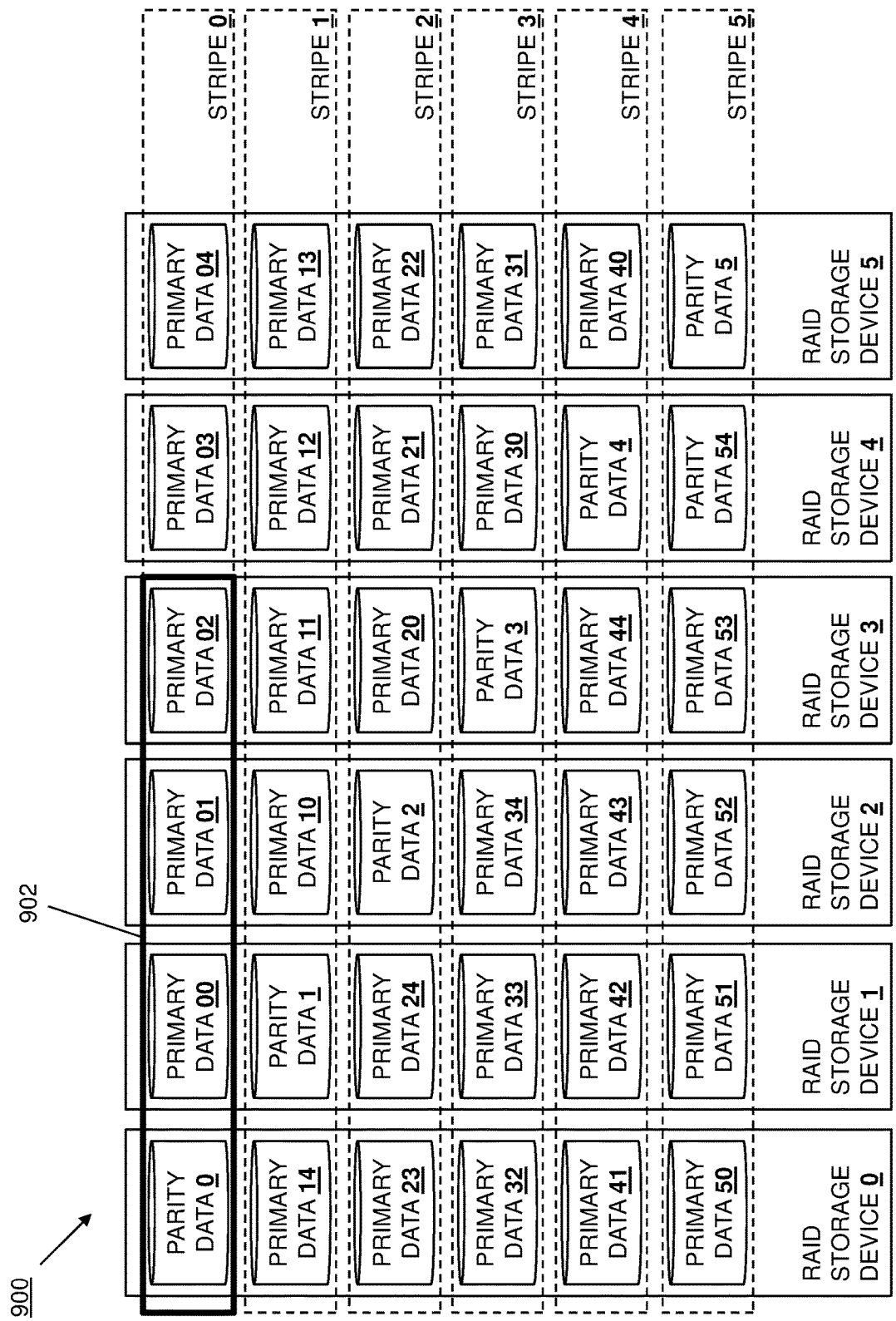
FIG. 9B is a schematic view illustrating an embodiment of the RAID storage system of FIG. 9A during the method of FIG. 4.

FIG. 9B illustrates how the storage of primary data and parity data in the RAID storage system 900 of FIG. 9A may result in some inefficiency when the RAID storage-device-assisted parity updates discussed above are provided according to the method 400. In the example of FIG. 9B, a "partial stripe write" 902 is performed according to the method 400 described above such that the primary data 00, 01, and 02 and the parity data 0 in data stripe 0 are each updated. With reference to the method 400 discussed above, the RAID storage devices 1, 2, 3 (e.g., corresponding to the RAID primary data storage devices 206b-206c in the method 400) may operate to update their respective primary data 00, 01, and 02 and produce their respective interim parity data in parallel, as discussed above. Subsequently, the RAID storage device 0 (e.g., corresponding to the RAID parity data storage device 206d in the method 400) may operate to sequentially retrieve that interim parity data from each of the RAID storage devices 1, 2, and 3 by, for example, performing a first DMA operation that retrieves and stores the interim parity data generated by the RAID storage device 1, then performing a second DMA operation that retrieves and stores the interim parity data generated by the RAID storage device 2, and then performing a third DMA operation that retrieves and stores the interim parity data generated by the RAID storage device 3. As discussed above for the method 400, following the retrieval of that interim parity data, the parity data 0 may be updated.

As also discussed above, the need to retrieve the interim parity data sequentially delays the calculation of the updated parity data 0, and the inventors of the present disclosure have recognized that the storage of primary data and parity data in the RAID storage system 900 in the manner described for the method 400 can produce this inefficiency. As described below, an alternate primary data and parity data storage configuration can allow the interim parity data retrieval discussed above to be performed in parallel, thus eliminating this inefficiency. For example, as discussed below, primary data associated with a multiple RAID primary data storage device write operation may be distributed across different data stripes/parity blocks in the RAID storage devices, which allows the RAID storage devices operating as the RAID parity data storage devices for different data stripes to retrieve interim parity data for those data stripes in parallel from their respective RAID primary data storage device to which the primary data was written.

Figure 10:
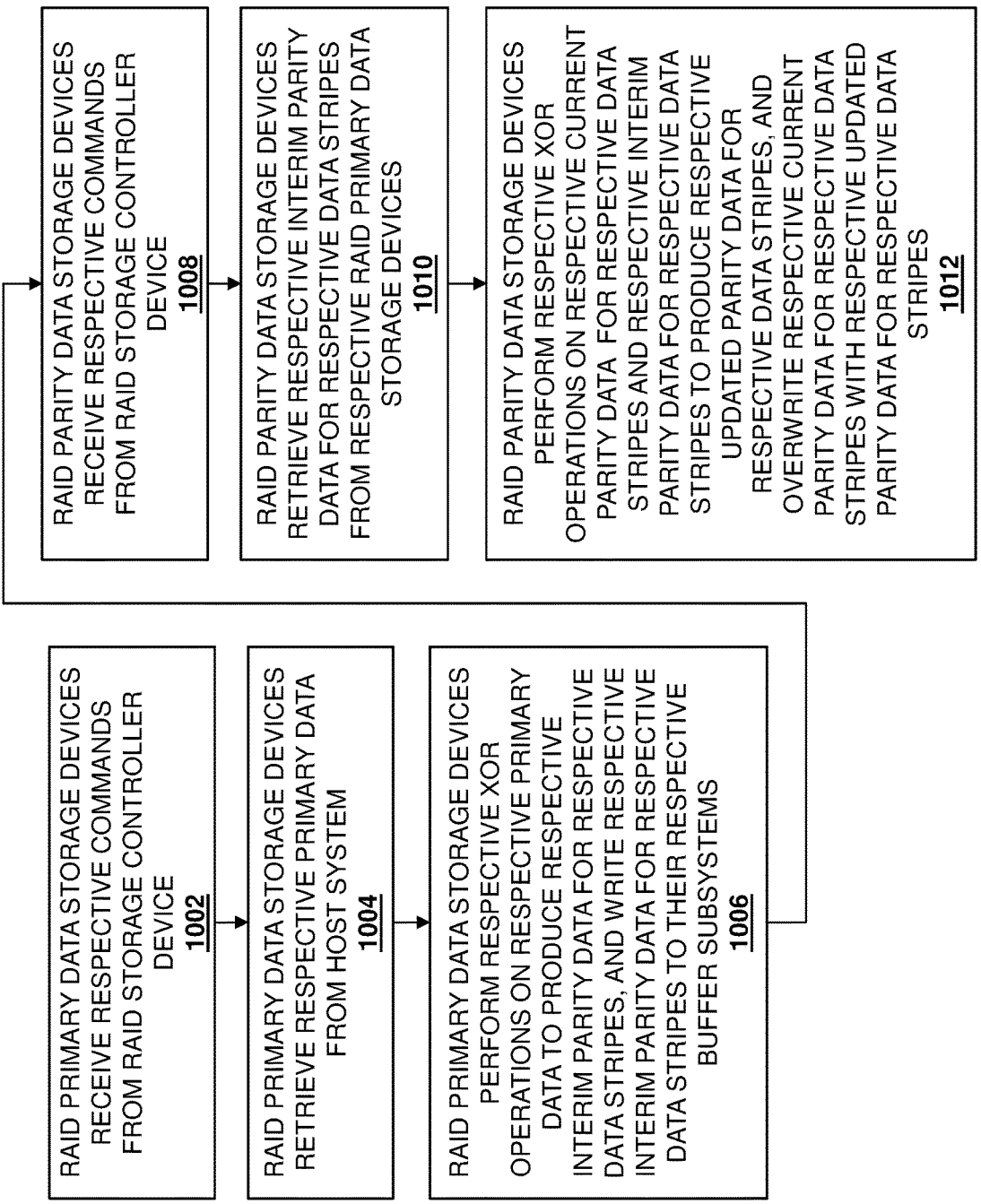
FIG. 10 is a flow chart illustrating an embodiment of a method for performing parity data update operations using RAID storage devices.

Referring now to FIG. 10, an embodiment of a method 1000 for assisting with parity update operations using RAID storage devices is illustrated. As discussed below, the systems and methods of the present disclosure provide for the performance of parity update operations to store and backup data in a RAID storage system with the assistance of the RAID storage devices that store that data. For example, a first RAID primary data storage device may receive a command from a RAID storage controller device and, in response, may retrieve second primary data from a host system via a first Direct Memory Access (DMA) operation, perform an XOR operation on first primary data in a first storage subsystem in the first RAID primary data storage device and the second primary data to produce first interim parity data for a first data stripe, and write the first interim parity data for the first data stripe to its first buffer subsystem. A second RAID primary data storage device may also receive a command from the RAID storage controller device and, in response, may retrieve fourth primary data from the host system via a second DMA operation, perform an XOR operation on third primary data in a second storage subsystem in the second RAID primary data storage device and the fourth primary data to produce second interim parity data for a second data stripe, and write the second interim parity data for the second data stripe to its second buffer subsystem.

A first RAID parity data storage device may then receive a command from the RAID storage controller device and, in response, may first retrieve the first interim parity data for the first data stripe from the first RAID primary data storage device via a third DMA operation, and may perform an XOR operation on first parity data for the first data stripe in a first storage subsystem in the RAID parity data storage device along with the first interim parity data for the first data stripe to produce second parity data for the first data stripe, and overwrite the first parity data for the first data stripe with the second parity data for the first data stripe. A second RAID parity data storage device may also receive a command from the RAID storage controller device and, in response, may first retrieve the second interim parity data for the second data stripe from the second RAID primary data storage device via a fourth DMA operation, and may perform an XOR operation on third parity data for the second data stripe in a second storage subsystem in the RAID parity data storage device along with the second interim parity data for the second data stripe to produce fourth parity data for the second data stripe, and overwrite the third parity data for the second data stripe with the fourth parity data for the second data stripe. As such, parity update operations are offloaded from the RAID storage controller device, thus increasing the ability of the RAID storage controller device to scale with high performance RAID storage devices.

Figure 11:
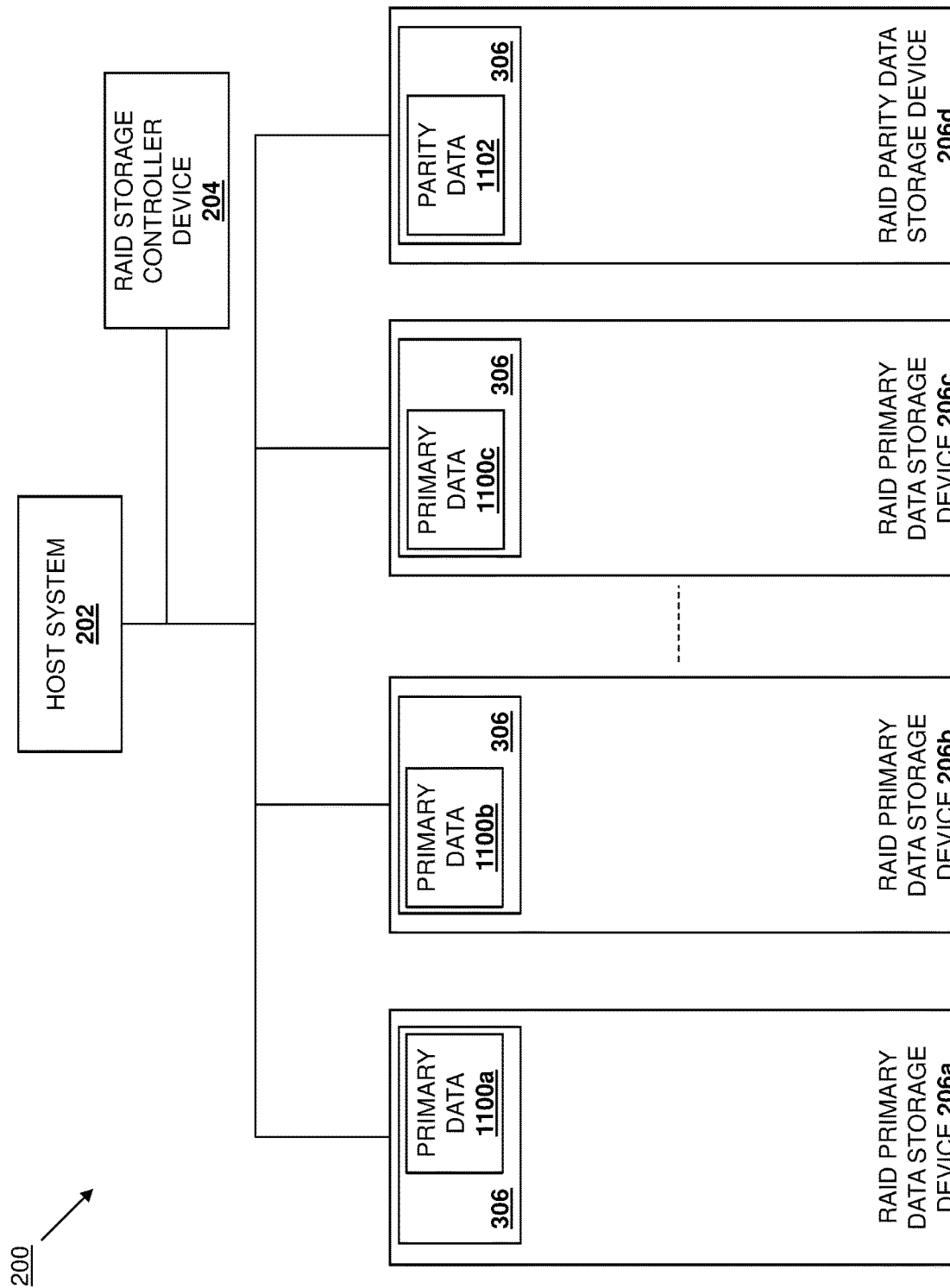
FIG. 11 is a schematic view illustrating an embodiment of the RAID storage system of FIG. 2 operating during the method of FIG. 10.

With reference to FIG. 11, the RAID storage system 200 is illustrated with the RAID primary data storage device 206a storing primary data 1100a in its storage subsystem 306, the RAID primary data storage device 206b storing primary data 1100b in its storage subsystem 306, and the RAID primary data storage device 206c storing primary data 1100c in its storage subsystem 306. While only three RAID primary data storage devices are illustrated and described in the examples provided below, one of skill in the art in possession of the present disclosure will recognize that any number of RAID primary data storage devices may store primary data while remaining within the scope of the present disclosure as well. In addition, the RAID storage system 200 is also illustrated with the RAID parity data storage device 206d storing parity data 1102 in its storage subsystem 306, and one of skill in the art in possession of the present disclosure will recognize that the parity data 1102 may have been generated via an XOR operation performed on the primary data 1100a-1100c in the RAID primary data storage devices 206a-206c, and allows for the rebuilding of any primary data stored on any one RAID primary data storage device in the event that primary data/RAID primary data storage device becomes unavailable. Furthermore, as discussed in further detail below, the primary data 1100a-1100c and the parity data 1102 are provided for a first data stripe stored by the RAID primary data storage devices 206a-206c and the RAID parity data storage device 206d.

Figure 12:
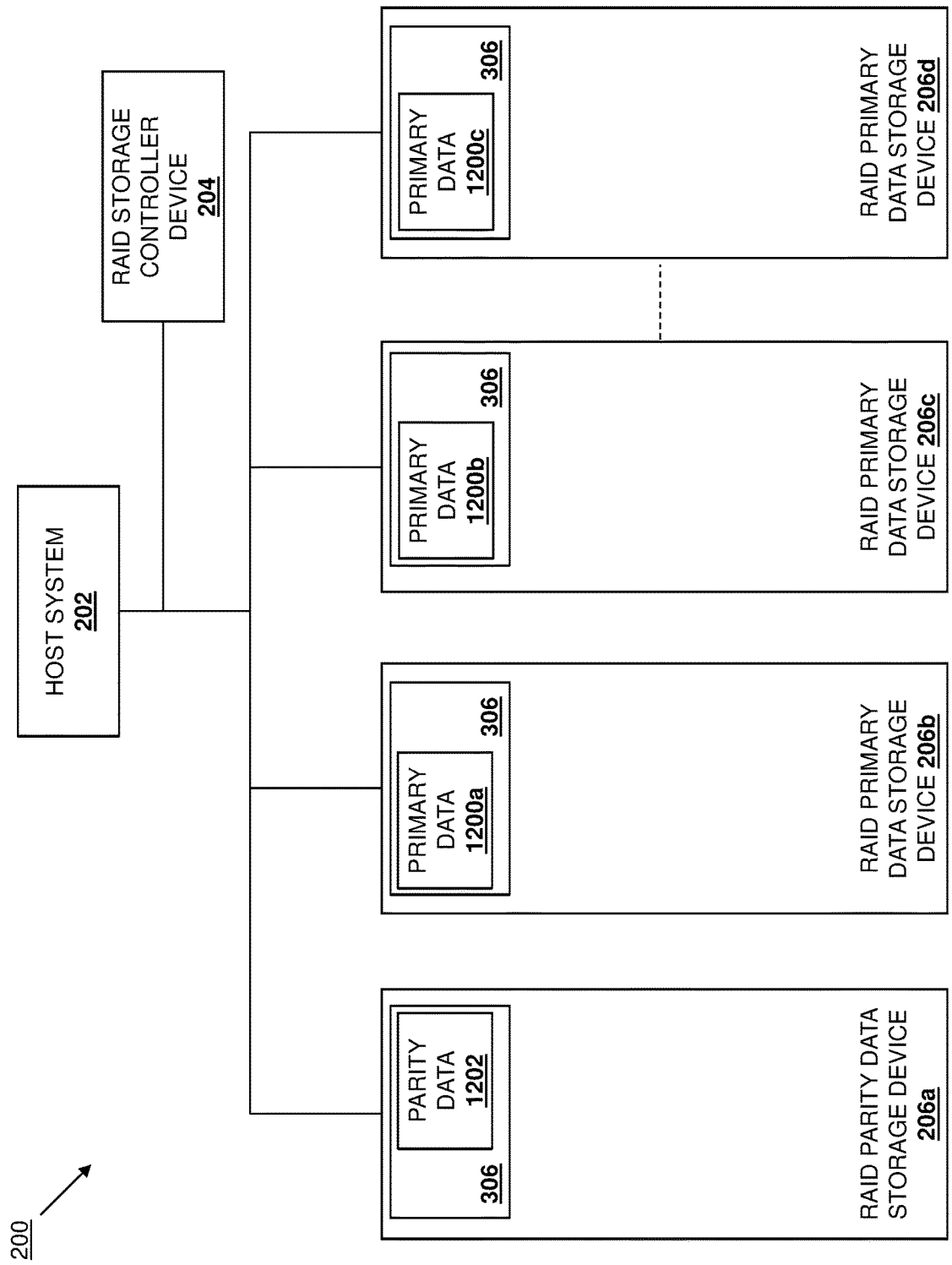
FIG. 12 is a schematic view illustrating an embodiment of the RAID storage system of FIG. 2 operating during the method of FIG. 10.

Similarly as discussed above, the primary/parity data storage configuration illustrated in FIG. 11 provides primary/parity for a single data strip, and different data strips may have different primary/parity data storage configurations (e.g., in a plurality of RAID storage devices provided in a RAID storage system, a first data stripe may include primary data on first, second, and third RAID storage devices and parity data on a fourth RAID storage device; a second data stripe may include primary data on the second, third, and fourth RAID storage devices and parity data on the first RAID storage device, etc.) For example, FIG. 12 illustrates a second data stripe that is different from the first data stripe that includes the primary data 1100a-1100c and the parity data 1102 as discussed above in FIG. 11. As will be appreciated by one of skill in the art in possession of the present disclosure, the RAID storage devices that are utilized for the RAID primary data storage devices 206a-206c and the RAID parity data storage device 206d that provide the first data stripe in FIG. 11 will be utilized differently to provide the second data stripe and, as such, in FIG. 12 and as discussed below, the RAID primary data storage device 206a in FIG. 11 has become a RAID parity data storage device 206a, and the RAID parity data storage device 206d in FIG. 11 has become a RAID primary data storage device 206d. Thus, it should be understood that the same RAID storage device may act as both a RAID primary data storage device and a RAID parity data storage device for different data stripes.

With reference to FIG. 12, the RAID storage system 200 is illustrated with the RAID primary data storage device 206b storing primary data 1200a in its storage subsystem 306, the RAID primary data storage device 206c storing primary data 1200b in its storage subsystem 306, and the RAID primary data storage device 206d storing primary data 1200c in its storage subsystem 306. While only three RAID primary data storage devices are illustrated and described in the examples provided below, one of skill in the art in possession of the present disclosure will recognize that any number of RAID primary data storage devices may store primary data while remaining within the scope of the present disclosure as well. In addition, the RAID storage system 200 is also illustrated with the RAID parity data storage device 206a storing parity data 1202 in its storage subsystem 306, and one of skill in the art in possession of the present disclosure will recognize that the parity data 1202 may have been generated via an XOR operation performed on the primary data 1200a-1200c in the RAID primary data storage devices 206b-206d, and allows for the rebuilding of any primary data stored on any one RAID primary data storage device in the event that primary data/RAID primary data storage device becomes unavailable. Furthermore, as discussed above, the primary data 1200a-1200c and the parity data 1202 are provided for a second data stripe stored by the RAID primary data storage devices 206b-206d and the RAID parity data storage device 206a.

Figure 13A:
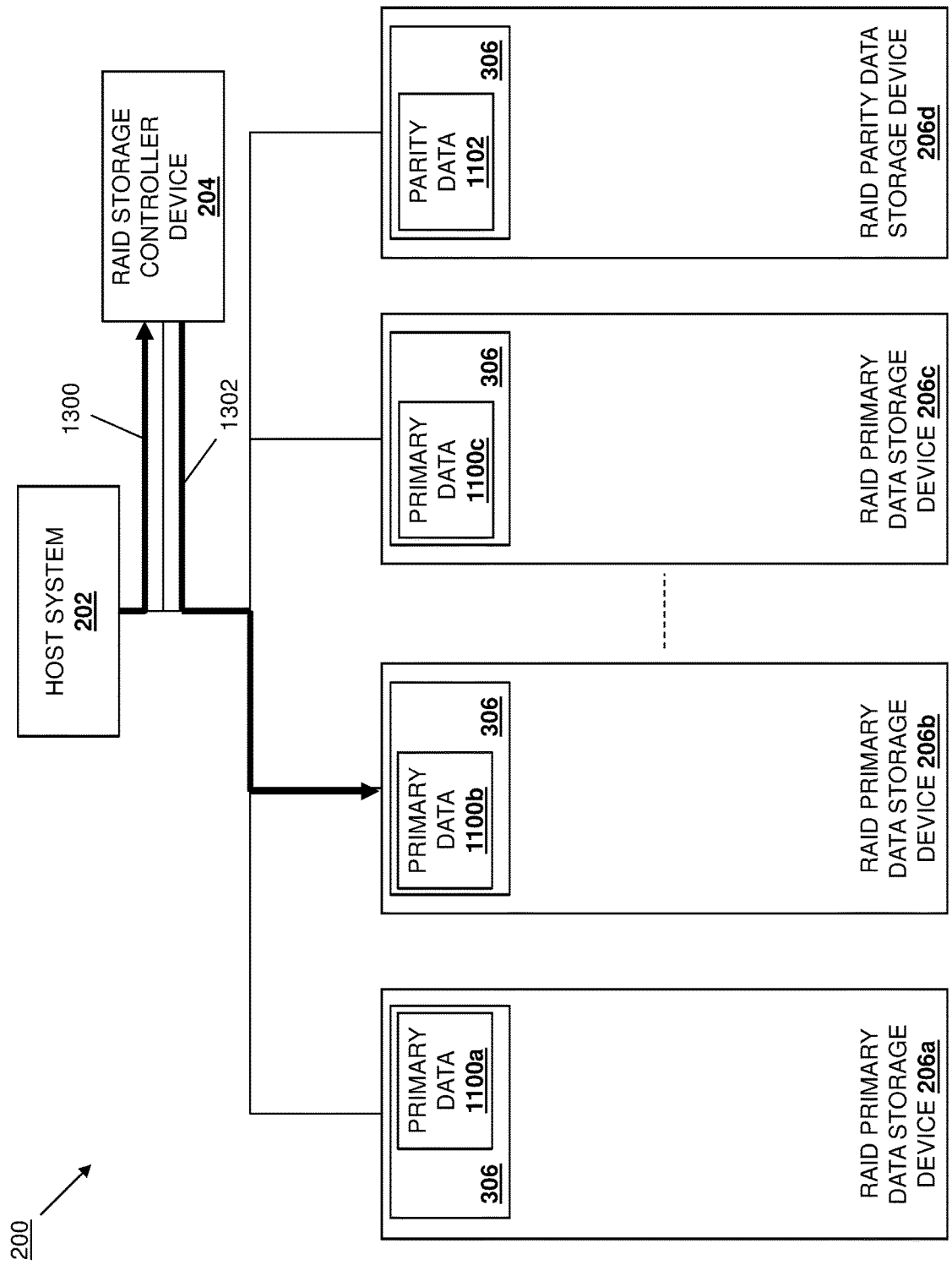
FIG. 13A is a schematic view illustrating an embodiment of the RAID storage system of FIG. 2 operating during the method of FIG. 10.
Figure 14A:
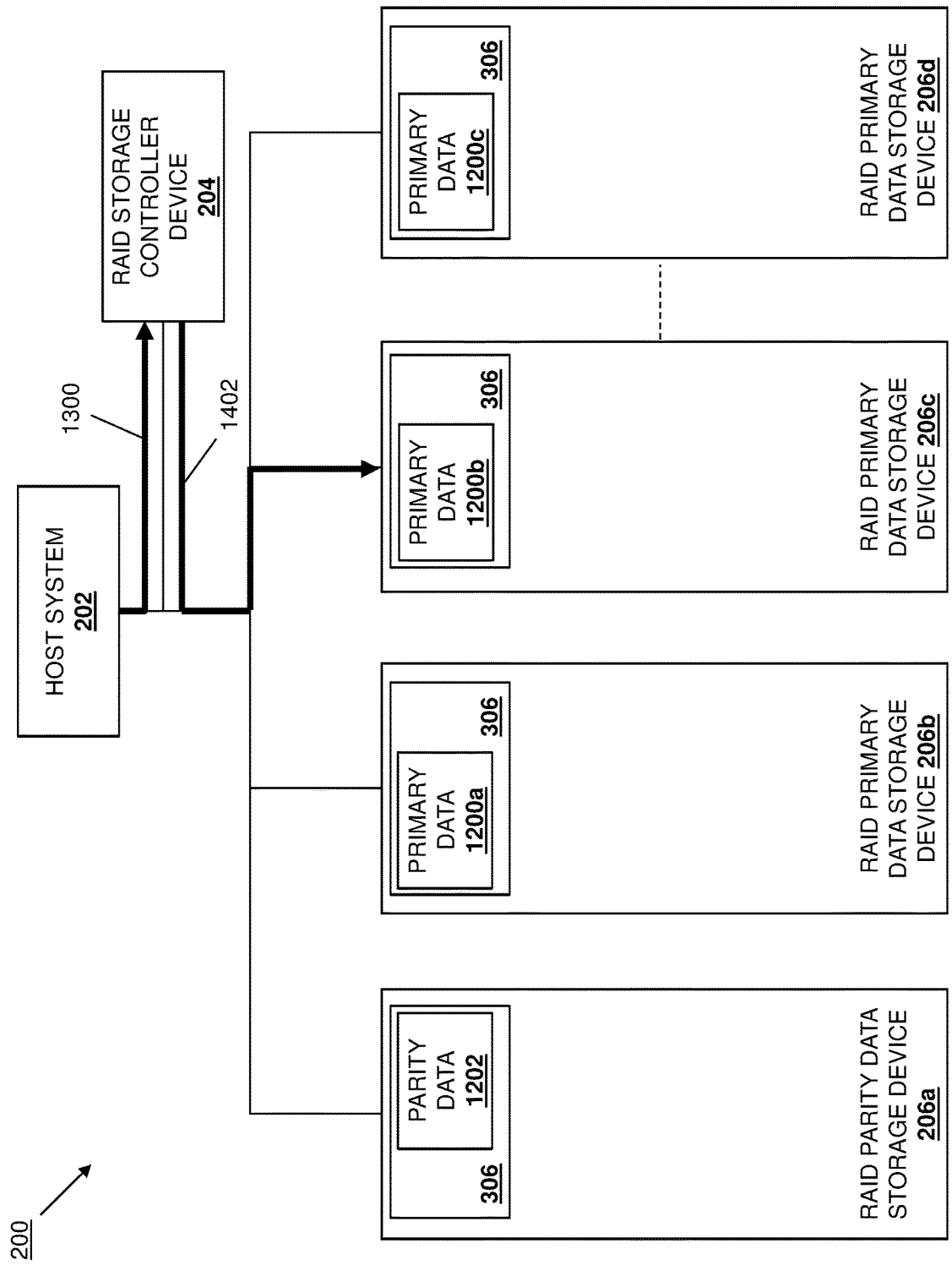
FIG. 14A is a schematic view illustrating an embodiment of the RAID storage system of FIG. 2 operating during the method of FIG. 10.

The method 1000 begins at block 1002 where RAID primary data storage devices receive respective commands from a RAID storage controller device. In an embodiment, at block 1002, the RAID storage controller device 204 may generate and transmit commands to RAID primary data storage devices. With reference to FIG. 13A, the host system 202 may generate a write command 1300 that instructs the writing of primary data that is located on the host system 200 to the RAID primary data storage devices 206b-206d, and may transmit that write command 1300 to the RAID storage controller device 204. As will be appreciated by one of skill in the art in possession of the present disclosure, the generation and/or transmission of the write command 1300 by the host system 202 to the RAID storage controller device 204 at block 1002 may include a variety of control plane communications between the host system 202 and the RAID storage controller device 204 that have been omitted for clarity of discussion. As such, at block 1002, the RAID storage controller device 204 may receive the write command 1300 and, in response to that write command 1300, may generate commands and transmit the commands to a subset of the RAID primary data storage devices 206b-d. FIG. 13A illustrates the RAID storage controller device 204 transmitting a command 1302 to the RAID primary data storage device 206b, while FIG. 14A illustrates the RAID storage controller device 204 transmitting a command 1402 to the RAID primary data storage device 206c. As will be appreciated by one of skill in the art in possession of the present disclosure, the commands 1302 and 1402 may be transmitted to the RAID primary data storage devices 206b and 206c at substantially the same time, although sequentially transmission of the commands 1302 and 1402 will fall within the scope of the present disclosure as well.

In some embodiments, the commands 1302 and 1402 may be multi-operation commands like those described in U.S. patent application Ser. No. 16/585,296, filed on Sep. 27, 2019. For example, the commands 1302 and 1402 may be NVMe WRITE WITH XOR multi-operation commands that are configured to cause the RAID primary data storage devices 206b and 206c to perform the multiple operations described below. However, while described as providing multi-operation commands at block 402, one of skill in the art in possession of the present disclosure will recognize that the multiple operations performed by the RAID primary data storage device 206b and 206c discussed below may be performed in response to respective commands transmitted by the RAID storage controller device 204 while remaining within the scope of the present disclosure as well. In a specific example, the transmission of the commands 1302 and 1402 may include the RAID storage controller device 204 providing the commands 1302 and 1402 in respective submission queues that are included in the communication systems 310 in the RAID primary data storage devices 206b/300 and 206c/300, and then ringing doorbells for the RAID primary data storage devices 206b/300 and 206c/300. However, one of skill in the art in possession of the present disclosure will recognize that the commands 1302 and 1402 may be provided to the RAID primary data storage devices 206b and 206c in a variety of manners that will fall within the scope of the present disclosure as well.

As such, in some examples the respective RAID storage engine 304 in the RAID primary data storage devices 206b/300 and 206c/300 may respond to the ringing of their doorbells by accessing the commands 1302 and 1402, respectively, in the submission queue in their communication systems 310. In embodiments in which the commands 1302 and 1402 are multi-operation commands, the respective RAID storage engine 304 in the RAID primary data storage devices 206b/300 and 206c/300 may identify the multiple operations instructed by those commands 1302 and 1402 (as described in U.S. patent application Ser. No. 16/585,296, filed on Sep. 27, 2019.) However, while two RAID primary data storage devices are illustrated and described below as receiving the commands 1302 and 1402 that causes them to update their primary data 1100b and 1200b, one of skill in the art in possession of the present disclosure will recognize how more RAID primary storage devices may receive similar commands at block 1002 while remaining within the scope of the present disclosure as well.

Figure 13B:
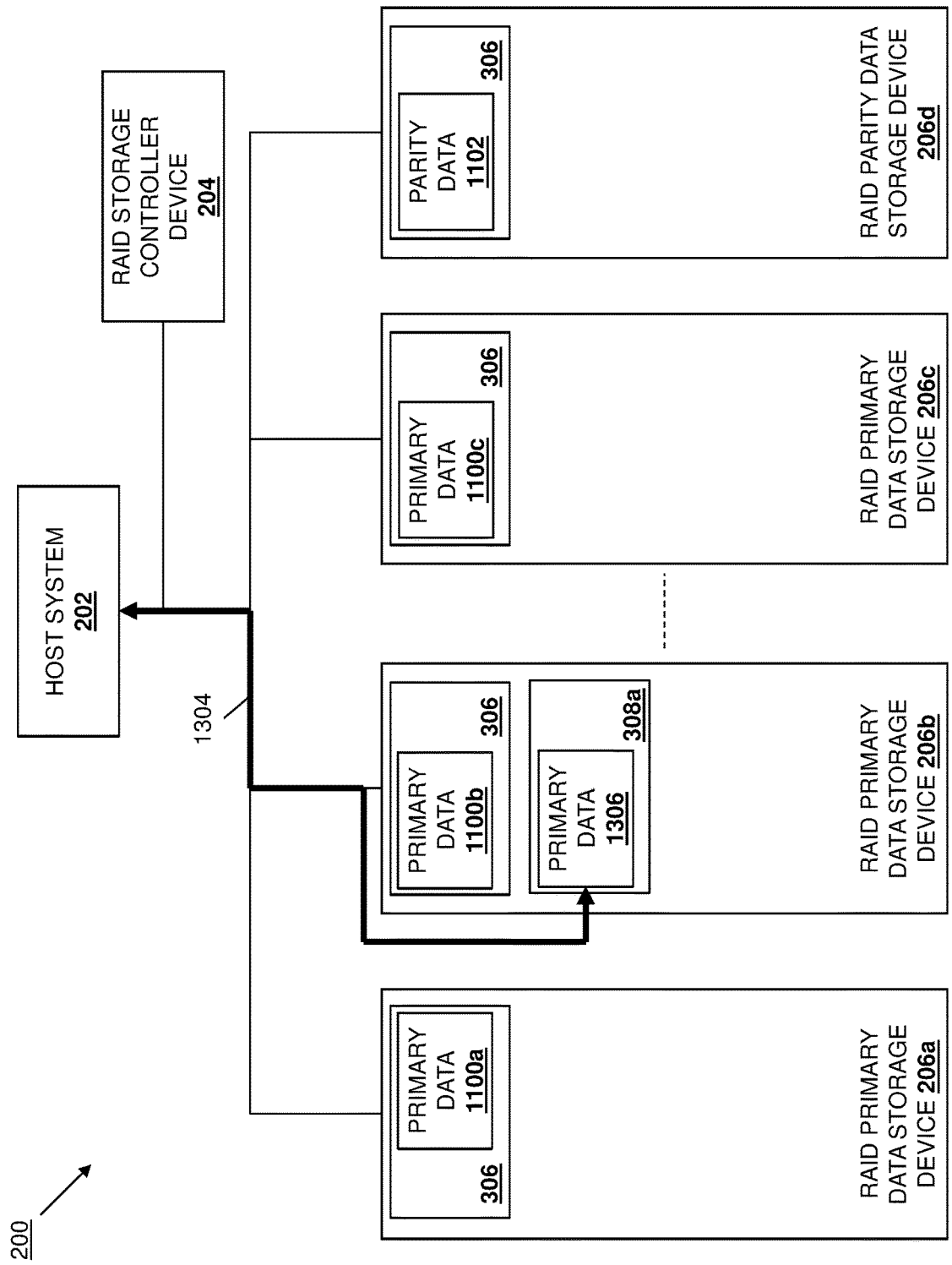
FIG. 13B is a schematic view illustrating an embodiment of the RAID storage system of FIG. 2 operating during the method of FIG. 10.

The method 1000 then proceeds to block 1004 where the RAID primary data storage devices retrieve respective primary data from a host system. With reference to FIG. 13B, in an embodiment of block 1004 and based on the command 1302 (which is a multi-operation command as described above in this embodiment), the RAID storage engine 304 in the RAID primary data storage device 206b/300 may operate to perform a Direct Memory Access (DMA) operation 1304 that accesses primary data 1306 that is stored on the host system 202 (e.g., in a memory system or storage system included on the host system 202) and writes that primary data 1306 to its first buffer subsystem 308a (e.g., in a device buffer in the RAID primary data storage device 206b as described in the example above). As will be appreciated by one of skill in the art in possession of the present disclosure, the primary data 1306 (e.g., "new" data) may be an update to the primary data 1100b (e.g., "old" data) stored in the storage subsystem 306 in the RAID primary data storage device 206b, although other primary data writing scenarios will fall within the scope of the present disclosure as well.

Figure 14B:
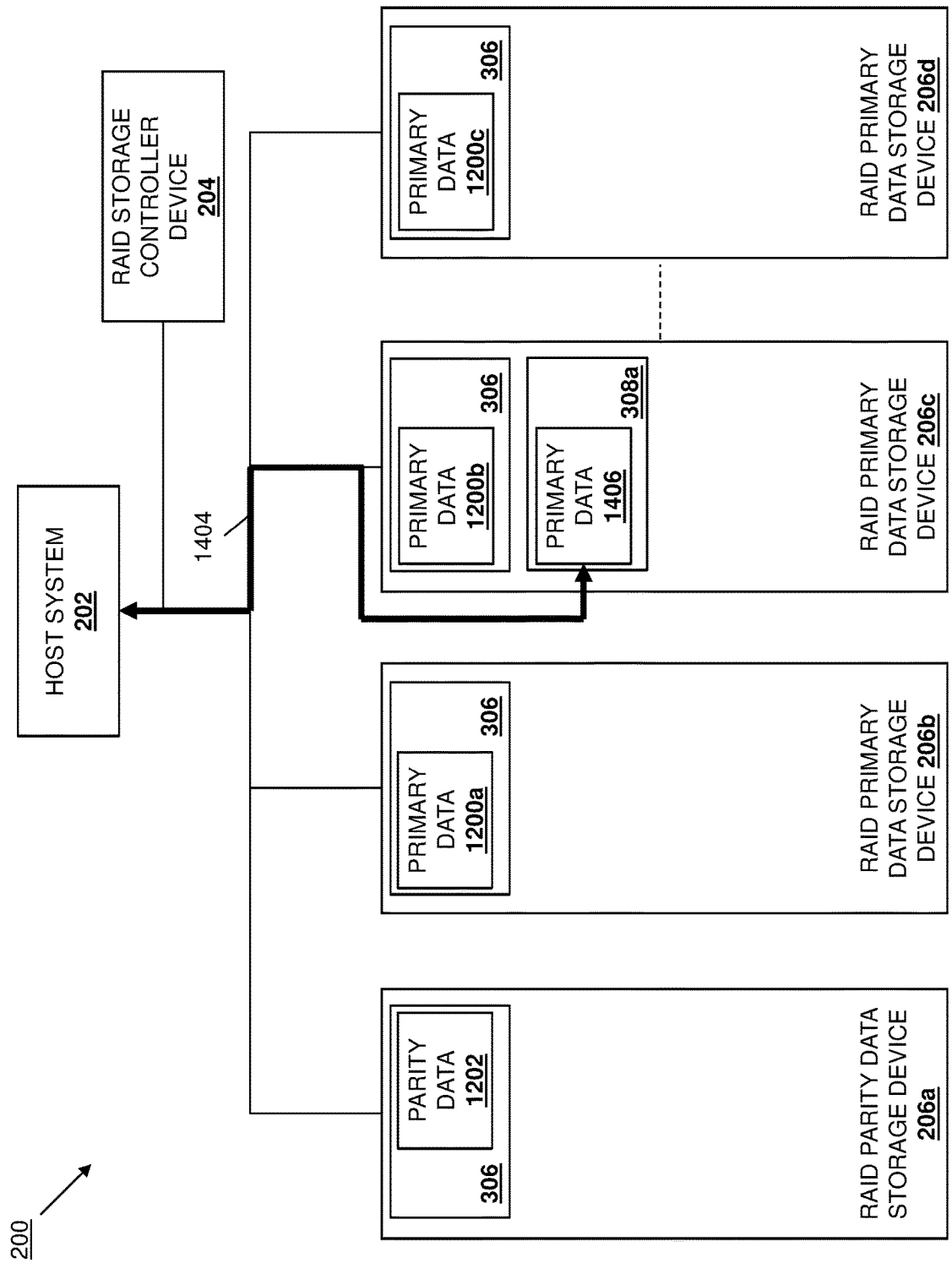
FIG. 14B is a schematic view illustrating an embodiment of the RAID storage system of FIG. 2 operating during the method of FIG. 10.

With reference to FIG. 14B, in an embodiment of block 1004 and based on the command 1402 (which is a multi-operation command as described above in this embodiment), the RAID storage engine 304 in the RAID primary data storage device 206c/300 may operate to perform a Direct Memory Access (DMA) operation 1404 that accesses primary data 1406 that is stored on the host system 202 (e.g., in a memory system or storage system included on the host system 202) and writes that primary data 1406 to its first buffer subsystem 308a (e.g., in a device buffer in the RAID primary data storage device 206c as described in the example above). As will be appreciated by one of skill in the art in possession of the present disclosure, the primary data 1406 (e.g., "new" data) may be an update to the primary data 1200b (e.g., "old" data) stored in the storage subsystem 306 in the RAID primary data storage device 206c, although other primary data writing scenarios will fall within the scope of the present disclosure as well.

Figure 13C:
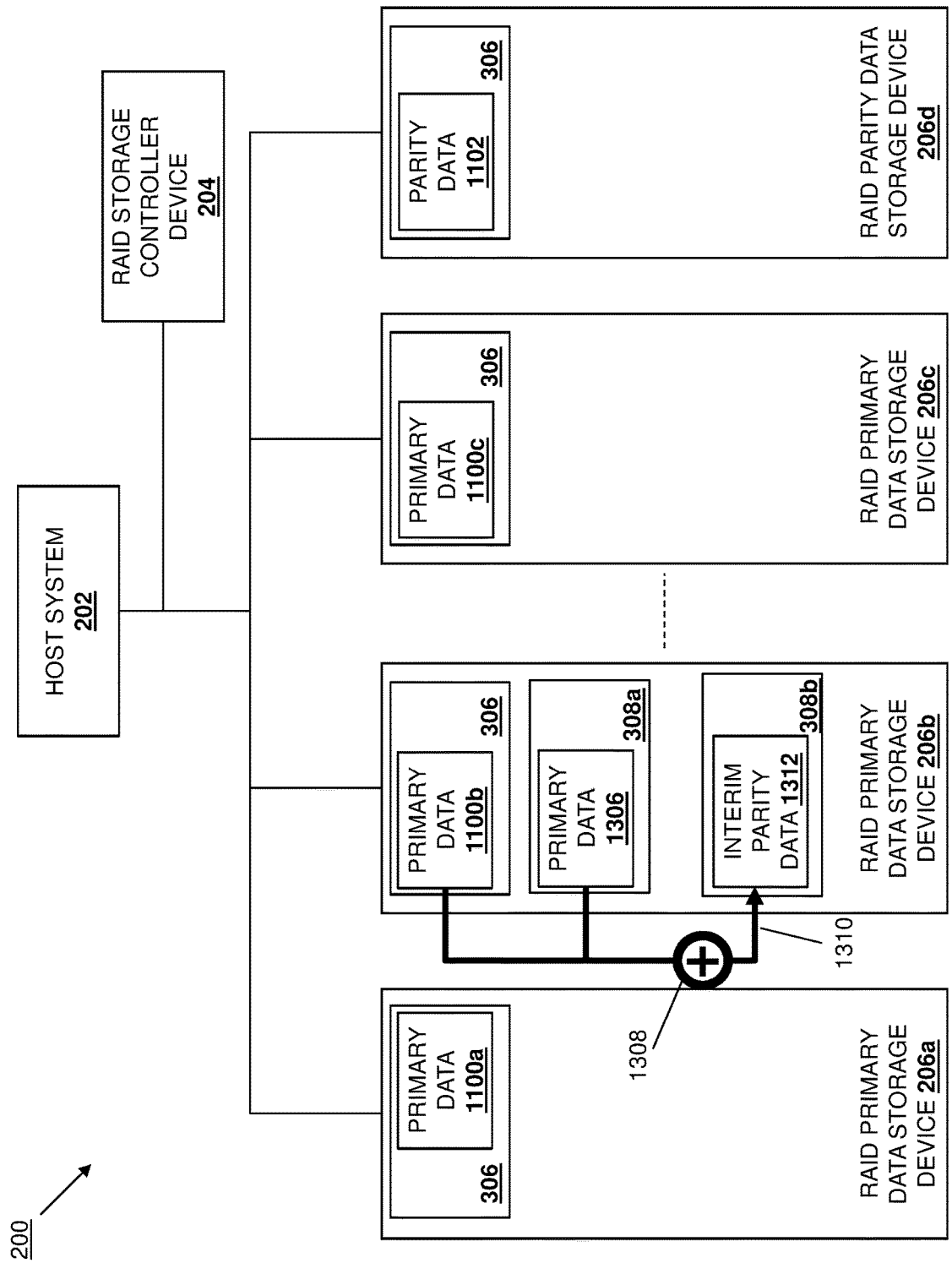
FIG. 13C is a schematic view illustrating an embodiment of the RAID storage system of FIG. 2 operating during the method of FIG. 10.
Figure 13D:
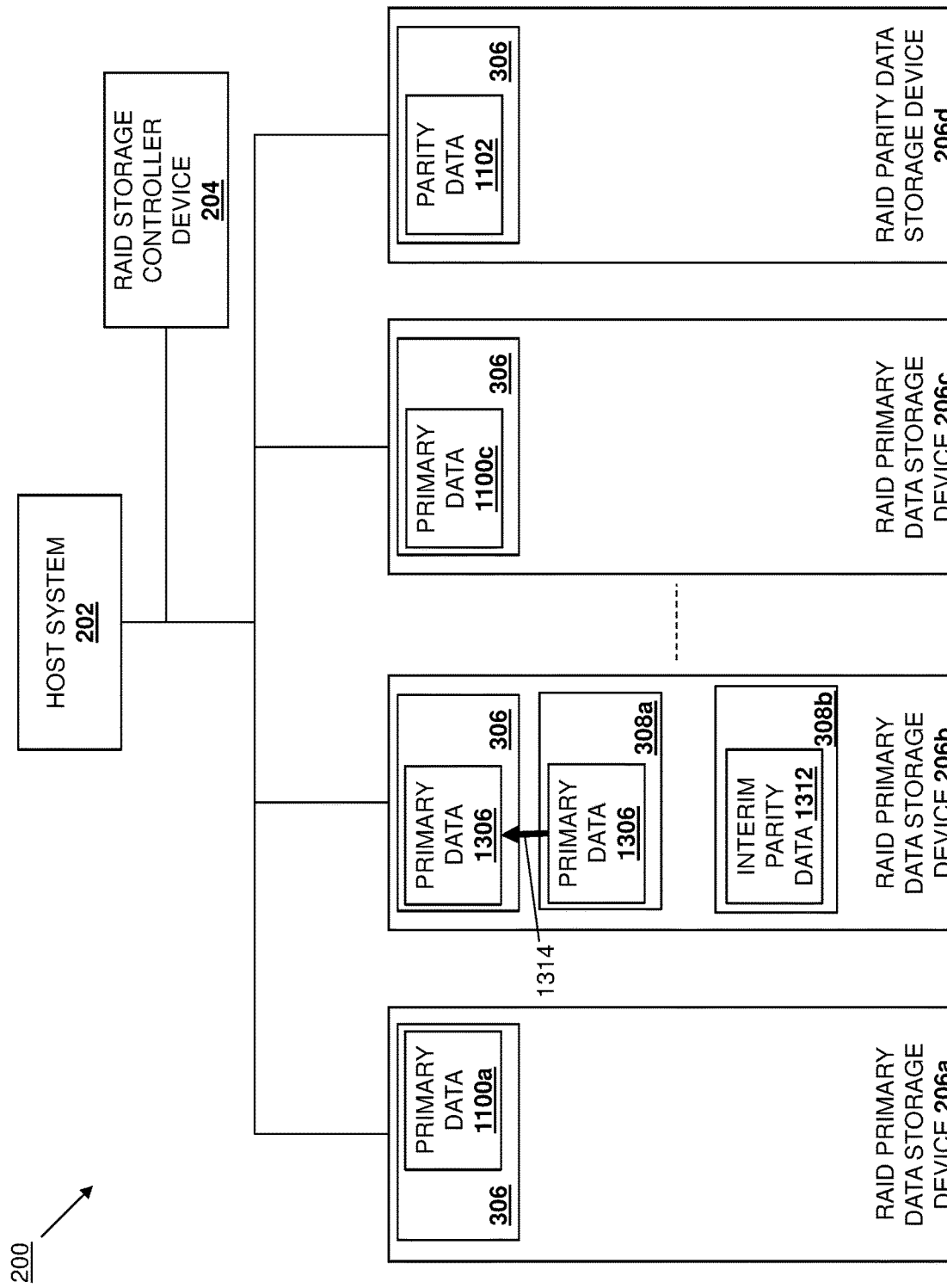
FIG. 13D is a schematic view illustrating an embodiment of the RAID storage system of FIG. 2 operating during the method of FIG. 10.

The method 1000 then proceeds to block 1006 where the RAID primary data storage devices perform respective XOR operations on respective primary data to produce respective interim parity data for respective data stripes, and write the respective interim parity data for the respective data stripes to their respective buffer subsystems. With reference to FIG. 13C, in an embodiment of block 1006 and based on the command 1302 (which is a multi-operation command as described above in this embodiment), the RAID storage engine 304 in the RAID primary data storage device 206b/300 may operate to perform an XOR operation 1308 using the primary data 1100b in its storage subsystem 306 and the primary data 1306 in its first buffer subsystem 308a in order to produce interim parity data 1312 for the first data stripe, and then writes that interim parity data 1312 to its second buffer subsystem 308b (e.g., a CMB). Further still, FIG. 13D illustrates how the RAID storage engine 304 in the RAID parity data storage device 206b may perform an overwrite operation 1314 to overwrite the primary data 1100b in its storage subsystem 306 with the primary data 1306 in its first buffer subsystem 308a based on the command 1302 (which is a multi-operation command as described above in this embodiment), thus updating that primary data stored by the RAID primary data storage device 206b.

Figure 14C:
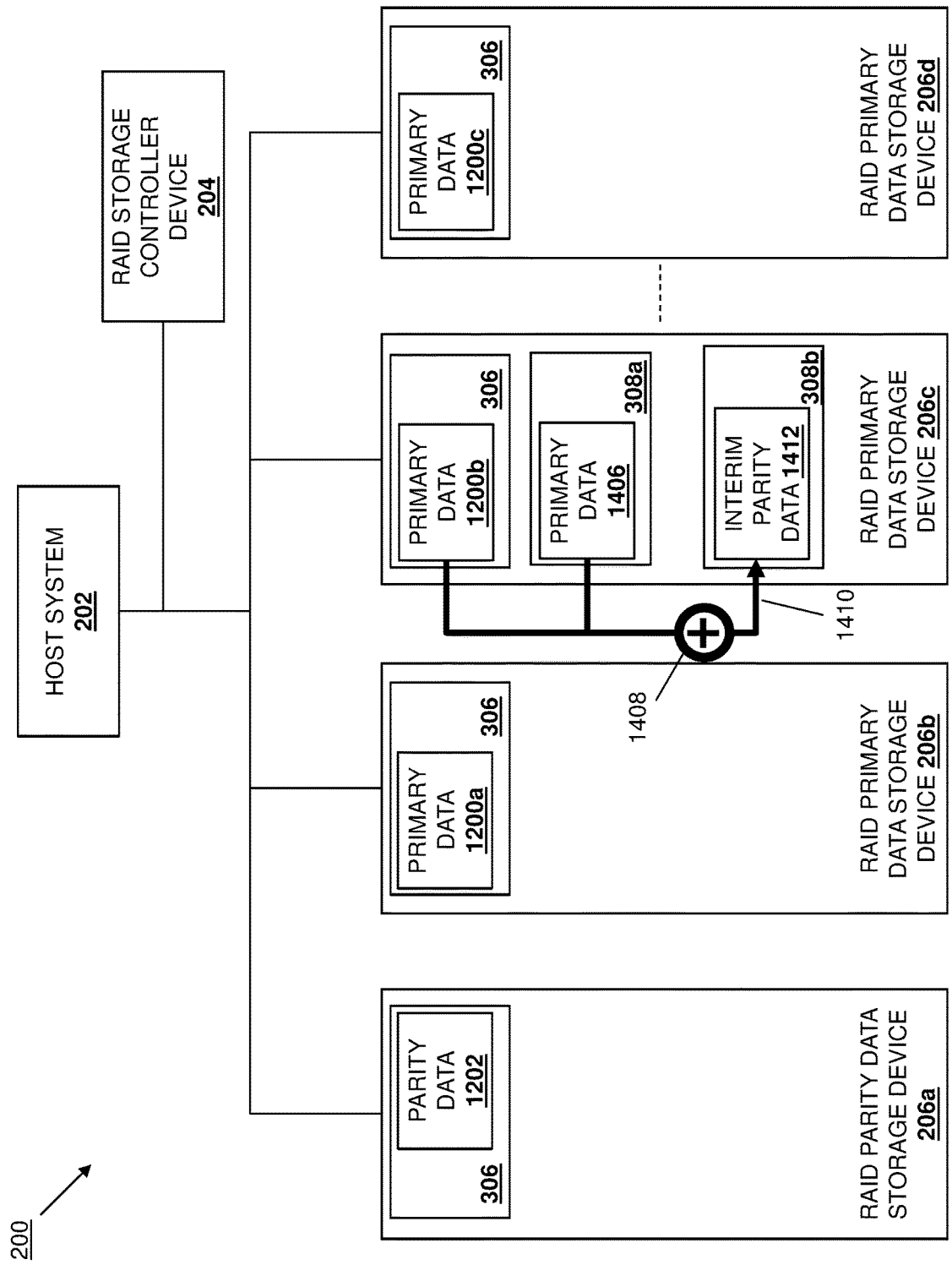
FIG. 14C is a schematic view illustrating an embodiment of the RAID storage system of FIG. 2 operating during the method of FIG. 10.
Figure 14D:
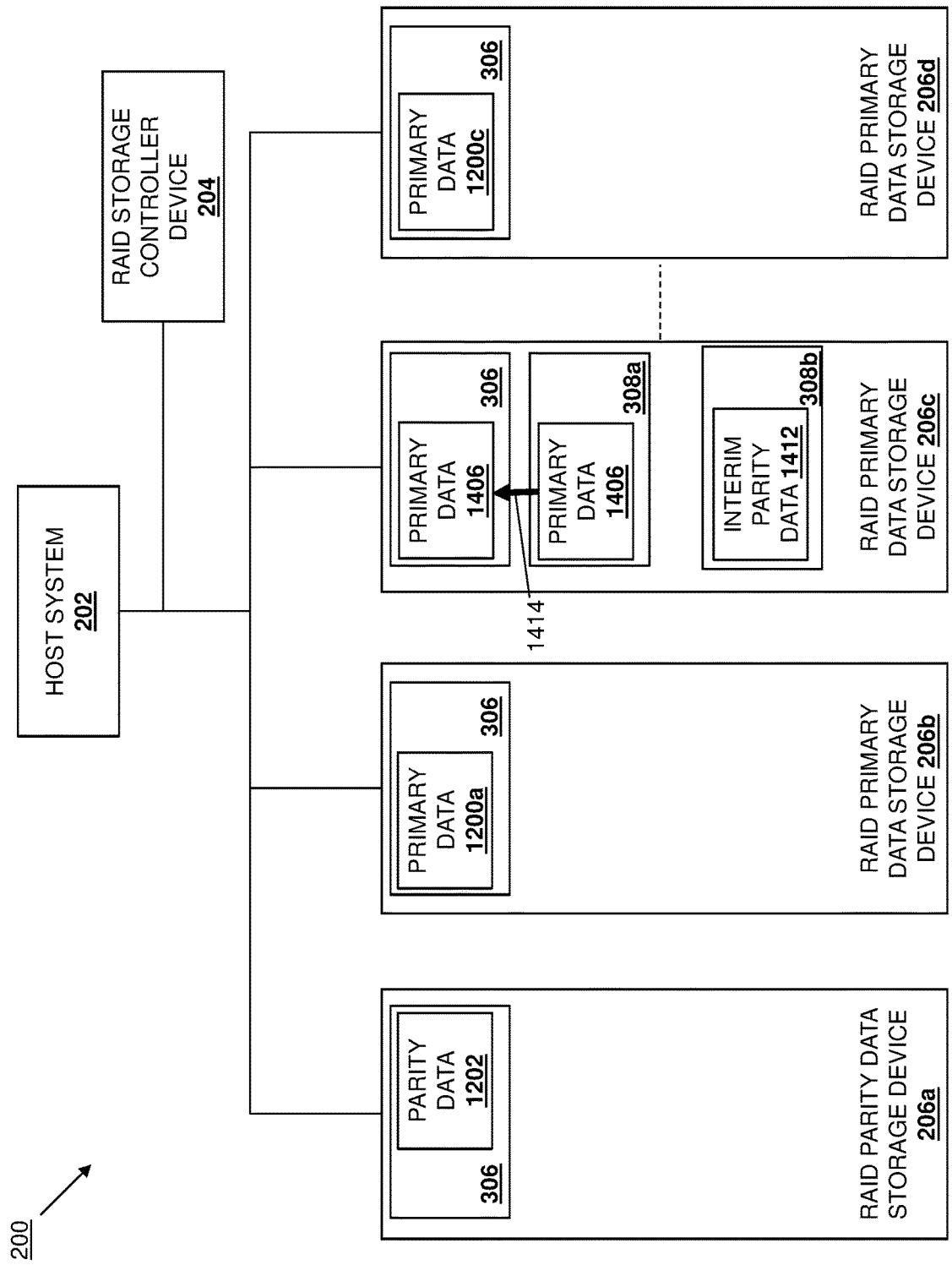
FIG. 14D is a schematic view illustrating an embodiment of the RAID storage system of FIG. 2 operating during the method of FIG. 10.

With reference to FIG. 14C, in an embodiment of block 1006 and based on the command 1402 (which is a multi-operation command as described above in this embodiment), the RAID storage engine 304 in the RAID primary data storage device 206c/300 may operate to perform an XOR operation 1408 using the primary data 1200b in its storage subsystem 306 and the primary data 1406 in its first buffer subsystem 308a in order to produce interim parity data 1412 for the second data stripe, and then writes that interim parity data 1412 to its second buffer subsystem 308b (e.g., a CMB). Further still, FIG. 14D illustrates how the RAID storage engine 304 in the RAID parity data storage device 206c may perform an overwrite operation 1414 to overwrite the primary data 1200b in its storage subsystem 306 with the primary data 1406 in its first buffer subsystem 308a based on the command 1402 (which is a multi-operation command as described above in this embodiment), thus updating that primary data stored by the RAID primary data storage device 206c. As will be appreciated by one of skill in the art in possession of the present disclosure, the commands 1302 and 1402 may be executed by the respective RAID primary data storage devices 206b and 206c in parallel, simultaneously, and/or at substantially the same time.

Figure 13E:
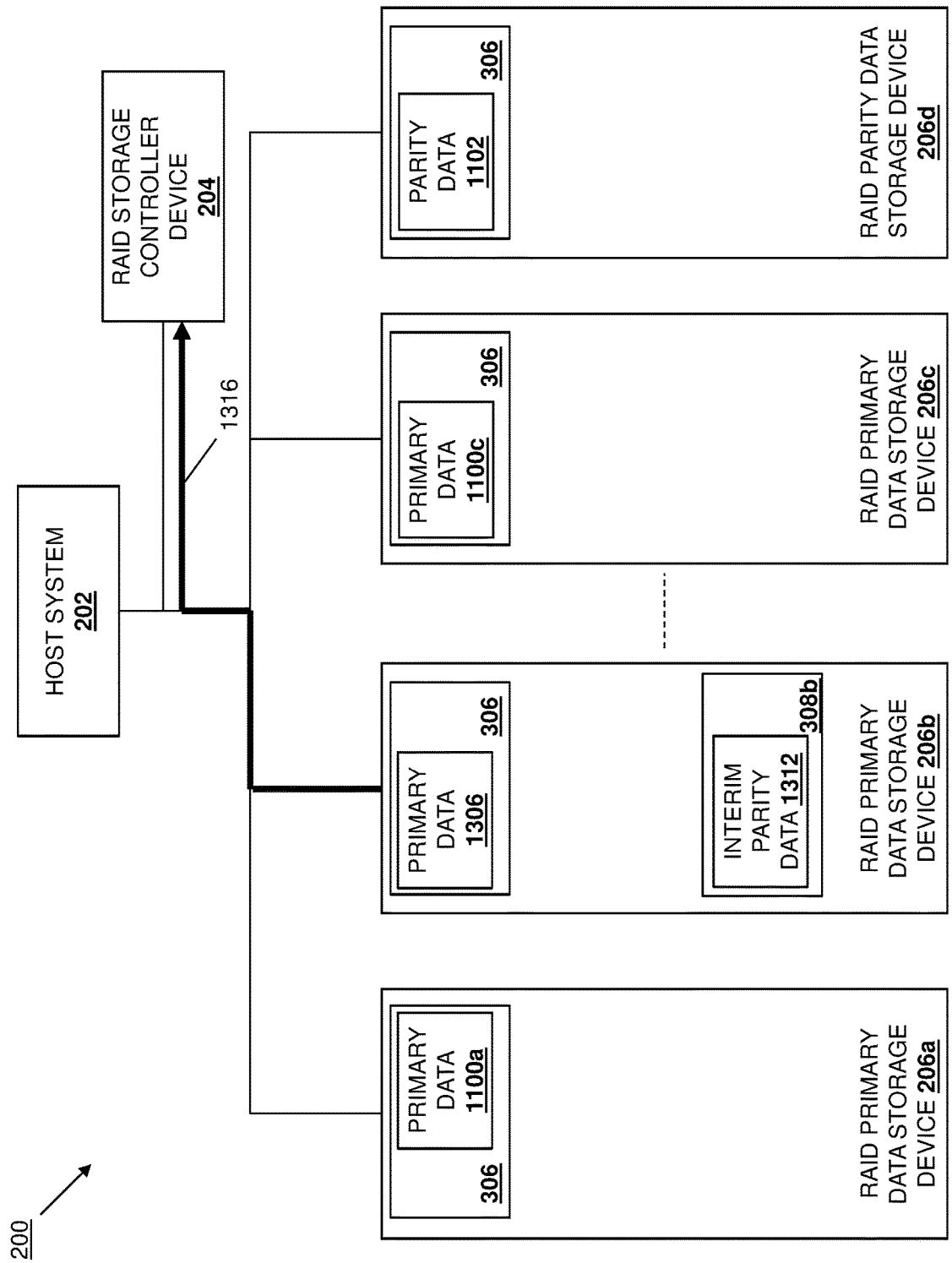
FIG. 13E is a schematic view illustrating an embodiment of the RAID storage system of FIG. 2 operating during the method of FIG. 10.

With reference to FIG. 13E, following completion of the operations associated with the command 1302 (e.g., multiple operations associated with a multi-operation command as discussed above, following each operation associated with respective commands, etc.) the RAID storage engine 304 in the RAID primary data storage device 206b/300 may generate and transmit a completion message 1316 to the RAID storage controller device 204. For example, the RAID storage engine 304 in the RAID primary data storage device 206b/300 may generate the completion message 1316 and provide that completion message in a completion queue in its communication system 310, and then generate an interrupt to the RAID storage controller device 204 that causes the RAID storage controller device 204 to access that completion queue and retrieve the completion message. However, while a specific technique for transmitting the completion message is described, one of skill in the art in possession of the present disclosure will recognize that completion messages may be transmitted using a variety of other techniques while remaining within the scope of the present disclosure.

Figure 14E:
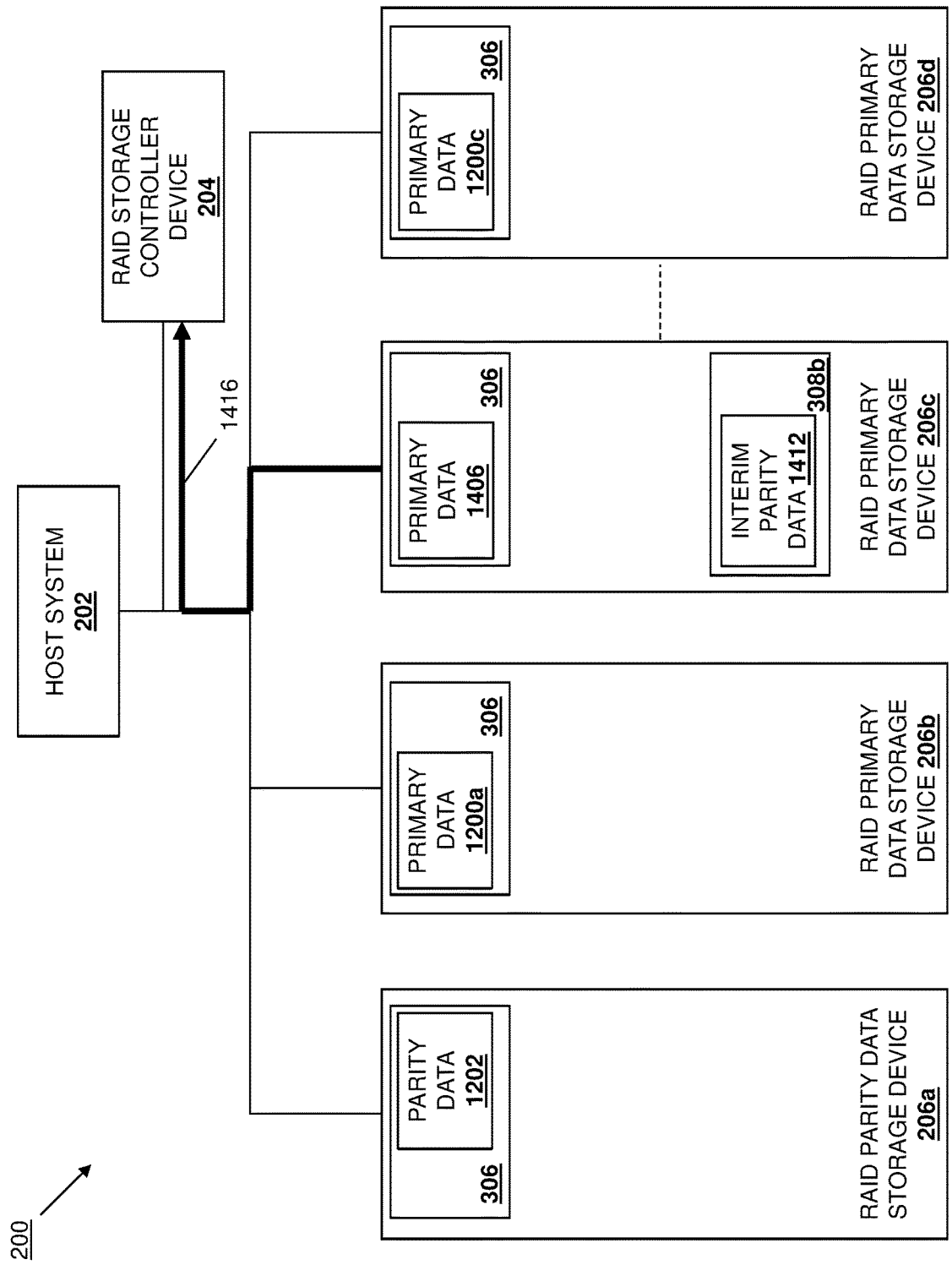
FIG. 14E is a schematic view illustrating an embodiment of the RAID storage system of FIG. 2 operating during the method of FIG. 10.

Similarly, with reference to FIG. 14E, following completion of the operations associated with the command 1402 (e.g., multiple operations associated with a multi-operation command as discussed above, following each operation associated with respective commands, etc.) the RAID storage engine 304 in the RAID primary data storage device 206c/300 may generate and transmit a completion message 1416 to the RAID storage controller device 204. For example, the RAID storage engine 304 in the RAID primary data storage device 206c/300 may generate the completion message 1416 and provide that completion message in a completion queue in its communication system 310, and then generate an interrupt to the RAID storage controller device 204 that causes the RAID storage controller device 204 to access that completion queue and retrieve the completion message. However, while a specific technique for transmitting the completion message is described, one of skill in the art in possession of the present disclosure will recognize that completion messages may be transmitted using a variety of other techniques while remaining within the scope of the present disclosure. Furthermore, one of skill in the art in possession of the present disclosure will recognize that other RAID primary data storage devices experiencing similar primary data updates to different data stripes may transmit similar completion messages to the RAID storage controller device 204 following their update operations (e.g., the multiple operations in the WRITE WITH XOR multi-operation command discussed above), and the RAID storage controller device 204 may wait to receive completion messages from each RAID primary data storage device experiencing an update prior to proceeding with the method 1000.

Figure 15A:
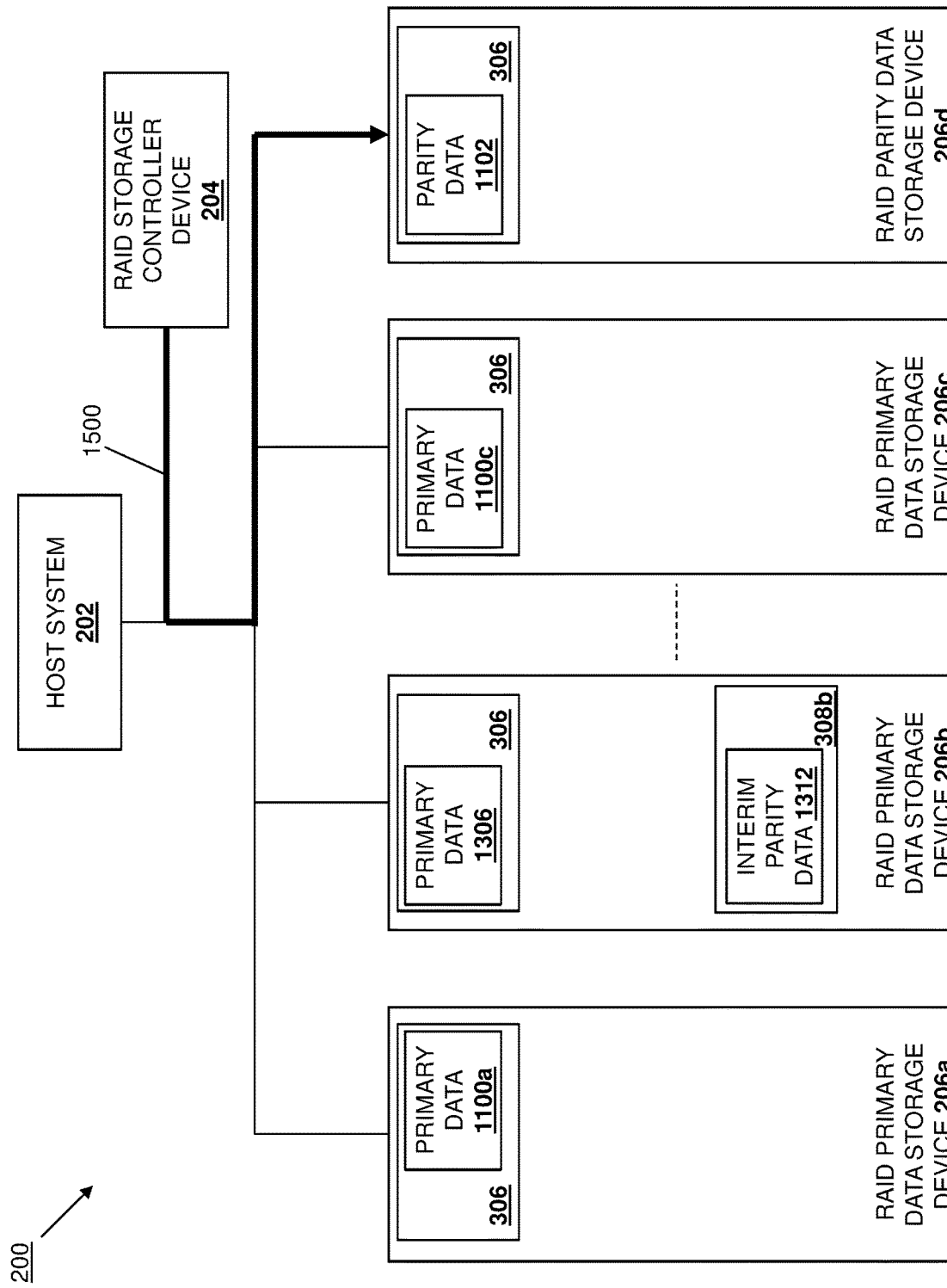
FIG. 15A is a schematic view illustrating an embodiment of the RAID storage system of FIG. 2 operating during the method of FIG. 10.
Figure 16A:
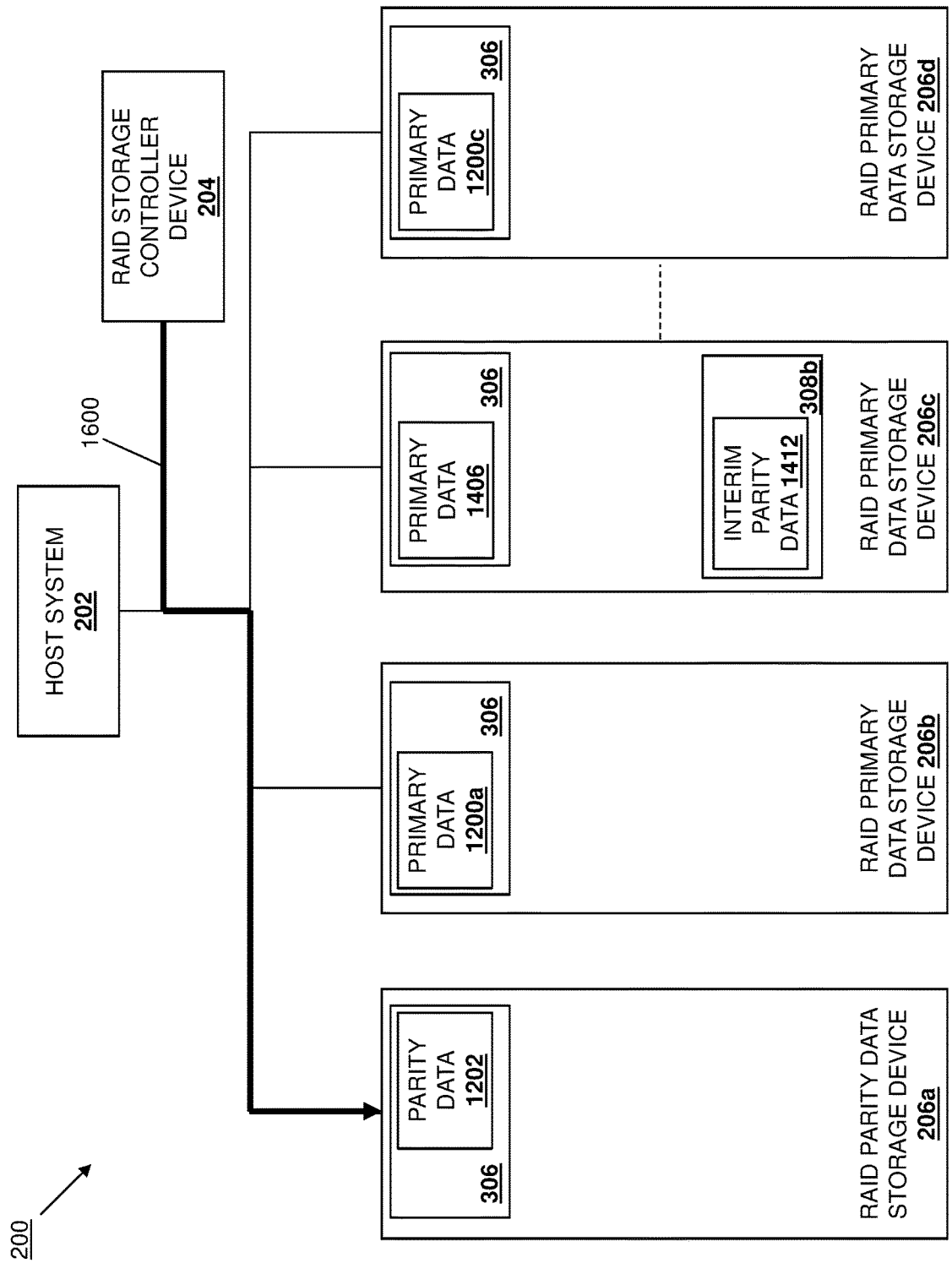
FIG. 16A is a schematic view illustrating an embodiment of the RAID storage system of FIG. 2 operating during the method of FIG. 10.

The method 1000 then proceeds to block 1008 where RAID parity data storage devices receive commands from the RAID storage controller device. In an embodiment, at block 1008, the RAID storage controller device 204 may generate and transmit commands to RAID parity data storage devices. For example, and as discussed above, the RAID storage controller device 204 may determine that completion messages from each RAID primary data storage device experiencing an update have been received as discussed above and, in response, at block 1008 the RAID storage controller device 204 may generate a command 1500 and transmit the command 1500 to the RAID parity data storage device 206d (as illustrated in FIG. 15A), and may also generate a command 1600 and transmit the command 1600 to the RAID parity data storage device 206a (as illustrated in FIG. 16A). As will be appreciated by one of skill in the art in possession of the present disclosure, the commands 1500 and 1600 may be transmitted to the RAID parity data storage devices 206d and 206a at substantially the same time.

In some embodiments, the commands 1500 and 1600 may be multi-operation commands like those described in U.S. patent application Ser. No. 16/585,296, filed on Sep. 27, 2019. For example, the commands 1500 and 1600 may be NVMe WRITE PARITY multi-operation commands that are configured to cause the RAID parity data storage devices 206d and 206a to perform the multiple operations described below. However, while described as providing multi-operation commands at block 1002, one of skill in the art in possession of the present disclosure will recognize that the multiple operations performed by the RAID parity data storage devices 206d and 206a discussed below may be performed in response to respective commands transmitted by the RAID storage controller device 204 while remaining within the scope of the present disclosure as well. In a specific example, the transmission of the commands 1500 and 1600 may include the RAID storage controller device 204 providing the commands 1500 and 1600 in respective submission queues that are included in the communication systems 310 in the RAID parity data storage devices 206d/300 and 206a/300, and then ringing doorbells for the RAID parity data storage devices 206d/300 and 206a/300. However, one of skill in the art in possession of the present disclosure will recognize that the commands 1500 and 1600 may be provided to the RAID parity data storage devices 206d and 206a in a variety of manners that will fall within the scope of the present disclosure as well.

As such, in some examples the respective RAID storage engine 304 in the RAID parity data storage devices 206d/

300 and 206a/300 may respond to the ringing of their doorbells by accessing the commands 1500 and 1600, respectively, in the submission queue in their communication systems 310. In embodiments in which the commands 1500 and 1600 are multi-operation commands, the respective RAID storage engine 304 in the RAID parity data storage devices 206d/300 and 206a/300 may identify the multiple operations instructed by those commands 1500 and 1600 (as described in U.S. patent application Ser. No. 16/585,296, filed on Sep. 27, 2019.) However, while two RAID parity data storage devices are illustrated and described below as receiving the commands 1500 and 1600 that causes them to update their parity data 1102 and 1202, one of skill in the art in possession of the present disclosure will recognize how more RAID parity data storage devices may receive similar commands at block 1002 while remaining within the scope of the present disclosure as well.

Figure 15B:
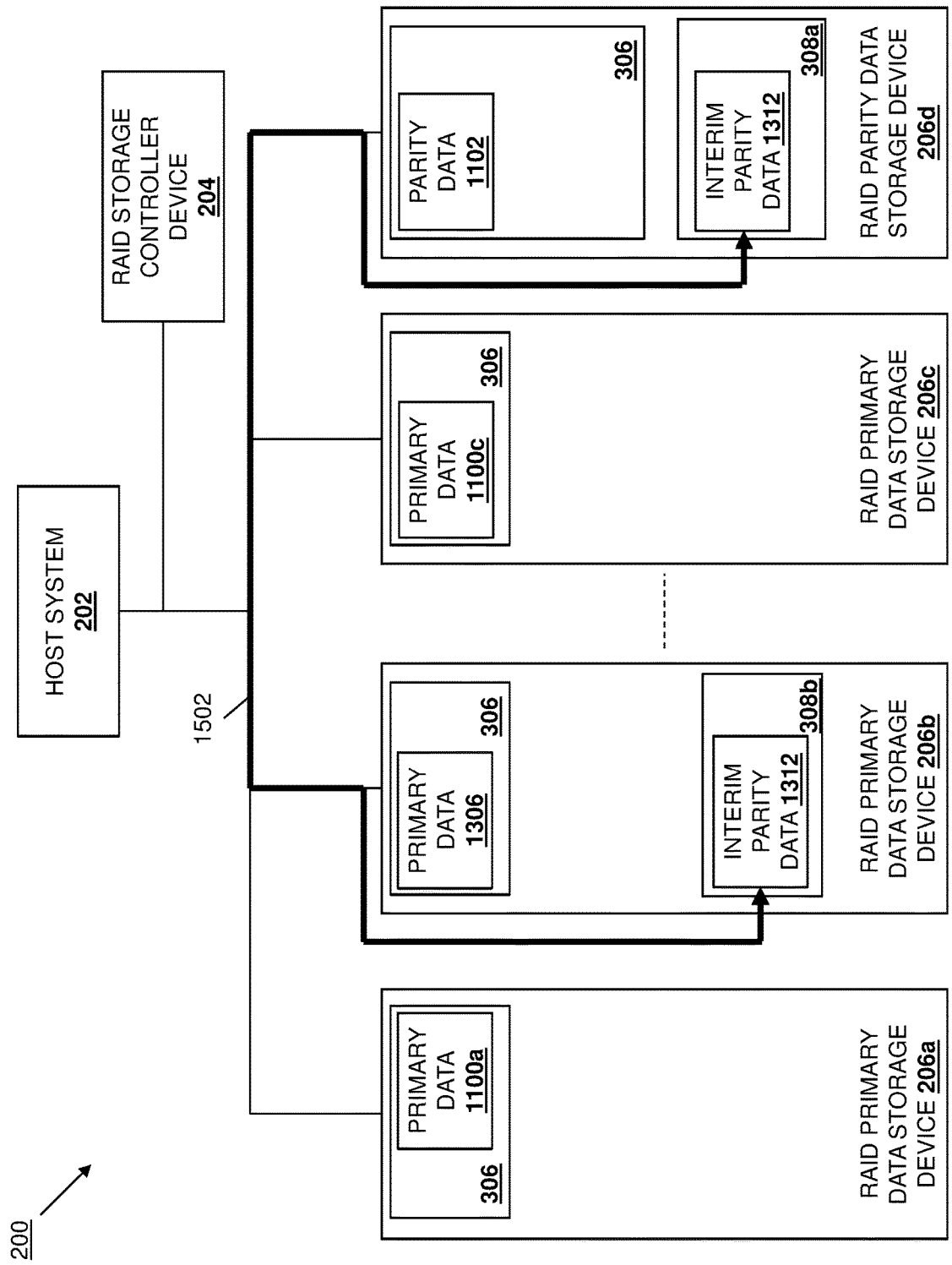
FIG. 15B is a schematic view illustrating an embodiment of the RAID storage system of FIG. 2 operating during the method of FIG. 10.
Figure 16B:
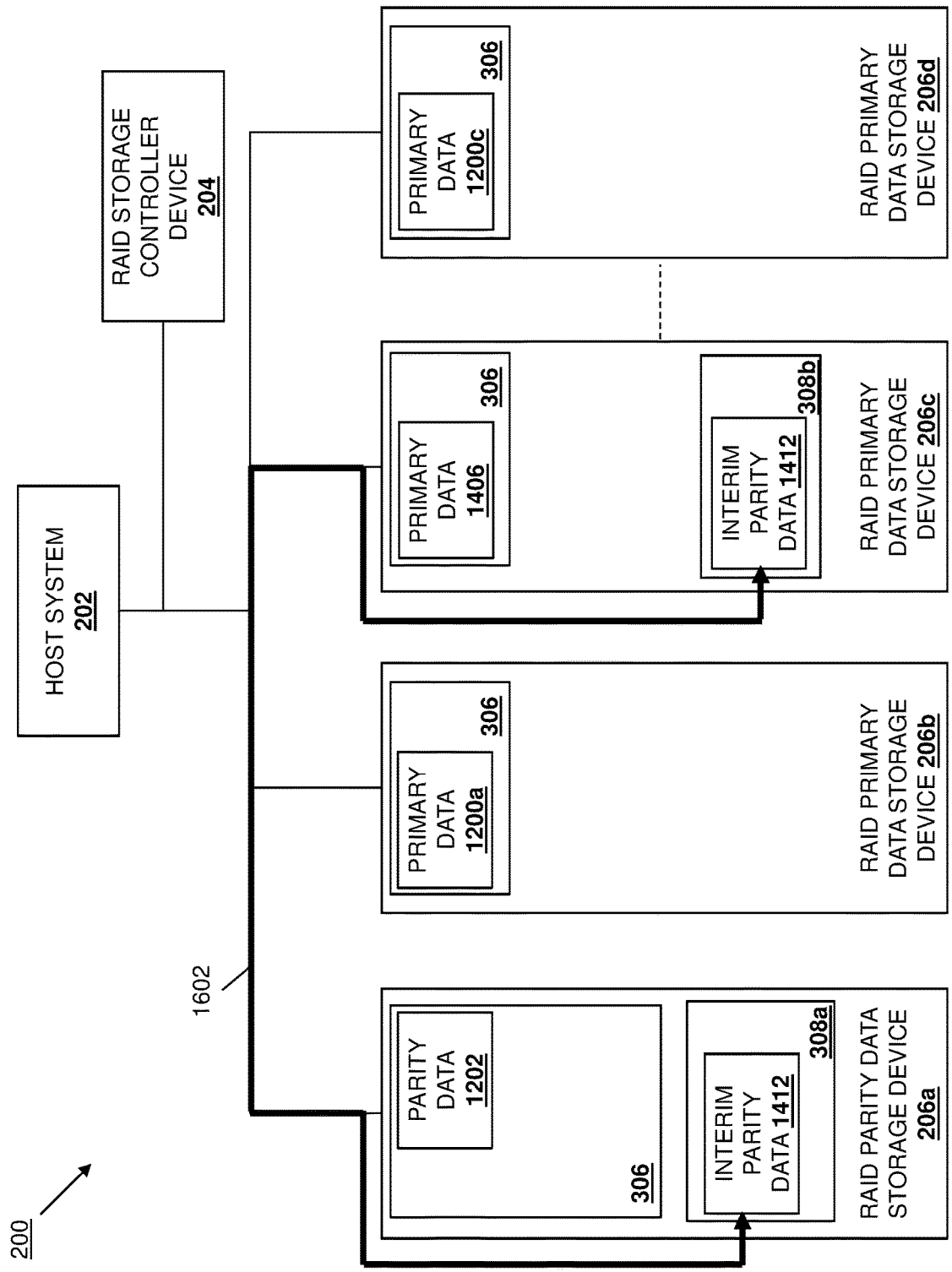
FIG. 16B is a schematic view illustrating an embodiment of the RAID storage system of FIG. 2 operating during the method of FIG. 10.

The method 1000 then proceeds to block 1010 where the RAID parity data storage devices retrieve respective interim parity data for respective data stripes from respective RAID primary data storage devices. With reference to FIG. 15B, in an embodiment of block 1010 and based on the command 1500 (which is a multi-operation command as described above in this embodiment), the RAID storage engine 304 in the RAID parity data storage device 206d/300 may operate to perform a DMA operation 1502 to retrieve the interim parity data 1312 from the second buffer subsystem 308b in the RAID primary data storage device 206b, and write that interim parity data 1312 to its first buffer subsystem 308a (e.g., in a device buffer in the RAID parity data storage device 206d as described in the example above). With reference to FIG. 16B, in an embodiment of block 1010 and based on the command 1600 (which is a multi-operation command as described above in this embodiment), the RAID storage engine 304 in the RAID parity data storage device 206a/300 may operate to perform a DMA operation 1602 to retrieve the interim parity data 1412 from the second buffer subsystem 308b in the RAID primary data storage device 206c, and write that interim parity data 1412 to its first buffer subsystem 308a (e.g., in a device buffer in the RAID parity data storage device 206a as described in the example above). As will be appreciated by one of skill in the art in possession of the present disclosure, the DMA operations 1502 and 1602 may be performed by the RAID parity data storage devices 206d and 206a simultaneously, in parallel, and/or otherwise at substantially the same time. As such, even as the number of RAID primary data storage devices experiencing a primary data update increases, parallel DMA operations may be performed to retrieve the respective interim parity data that results (as discussed above), thus reducing the time needed to update the parity data in the RAID parity data storage devices as compared to the method 400.

Figure 15C:
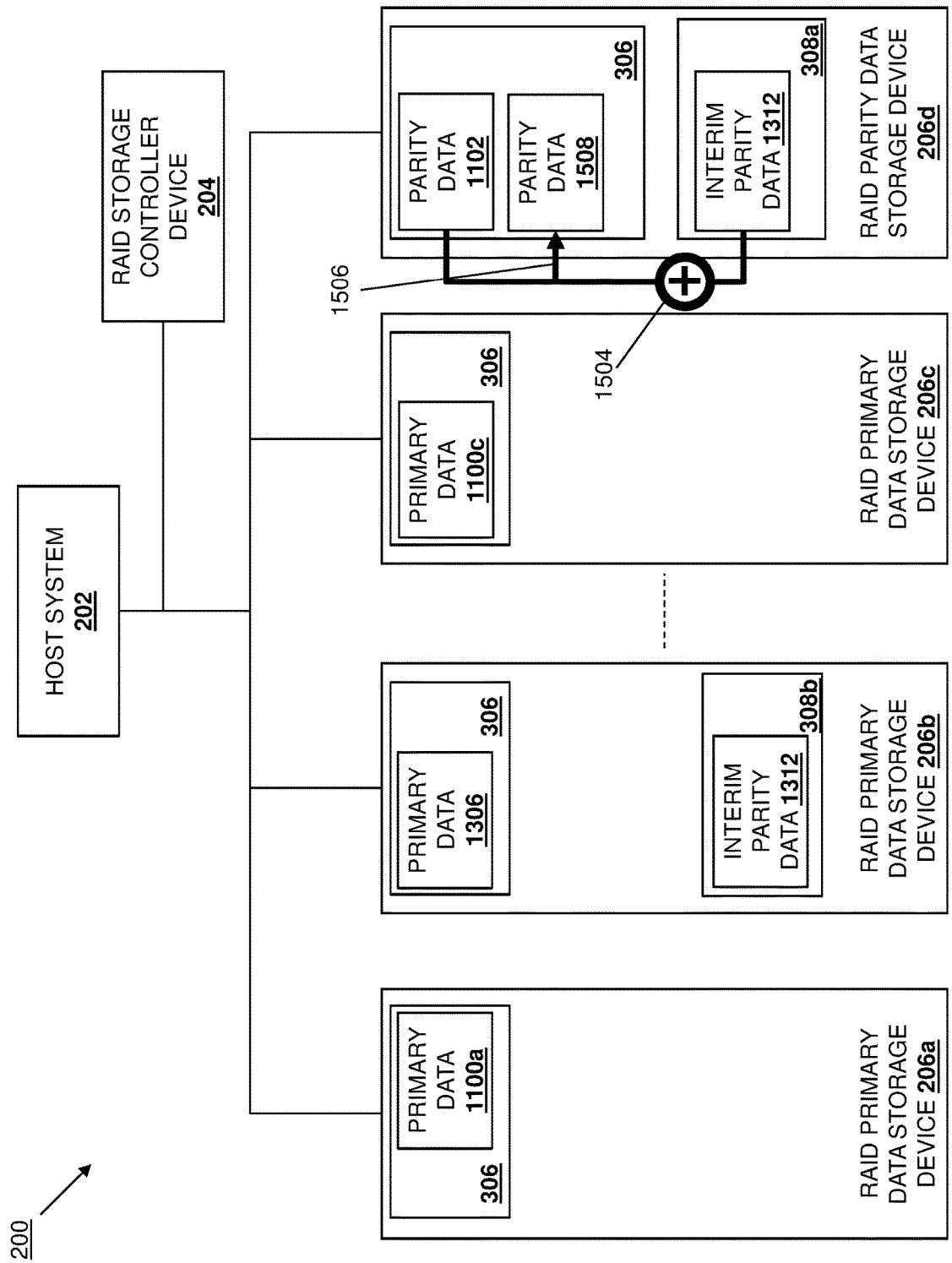
FIG. 15C is a schematic view illustrating an embodiment of the RAID storage system of FIG. 2 operating during the method of FIG. 10.

The method 1000 then proceeds to block 1012 where the RAID parity data storage devices performs respective XOR operations on respective current parity data for respective data stripes and the respective interim parity data for respective data stripes to produce respective updated parity data for respective data stripes, and overwrites the respective current parity data for respective data stripes with the respective updated parity data for respective data stripes. With reference to FIG. 15C, in an embodiment of block 1012 and based on the command 1500 (which is a multi-operation command as described above in this embodiment), the RAID storage engine 304 in the RAID parity data storage device 206d/300 may operate to perform an XOR operation 1504 using the parity data 1102 in its storage subsystem 306 and the interim parity data 1312 in its first buffer subsystem 308a in order to produce parity data 1508, and then perform an overwrite operation 1506 to overwrite the parity data 1102 with the parity data 1508 in its storage subsystem 306 (as illustrated by the replacement of parity data 1102 from FIG. 15C with parity data 1508 in FIG. 15D.) With reference to FIG. 16C, in an embodiment of block 1012 and based on the command 1600 (which is a multi-operation command as described above in this embodiment), the RAID storage engine 304 in the RAID parity data storage device 206a/300 may operate to perform an XOR operation 1604 using the parity data 1202 in its storage subsystem 306 and the interim parity data 1412 in its first buffer subsystem 308a in order to produce parity data 1608, and then perform an overwrite operation 1606 to overwrite the parity data 1202 with the parity data 1608 in its storage subsystem 306 (as illustrated by the replacement of parity data 1202 from FIG. 16C with parity data 1608 in FIG. 16D.)

Figure 15D:
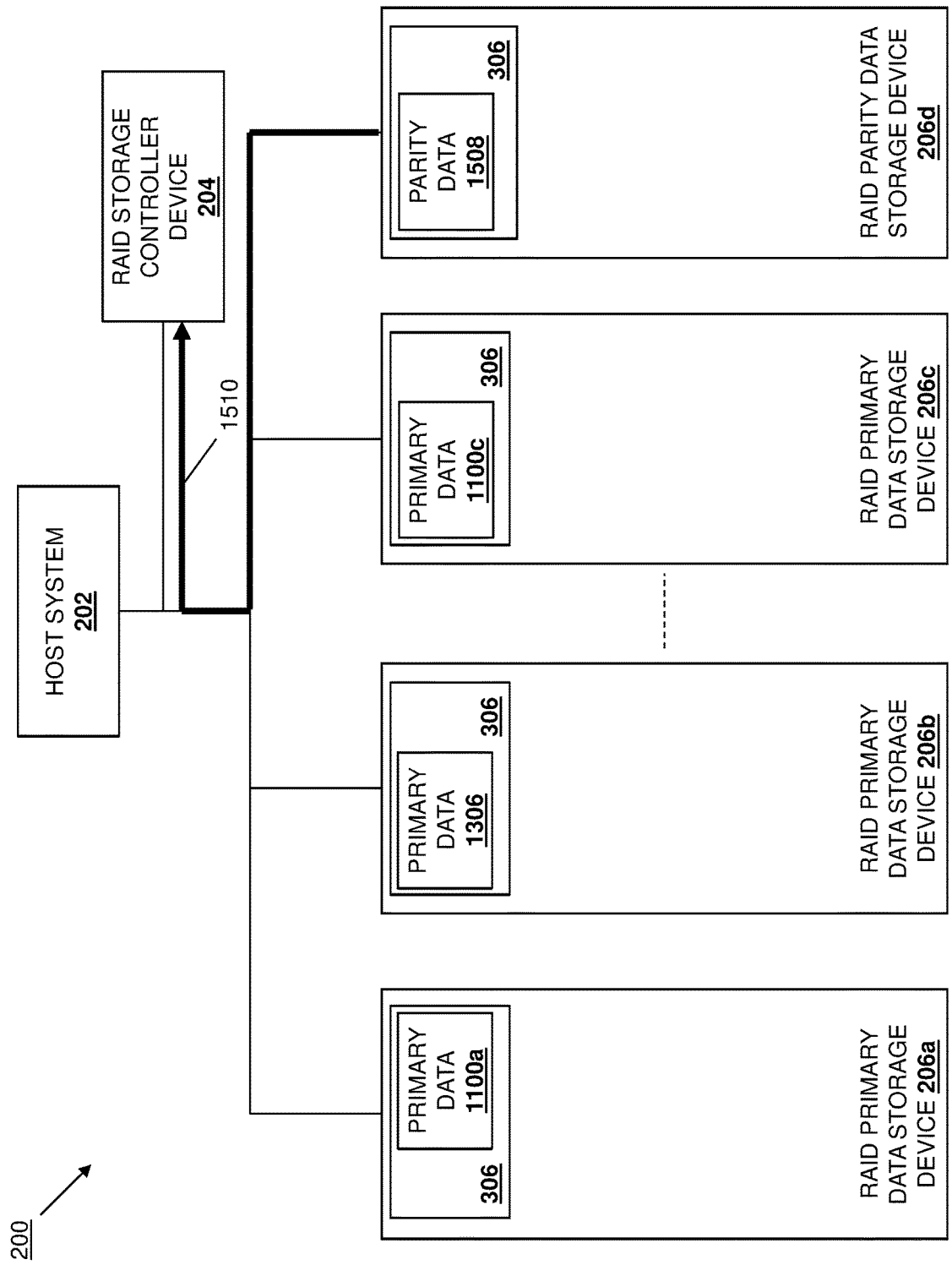
FIG. 15D is a schematic view illustrating an embodiment of the RAID storage system of FIG. 2 operating during the method of FIG. 10.
Figure 16C:
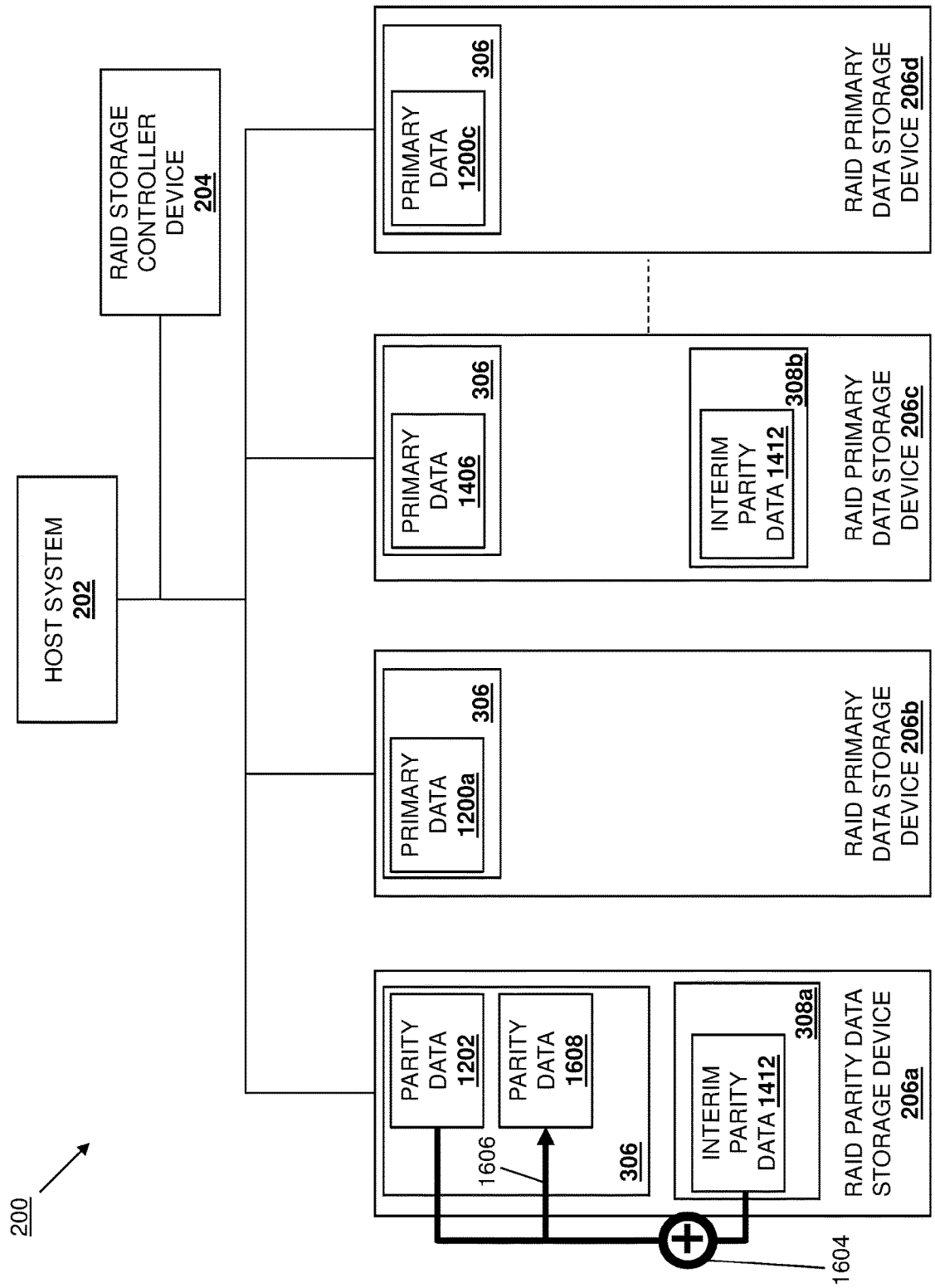
FIG. 16C is a schematic view illustrating an embodiment of the RAID storage system of FIG. 2 operating during the method of FIG. 10.
Figure 16D:
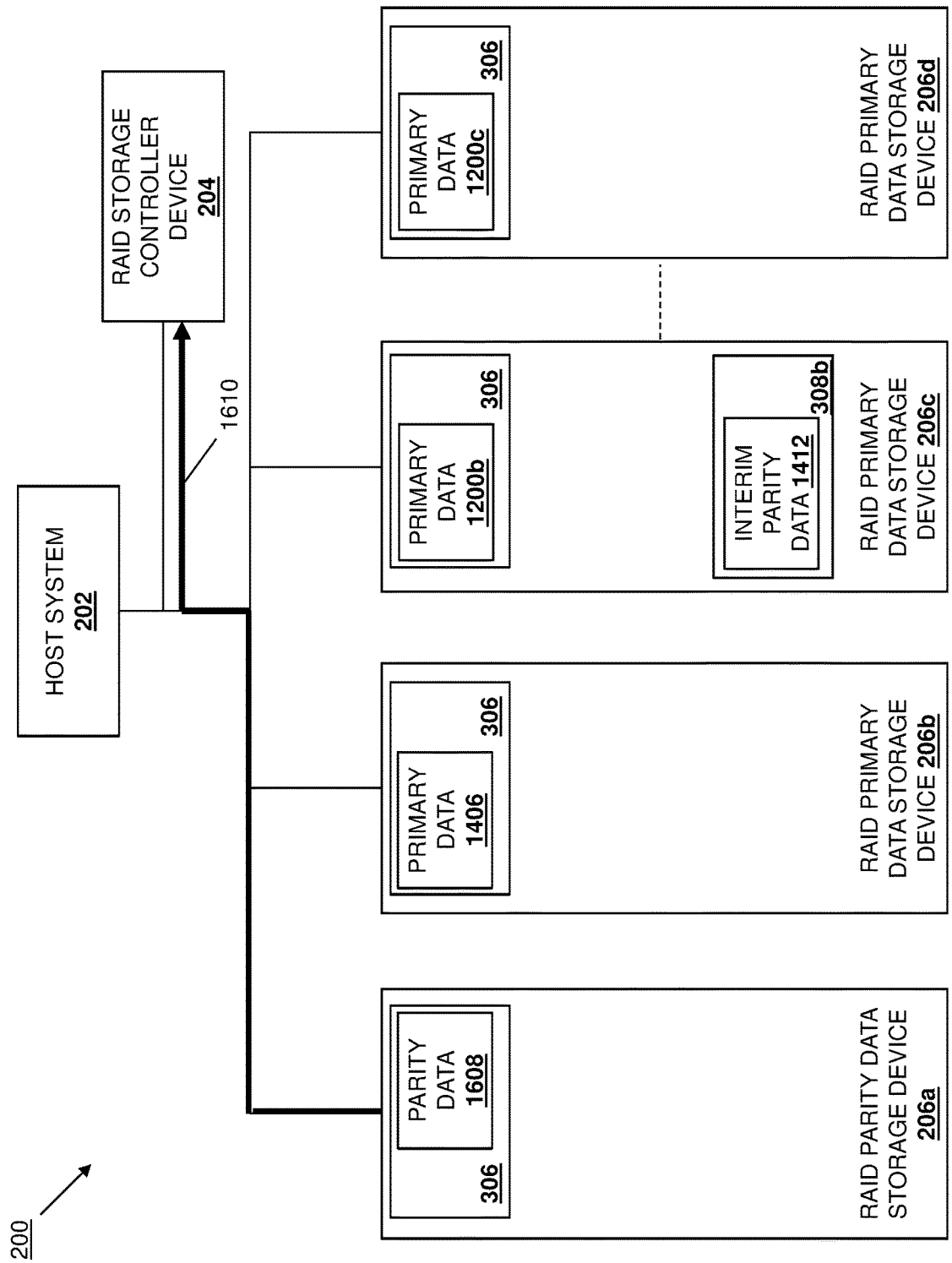
FIG. 16D is a schematic view illustrating an embodiment of the RAID storage system of FIG. 2 operating during the method of FIG. 10.

With reference to FIG. 15D, following completion of the operations associated with the command 1500 (e.g., multiple operations associated with a multi-operation command as discussed above, following each operation associated with respective commands, etc.) the RAID storage engine 304 in the RAID parity data storage device 206d/300 may generate and transmit a completion message 1510 to the RAID storage controller device 204. For example, the RAID storage engine 304 in the RAID parity data storage device 206d/300 may generate the completion message 1510 and provide that completion message in a completion queue in its communication system 310, and then generate an interrupt to the RAID storage controller device 204 that causes the RAID storage controller device 204 to access that completion queue and retrieve the completion message. With reference to FIG. 16D, following completion of the operations associated with the command 1600 (e.g., multiple operations associated with a multi-operation command as discussed above, following each operation associated with respective commands, etc.) the RAID storage engine 304 in the RAID parity data storage device 206a/300 may generate and transmit a completion message 1610 to the RAID storage controller device 204. For example, the RAID storage engine 304 in the RAID parity data storage device 206a/300 may generate the completion message 1610 and provide that completion message in a completion queue in its communication system 310, and then generate an interrupt to the RAID storage controller device 204 that causes the RAID storage controller device 204 to access that completion queue and retrieve the completion message. However, while a specific technique for transmitting completion messages is described, one of skill in the art in possession of the present disclosure will recognize that completion messages may be transmitted using a variety of other techniques while remaining within the scope of the present disclosure. While not illustrated, following the receiving of the completion messages 1510 and 1610, the RAID storage controller device 204 may generate and transmit a completion message to the host system 202 in order to indicate to the host system that the write command 1300 has been completed.

Figure 17A:
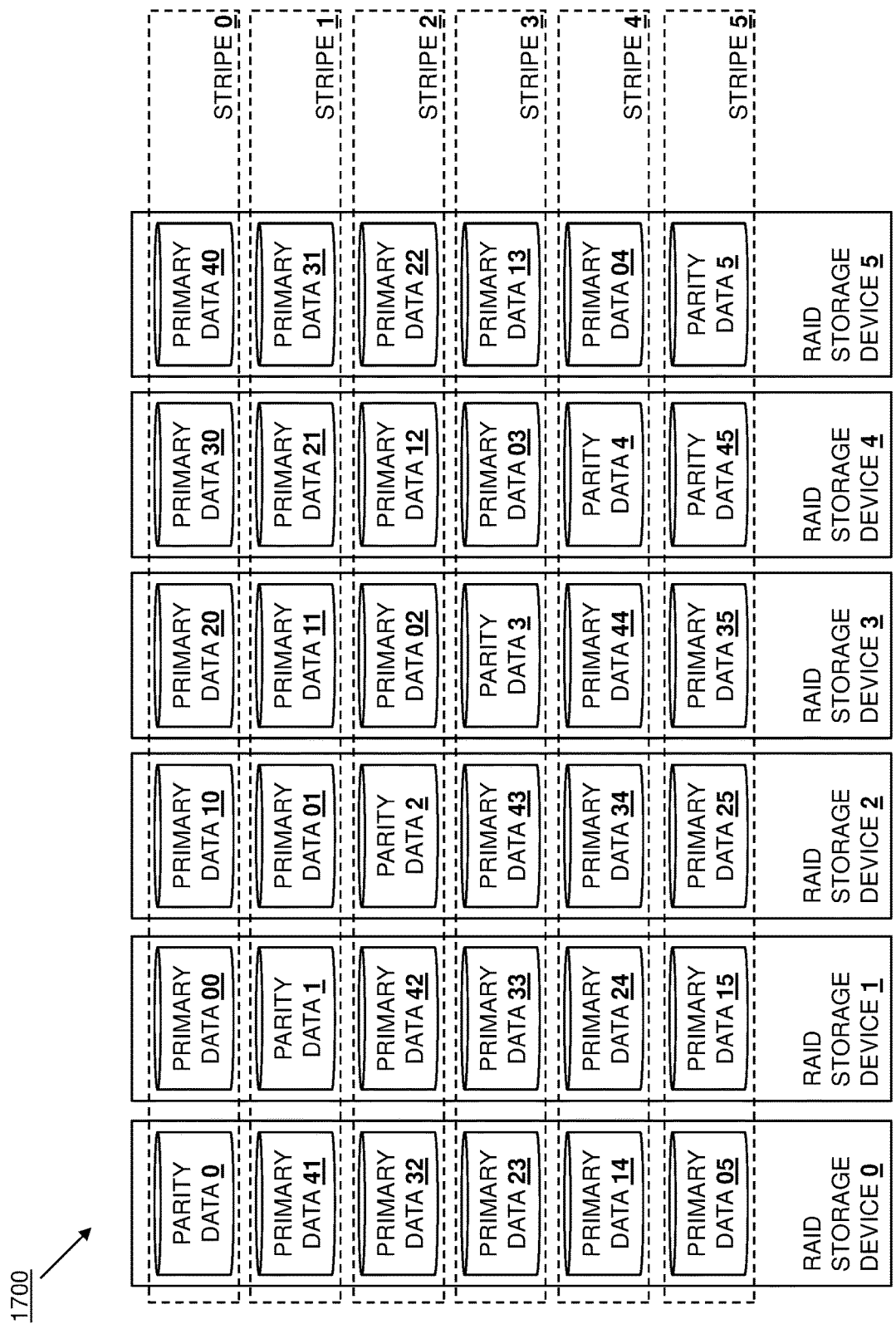
FIG. 17A is a schematic view illustrating an alternate embodiment of the storage of data in a RAID storage system.

With reference to FIG. 17A, an embodiment of the storage of primary data and parity data in a RAID storage system 1700 is illustrated. The RAID storage system 1700 includes the plurality of RAID storage devices 0, 1, 2, 3, 4, and 5 discussed above with reference to FIGS. 9A and 9B, with those RAID storage devices 0-5 storing the data stripes 0, 1, 2, 3, 4, and 5 discussed above with reference to FIGS. 9A and 9B. Similarly as discussed above with reference to FIGS. 9A and 9B, different data storage in each of the RAID storage devices 0-5 for the different data stripes 0-5 is identified in FIG. 9A by the identification of the type of primary data being stored, along with an element number that includes a first digit that identifies the data stripe (e.g., 0-5) to which that primary data belongs, followed by a second digit that identifies the portion of that primary data being stored.

Figure 17B:
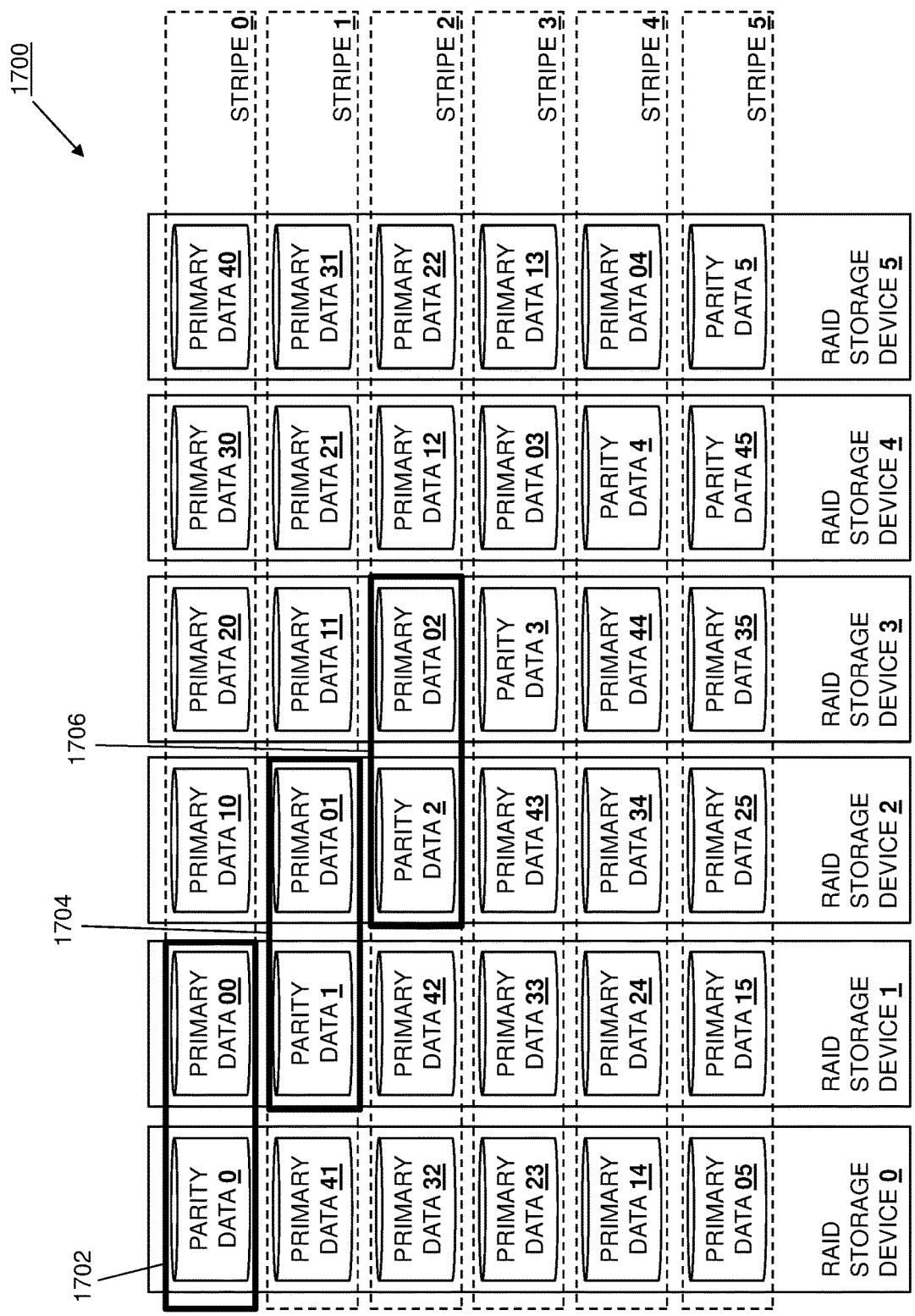
FIG. 17B is a schematic view illustrating an alternate embodiment of the RAID storage system of FIG. 17A during the method of FIG. 10.

However, FIG. 17B illustrates how the method 1000 discussed above allows for the storage of primary data and parity data in the RAID storage system 1700 of FIG. 17A without the inefficiency discussed above for the method 400. FIG. 17B illustrates how the method 1000 provides, in response to a particular write command by the host system 202, a plurality of partial stripe writes 1702, 1704, and 1706 across different data stripes that allow the primary data 00 and parity data 0 in data stripe 0, the primary data 01 and parity data 1 in data stripe 1, and the primary data 02 and the parity data 2 in data stripe 2 to all be updated in parallel. With reference to the method 1000 discussed above, the RAID storage devices 1, 2, 3 (e.g., corresponding to the RAID primary data storage devices in the method 1000) may operate to update their respective primary data 00, 01, and 02 and produce their respective interim parity data in parallel, as discussed above. Subsequently, the RAID storage device 0 (e.g., corresponding to the RAID parity data storage device 206*d* in the method 1000) may operate to retrieve the interim parity data from the RAID storage device 1 via a DMA operation that retrieves and stores the interim parity data from the RAID storage device 1, while at substantially the same time the RAID storage device 1 (e.g., corresponding to the RAID parity data storage device 206*a* in the method 1000) may operate to retrieve the interim parity data from the RAID storage device 2 via a DMA operation that retrieves and stores the interim parity data from the RAID storage device 2, and while at substantially the same time the RAID storage device 2 (e.g., corresponding to another RAID parity data storage device not discussed in the method 1000 above) may operate to retrieve the interim parity data from the RAID storage device 3 via a DMA operation that retrieves and stores the interim parity data from the RAID storage device 3. As discussed above for the method 1000, following the retrieval of the interim parity data, the parity data 0, 1, and 2 may be updated by the RAID storage devices 0, 1, and 2, respectively. As also discussed above, the ability to retrieve the interim parity data in parallel allows for the calculation of the updated parity data sooner than is available in the method 400.

Thus, systems and methods have been described that provide for the performance of parity update operations to store and backup data in a RAID storage system with the assistance of the RAID storage devices that store that data. For example, a first RAID primary data storage device may retrieve second primary data from a host system via a first Direct Memory Access (DMA) operation, perform an XOR operation on first primary data in a first storage subsystem in the first RAID primary data storage device and the second primary data to produce first interim parity data for a first data stripe, and write the first interim parity data for the first data stripe to its first buffer subsystem. A second RAID primary data storage device may retrieve fourth primary data from the host system via a second DMA operation, perform an XOR operation on third primary data in a second storage subsystem in the second RAID primary data storage device and the fourth primary data to produce second interim parity data for a second data stripe, and write the second interim parity data for the second data stripe to its second buffer subsystem. A first RAID parity data storage device may retrieve the first interim parity data for the first data stripe from the first RAID primary data storage device via a third DMA operation, and may perform an XOR operation on first parity data for the first data stripe in a first storage subsystem in the RAID parity data storage device along with the first interim parity data for the first data stripe to produce second parity data for the first data stripe, and overwrite the first parity data for the first data stripe with the second parity data for the first data stripe. A second RAID parity data storage device may retrieve the second interim parity data for the second data stripe from the second RAID primary data storage device via a fourth DMA operation, and may perform an XOR operation on third parity data for the second data stripe in a second storage subsystem in the RAID parity data storage device along with the second interim parity data for the second data stripe to produce fourth parity data for the second data stripe, and overwrite the third parity data for the second data stripe with the fourth parity data for the second data stripe. As such, parity update operations are offloaded from the RAID storage controller device, thus increasing the ability of the RAID storage controller device to scale with high performance RAID storage devices.

Although illustrative embodiments have been shown and described, a wide range of modification, change and substitution is contemplated in the foregoing disclosure and in some instances, some features of the embodiments may be employed without a corresponding use of other features. Accordingly, it is appropriate that the appended claims be construed broadly and in a manner consistent with the scope of the embodiments disclosed herein.

What is claimed is:

1. A Redundant Array of Independent Disk (RAID) storage-device-assisted parity data update system, comprising:
   a host system;
   a Redundant Array of Independent Disk (RAID) storage controller device that is coupled to the host system; and
   a plurality of RAID storage devices that are each coupled to both the host system and the RAID storage controller device, wherein the plurality of RAID storage devices include:
      a first RAID primary data storage device that includes a first storage subsystem storing first primary data and a first buffer subsystem, wherein the first RAID primary data storage device is configured, in response to a first command received from the RAID storage controller device, to:
         retrieve, via a first Direct Memory Access (DMA) operation from the host system, second primary data;
         perform an XOR operation on the first primary data in the first storage subsystem and the second primary data to produce first interim parity data for a first data stripe; and
         write, to the first buffer subsystem, the first interim parity data;
      a second RAID primary data storage device that includes a second storage subsystem storing third primary data and a second buffer subsystem, wherein the second RAID primary data storage device is configured, in response to a second command received from the RAID storage controller device, to:
         retrieve, via a second DMA operation from the host system, fourth primary data;
         perform an XOR operation on the third primary data in the second storage subsystem and the fourth primary data to produce second interim parity data for a second data stripe; and write, to the second buffer subsystem, the second interim parity data;

a first RAID parity data storage device that includes a third storage subsystem storing first parity data for the first data stripe and a third buffer subsystem, wherein the first RAID parity data storage device is configured, in response to a third command received from the RAID storage controller device, to:

write, via a third DMA operation from the first RAID primary data storage device to the third buffer subsystem, the first interim parity data;

perform an XOR operation on the first parity data in the third storage subsystem and the first interim parity data in the third buffer subsystem to produce second parity data for the first data stripe; and overwrite, in the third storage subsystem, the first parity data with the second parity data; and a second RAID parity data storage device that includes a fourth storage subsystem storing third parity data for the second data stripe and a fourth buffer subsystem, wherein the second RAID parity data storage device is configured, in response to a fourth command received from the RAID storage controller device, to:

write, via a fourth DMA operation from the second RAID primary data storage device to the fourth buffer subsystem, the second interim parity data;

perform an XOR operation on the third parity data in the fourth storage subsystem and the second interim parity data in the fourth buffer subsystem to produce fourth parity data for the second data stripe; and overwrite, in the fourth storage subsystem, the third parity data with the fourth parity data.

2. The system of claim 1, wherein the first RAID primary data storage device is configured to:

overwrite, in the first storage subsystem, the first primary data with the second primary data, and wherein the second RAID primary data storage device is configured to:

overwrite, in the second storage subsystem, the third primary data with the fourth primary data.

3. The system of claim 1, wherein the first RAID primary data storage device is configured to receive and execute the first command from the RAID storage controller device at substantially the same time as the second RAID primary data storage device is configured to receive and execute the second command.

4. The system of claim 1, wherein the first RAID parity data storage device is configured to receive and execute the third command from the RAID storage controller device at substantially the same time as the second RAID parity data storage device is configured to receive and execute the fourth command.

5. The system of claim 1, wherein the first buffer subsystem is a Controller Memory Buffer (CMB) included in the first RAID primary data storage device, the second buffer subsystem is a CMB in the second RAID primary data storage device, the third buffer subsystem is a CMB included in the first RAID parity data storage device, and the fourth buffer subsystem is a CMB included in the second RAID parity data storage device.

6. The system of claim 1, wherein the RAID storage controller device is configured to:

determine that a parity data update situation has occurred and, in response, generate and transmit the third command to the first RAID parity data storage device, and generate and transmit the fourth command to the second RAID parity data storage device.

7. The system of claim 1, wherein the RAID storage controller device is configured to:

receive, from the host system, a write command and, in response, cause the write command to be executed by:

generating and transmitting the first command to the first RAID primary data storage device; and generating and transmitting the second command to the second RAID primary data storage device; and determine that the first parity data has been overwritten by the second parity data, and that the third parity data has been overwritten by the fourth parity data and, in response:

generate and transmit a write completion message to the host system.

8. An Information Handling System (IHS), comprising:

a first Redundant Array of Independent Disk (RAID) primary data storage device that includes a first storage subsystem storing first primary data and a first buffer subsystem, wherein the first RAID primary data storage device is configured, in response to a first command received from a RAID storage controller device, to:

retrieve, via a first Direct Memory Access (DMA) operation from a host system, second primary data;

perform an XOR operation on the first primary data in the first storage subsystem and the second primary data to produce first interim parity data for a first data stripe; and write, to the first buffer subsystem, the first interim parity data;

a second RAID primary data storage device that includes a second storage subsystem storing third primary data and a second buffer subsystem, wherein the second RAID primary data storage device is configured, in response to a second command received from the RAID storage controller device, to:

retrieve, via a second DMA operation from the host system, fourth primary data;

perform an XOR operation on the third primary data in the second storage subsystem and the fourth primary data to produce second interim parity data for a second data stripe; and write, to the second buffer subsystem, the second interim parity data;

a first RAID parity data storage device that includes a third storage subsystem storing first parity data for the first data stripe and a third buffer subsystem, wherein the first RAID parity data storage device is configured, in response to a third command received from the RAID storage controller device, to:

write, via a third DMA operation from the first RAID primary data storage device to the third buffer subsystem, the first interim parity data;

perform an XOR operation on the first parity data in the third storage subsystem and the first interim parity data in the third buffer subsystem to produce second parity data for the first data stripe; and overwrite, in the third storage subsystem, the first parity data with the second parity data; and a second RAID parity data storage device that includes a fourth storage subsystem storing third parity data for the second data stripe and a fourth buffer subsystem, wherein the second RAID parity data storage device is configured, in response to a fourth command received from the RAID storage controller device, to:
  write, via a fourth DMA operation from the second RAID primary data storage device to the fourth buffer subsystem, the second interim parity data;
  perform an XOR operation on the third parity data in the fourth storage subsystem and the second interim parity data in the fourth buffer subsystem to produce fourth parity data for the second data stripe; and
  overwrite, in the fourth storage subsystem, the third parity data with the fourth parity data.

9. The IHS of claim 8, wherein the first RAID primary data storage device is configured to:
  overwrite, in the first storage subsystem, the first primary data with the second primary data, and wherein the second RAID primary data storage device is configured to:
    overwrite, in the second storage subsystem, the third primary data with the fourth primary data.

10. The IHS of claim 8, wherein the first RAID primary data storage device is configured to receive and execute the first command from the RAID storage controller device at substantially the same time as the second RAID primary data storage device is configured to receive and execute the second command.

11. The IHS of claim 8, wherein the first RAID parity data storage device is configured to receive and execute the third command from the RAID storage controller device at substantially the same time as the second RAID parity data storage device is configured to receive and execute the fourth command.

12. The IHS of claim 8, wherein the first buffer subsystem is a Controller Memory Buffer (CMB) included in the first RAID primary data storage device, the second buffer subsystem is a CMB in the second RAID primary data storage device, the third buffer subsystem is a CMB included in the first RAID parity data storage device, and the fourth buffer subsystem is a CMB included in the second RAID parity data storage device.

13. The IHS of claim 8, wherein the first RAID parity data storage device executes the third command from the RAID storage controller device and the second RAID parity data storage device executes the fourth command from the RAID storage controller device following the occurrence of a parity data update situation.

14. A method for assisting with parity update operations using Redundant Array of Independent Disk (RAID) storage devices, comprising:
  receiving, by a first RAID primary data storage device, a first command from a RAID storage controller device and, in response:
    retrieving, by the first RAID primary data storage device via a first Direct Memory Access (DMA) operation from a host system, second primary data;
    performing, by the first RAID primary data storage device, an XOR operation on first primary data in a first storage subsystem in the first RAID primary data storage device and the second primary data to produce first interim parity data for a first data stripe; and
    writing, by the first RAID primary data storage device to a first buffer subsystem in the first RAID primary data storage device, the first interim parity data;
  receiving, by a second RAID primary data storage device, a second command from the RAID storage controller device and, in response:
    retrieving, by the second RAID primary data storage device via a second DMA operation from the host system, fourth primary data;
    performing, by the second RAID primary data storage device, an XOR operation on third primary data in a second storage subsystem in the second RAID primary data storage device and the fourth primary data to produce second interim parity data for a second data stripe; and
    writing, by the second RAID primary data storage device to a second buffer subsystem in the second RAID primary data storage device, the second interim parity data;
  receiving, by a first RAID parity data storage device, a third command from the RAID storage controller device and, in response:
    writing, by the first RAID parity data storage device via a third DMA operation from the first RAID primary data storage device to a third buffer subsystem in the first RAID parity data storage device, the first interim parity data;
    performing, by the first RAID parity data storage device, an XOR operation on first parity data in a third storage subsystem in the first RAID parity data storage device and the first interim parity data in the third buffer subsystem to produce second parity data for the first data stripe; and
    overwriting, by the first RAID parity data storage device in the third storage subsystem, the first parity data with the second parity data; and
  receiving, by a second RAID parity data storage device, a fourth command from the RAID storage controller device and, in response:
    writing, by the second RAID parity data storage device via a fourth DMA operation from the second RAID primary data storage device to a fourth buffer subsystem in the first RAID parity data storage device, the second interim parity data;
    performing, by the first RAID parity data storage device, an XOR operation on third parity data in a fourth storage subsystem in the first RAID parity data storage device and the second interim parity data in the fourth buffer subsystem to produce fourth parity data for the second data stripe; and
    overwriting, by the first RAID parity data storage device in the fourth storage subsystem, the third parity data with the fourth parity data.

15. The method of claim 14, further comprising:
  overwriting, by the first RAID primary data storage device in the first storage subsystem, the first primary data with the second primary data; and
  overwriting, by the second RAID primary data storage device in the second storage subsystem, the third primary data with the fourth primary data.

16. The method of claim 14, wherein the first RAID primary data storage device receives and executes the first command from the RAID storage controller device at substantially the same time as the second RAID primary data storage device receives and executes the second command.

17. The method of claim 14, wherein the first RAID parity data storage device receives and executes the third command from the RAID storage controller device at substantially the same time as the second RAID parity data storage device receives and executes the fourth command.

18. The method of claim 14, wherein the first buffer subsystem is a Controller Memory Buffer (CMB) included in the first RAID primary data storage device, the second buffer subsystem is a CMB in the second RAID primary data storage device, the third buffer subsystem is a CMB included in the first RAID parity data storage device, and the fourth buffer subsystem is a CMB included in the second RAID parity data storage device.

19. The method of claim 14, wherein the first RAID parity data storage device executes the third command from the RAID storage controller device and the second RAID parity data storage device executes the fourth command from the RAID storage controller device following the occurrence of a parity data update situation.

20. The method of claim 19, further comprising:
receiving, by the RAID storage controller device from the host system, a write command and, in response, causing the write command to be executed by:
generating and transmitting the first command to the first RAID primary data storage device; and
generating and transmitting the second command to the second RAID primary data storage device; and
determining, by the RAID storage controller device, that the first parity data has been overwritten by the second parity data, and that the third parity data has been overwritten by the fourth parity data and, in response:
generating and transmitting a write completion message to the host system.

* * * * *